United States Patent [19]

Cochran et al.

[11] 3,924,110

[45] Dec. 2, 1975

[54] CALCULATOR SYSTEM FEATURING A SUBROUTINE REGISTER

[75] Inventors: Michael J. Cochran, Richardson; Charles P. Grant, Jr., Dallas, both of Tex.

[73] Assignee: Texas Instruments Incorporated, Dallas, Tex.

[22] Filed: Sept. 13, 1973

[21] Appl. No.: 397,056

[52] U.S. Cl. .............................. 235/156; 340/172.5

[51] Int. Cl.$^2$ .............................. G06F 9/20

[58] Field of Search .......... 235/156, 160, 159, 164; 340/172.5

[56] References Cited

UNITED STATES PATENTS

| | | | |
|---|---|---|---|
| 3,660,825 | 5/1972 | DeSandre | 340/172.5 |
| 3,693,162 | 9/1972 | Spangler | 340/172.5 |
| 3,800,129 | 3/1974 | Umstattd | 235/156 |

*Primary Examiner*—David H. Malzahn
*Attorney, Agent, or Firm*—Harold Levine; Edward J. Connors, Jr.; Stephen S. Sadacca

[57] ABSTRACT

Disclosed is a portable electronic calculator system implemented in LSI semiconductor technology which features subroutine storage. The subroutine storage is combined with keyboard and flag storage and is preferably implemented as a sequentially addressed memory. The system includes a permanent store memory for storing instruction words, which is addressable by the keyboard storage. After addressing the memory according to a location specified in the keyboard storage, an exchange is executed between the keyboard storage and subroutine. Subsequently, another exchange is executed effecting return of the operating program to the location in the memory previously specified. The subroutine register is under control of the instruction memory, and functions only to exchange its contents with that of the keyboard storage.

6 Claims, 81 Drawing Figures

Fig. 8b1
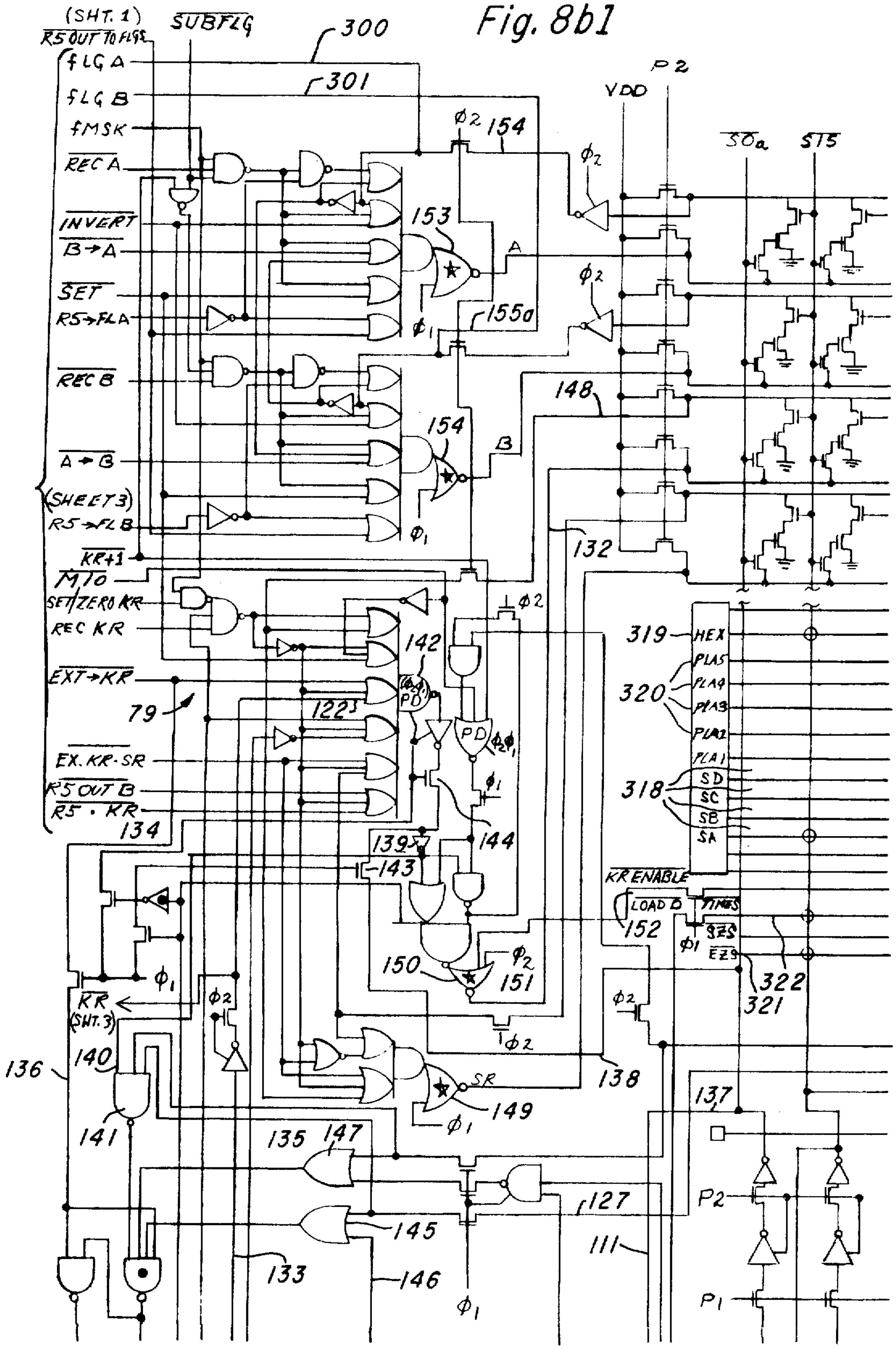

(SHEET 1) Fig. 8b2
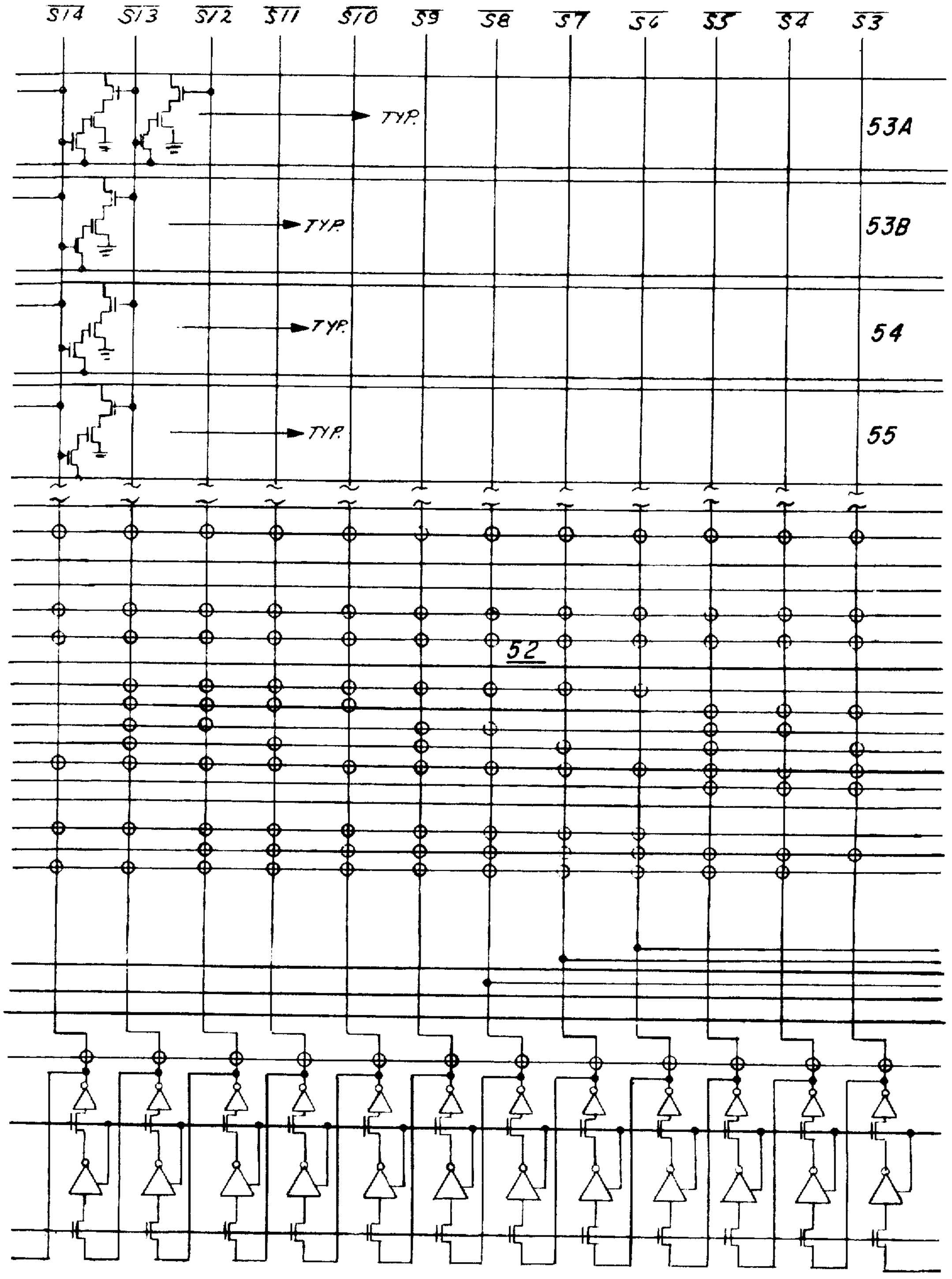

Fig. 8b3
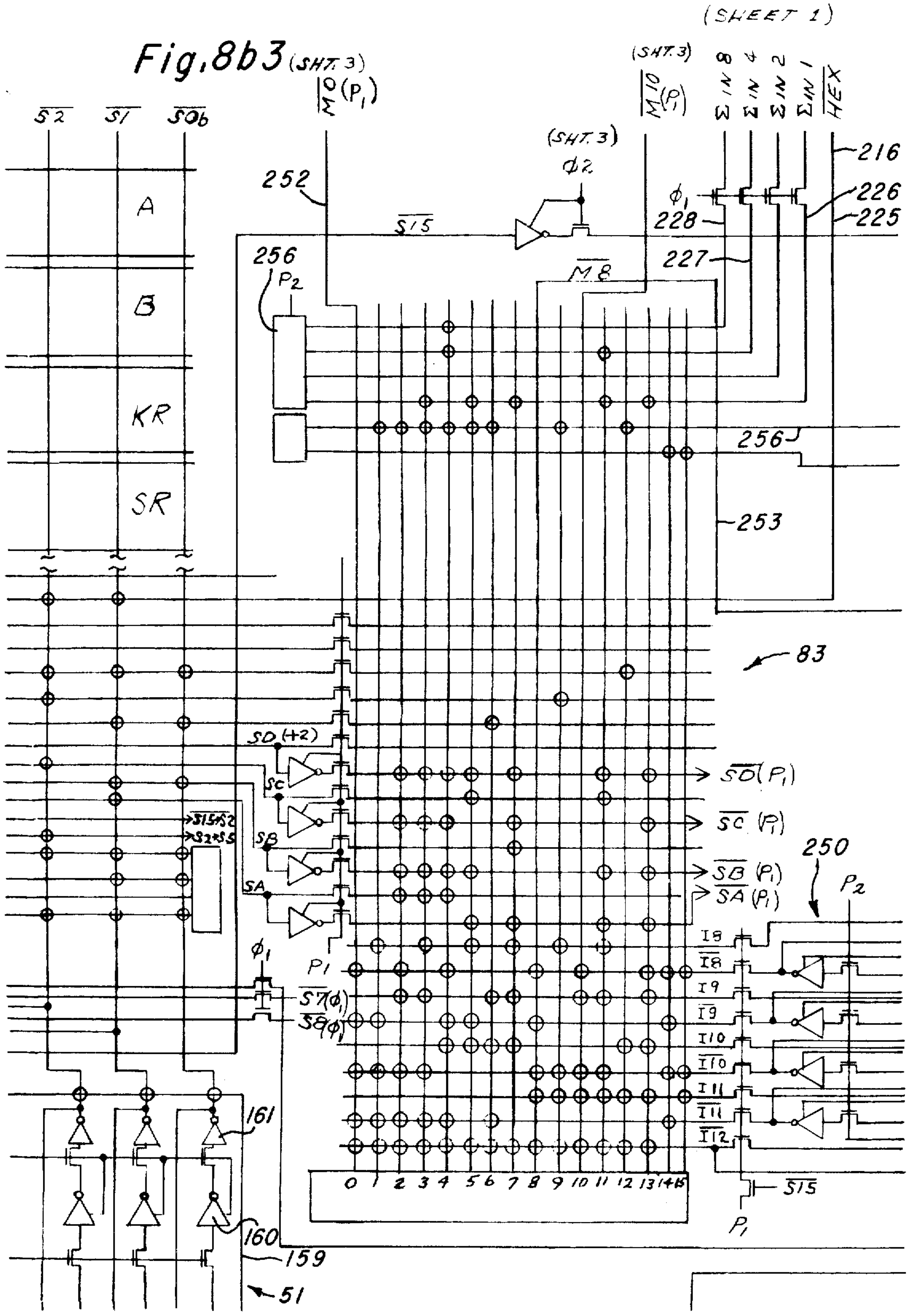

Fig. 8b4
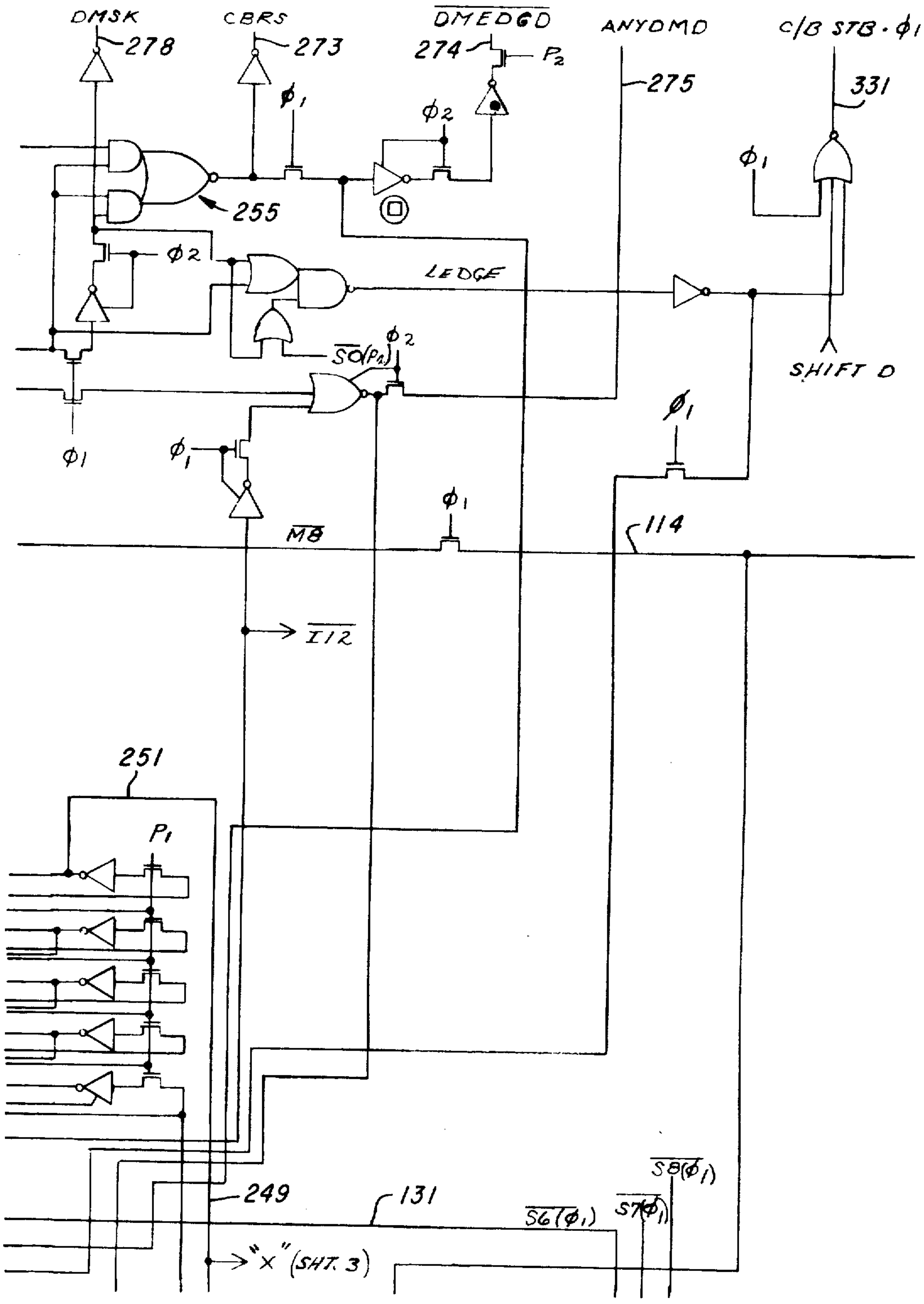

Fig. 8b5
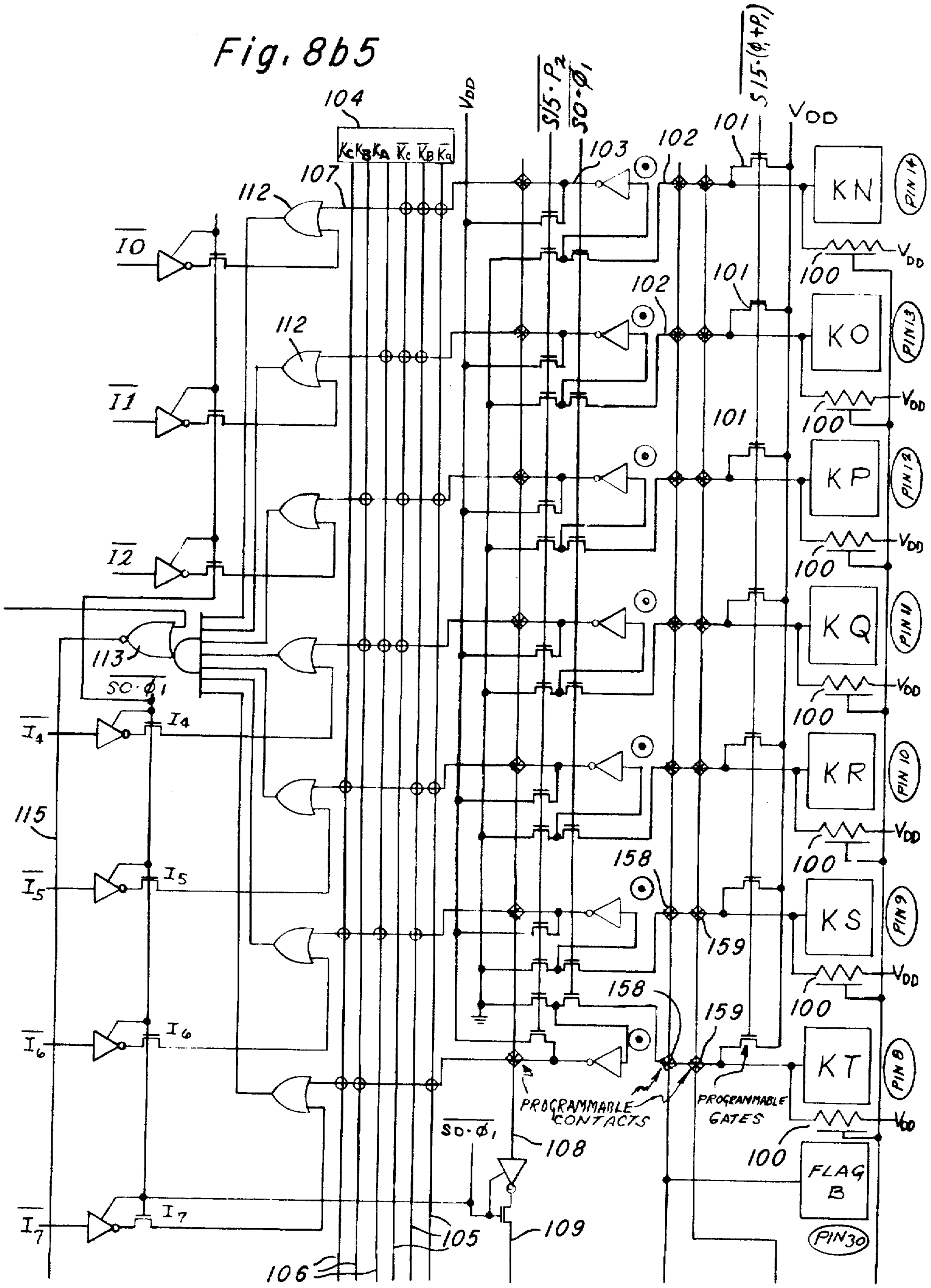

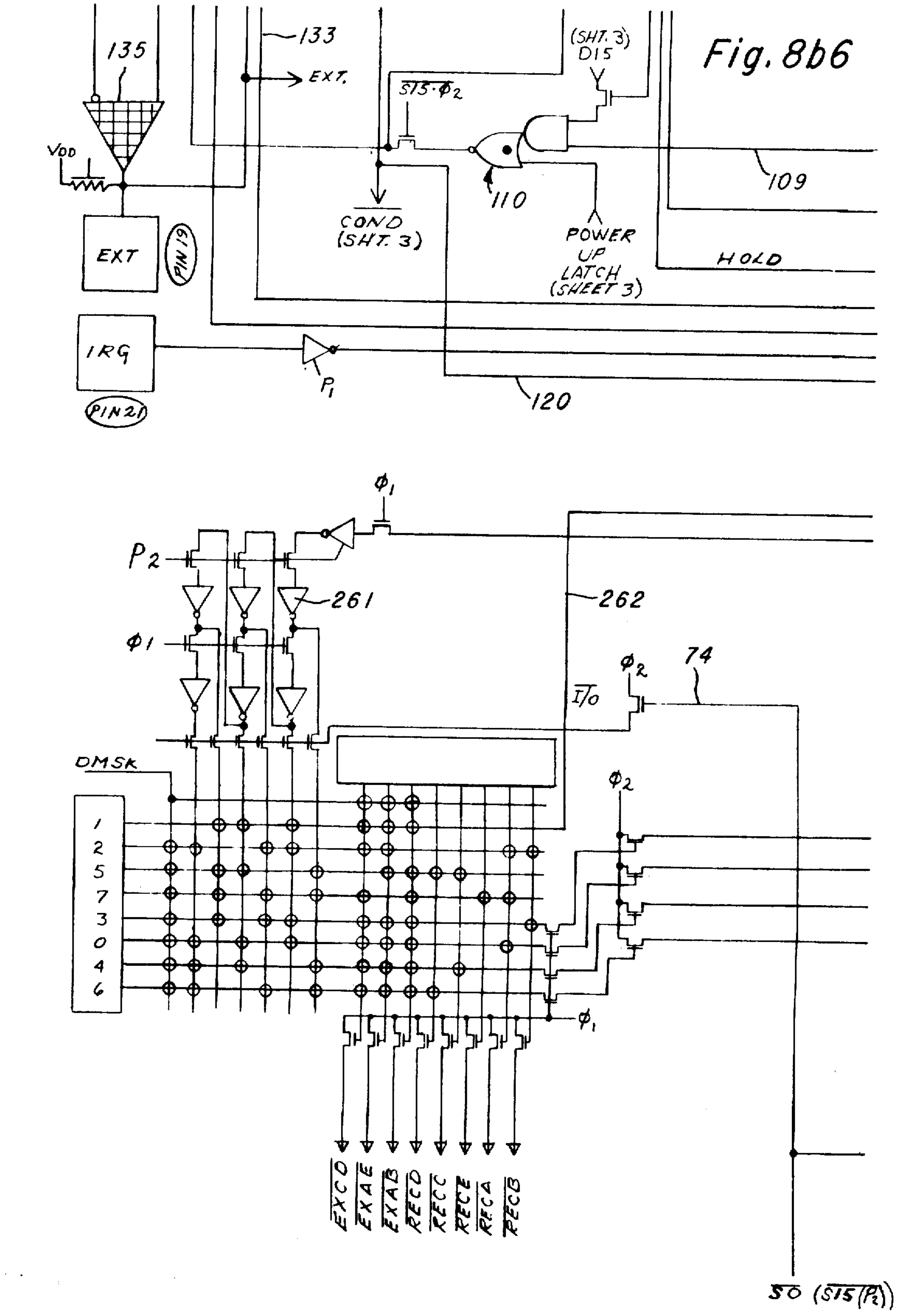
Fig. 8b6

Fig. 8b7
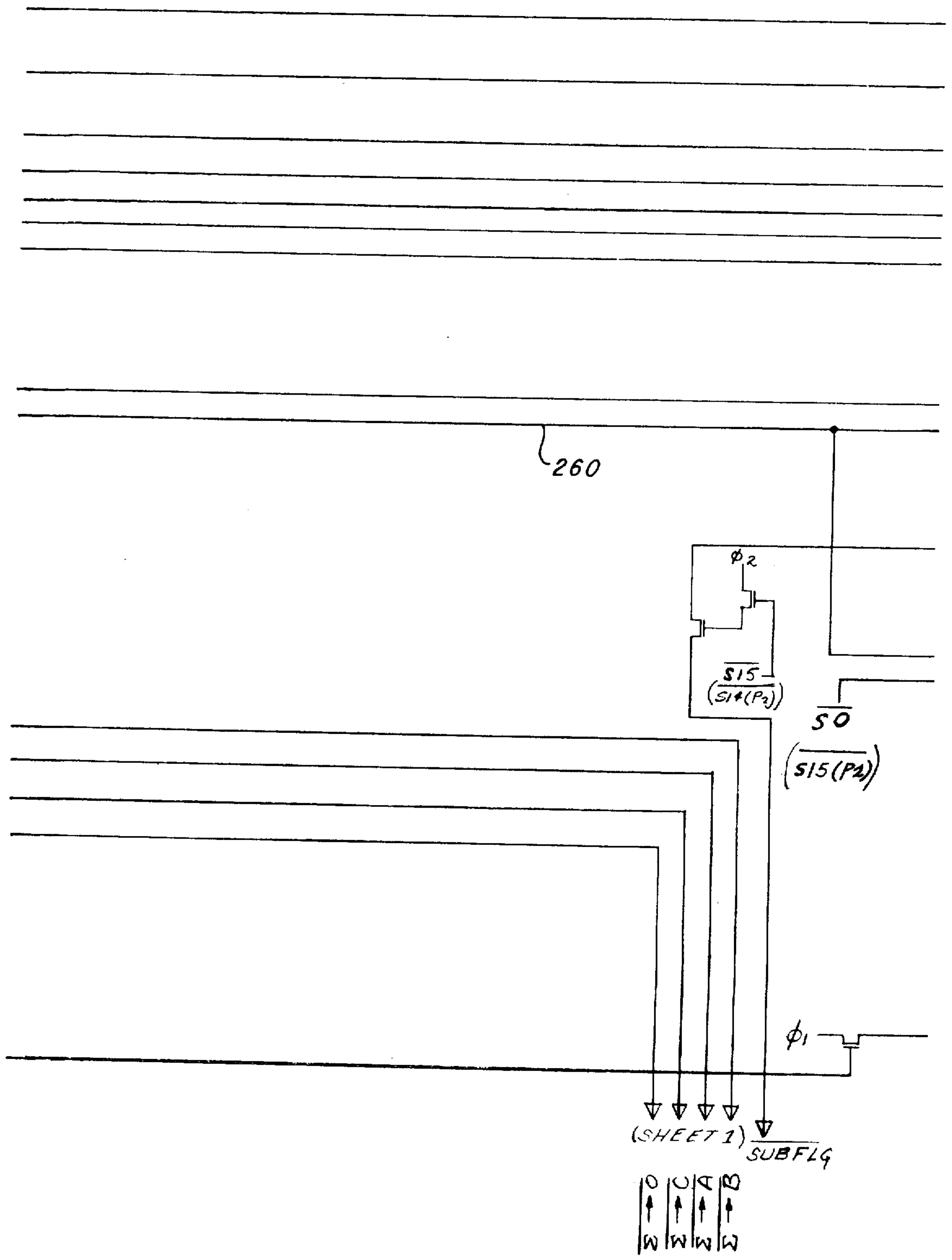

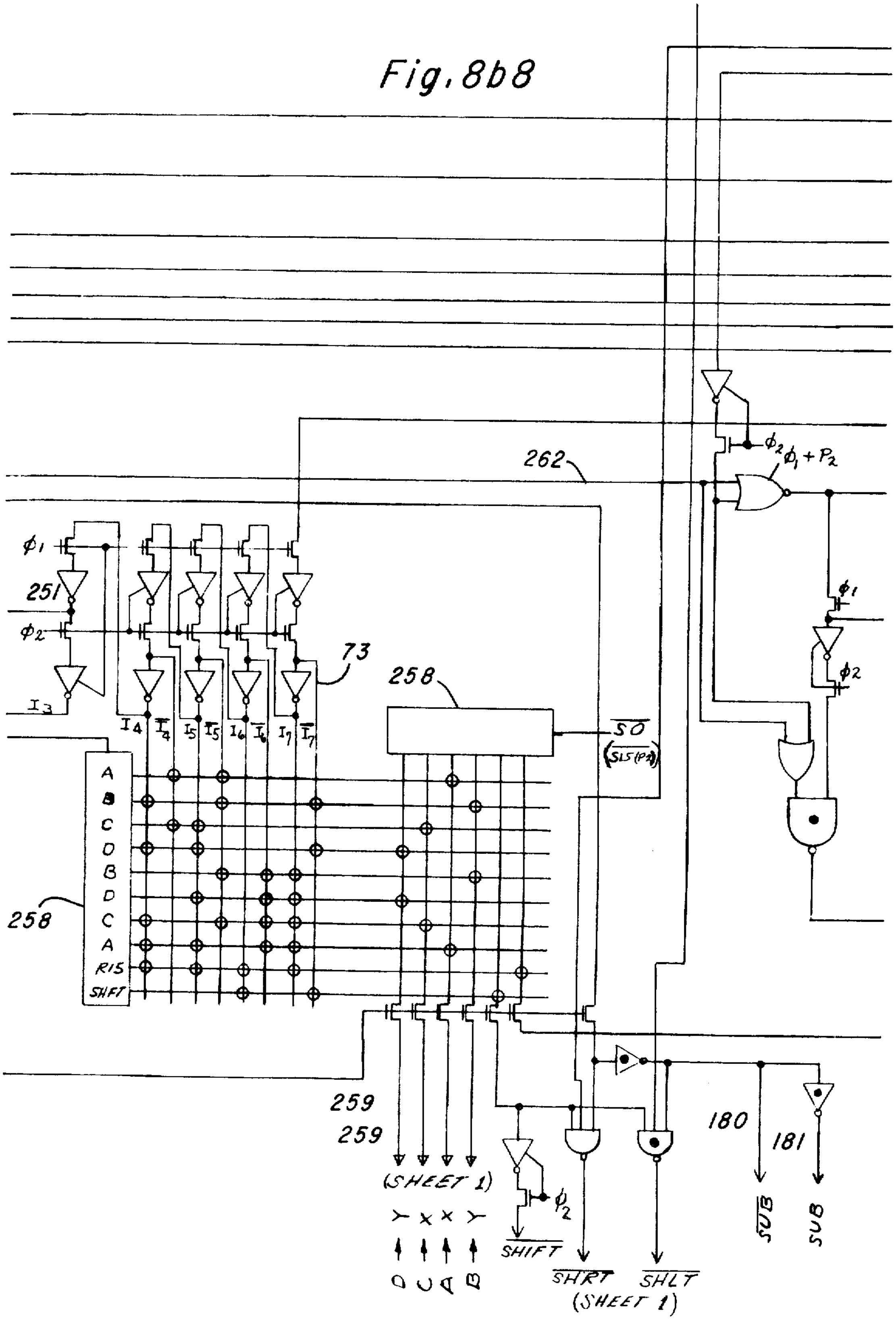
Fig. 8b8

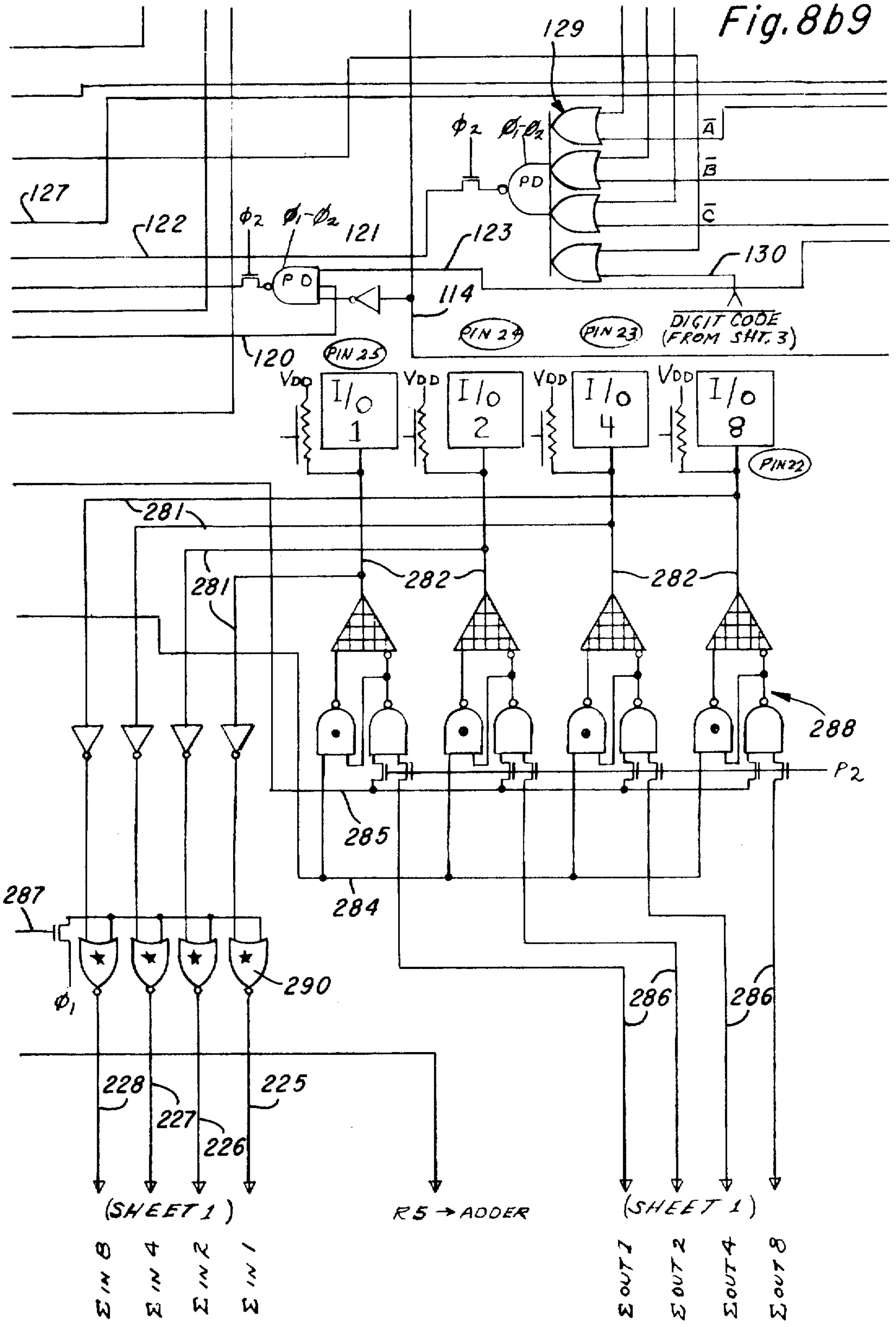
Fig. 8b9

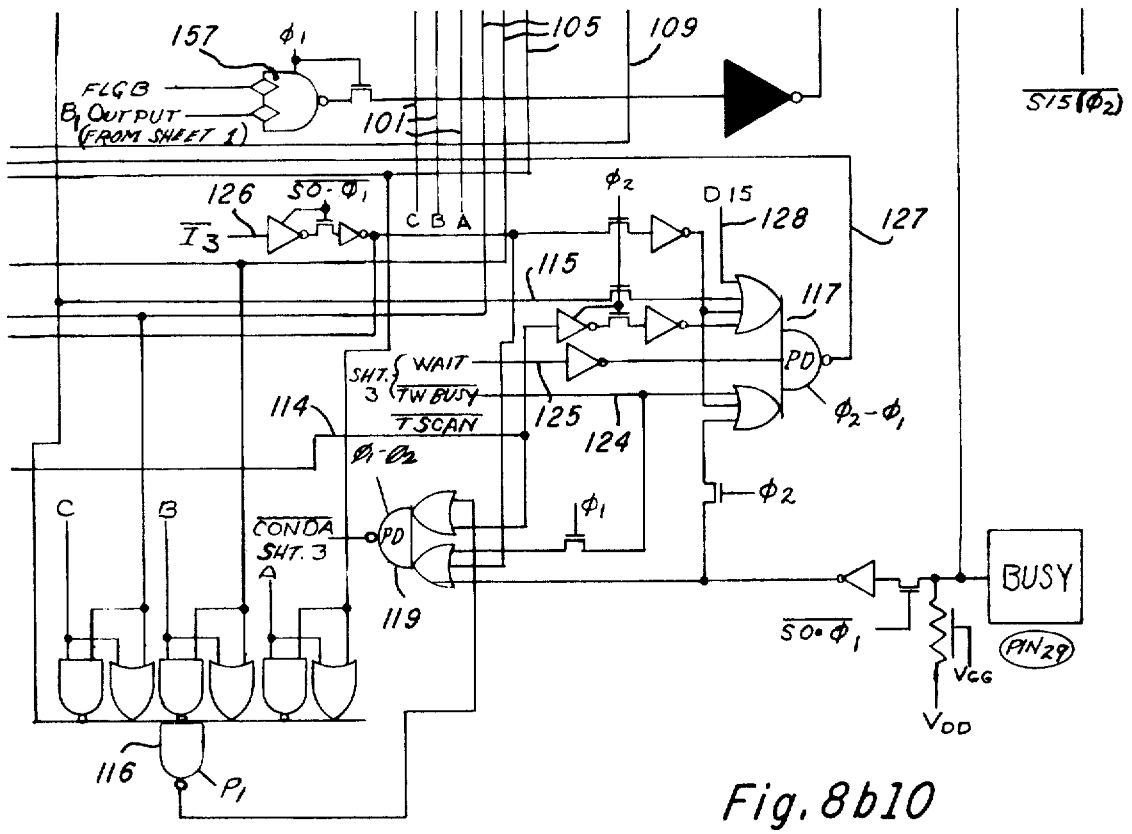
Fig. 8b10

Fig. 8c1
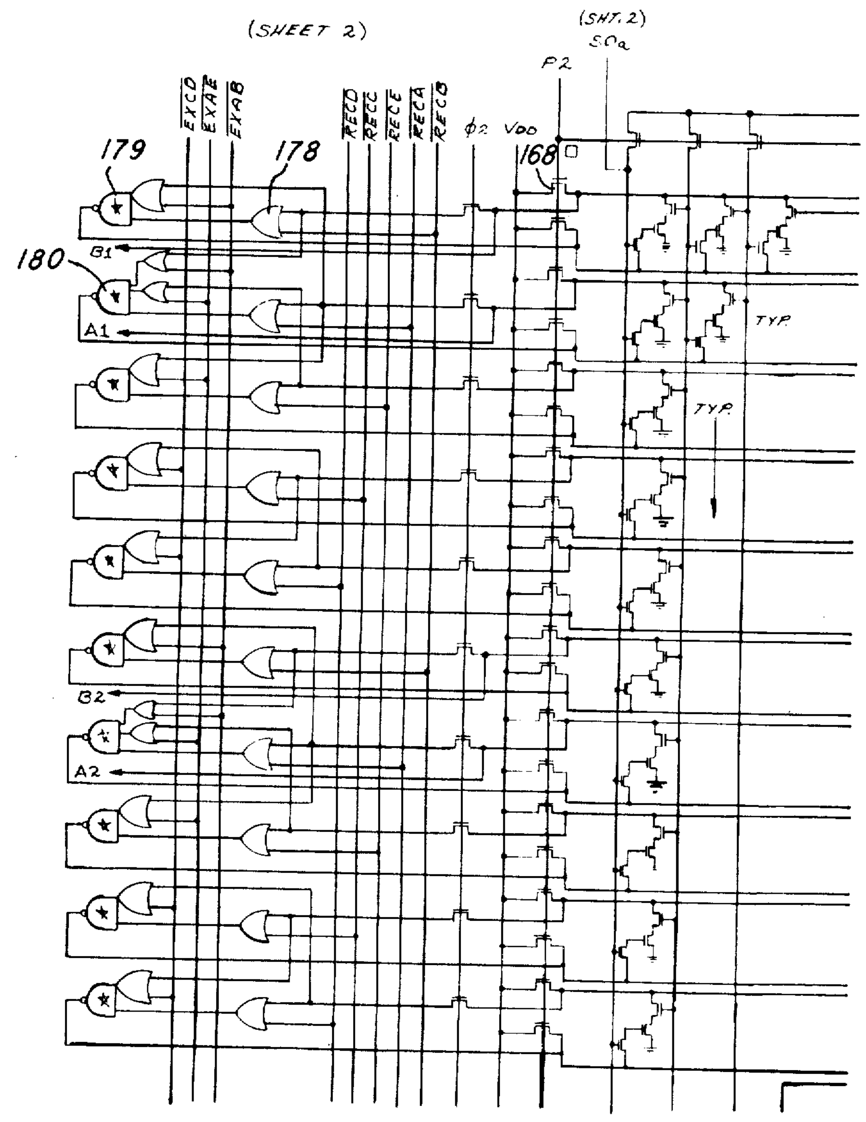

Fig. 8c2
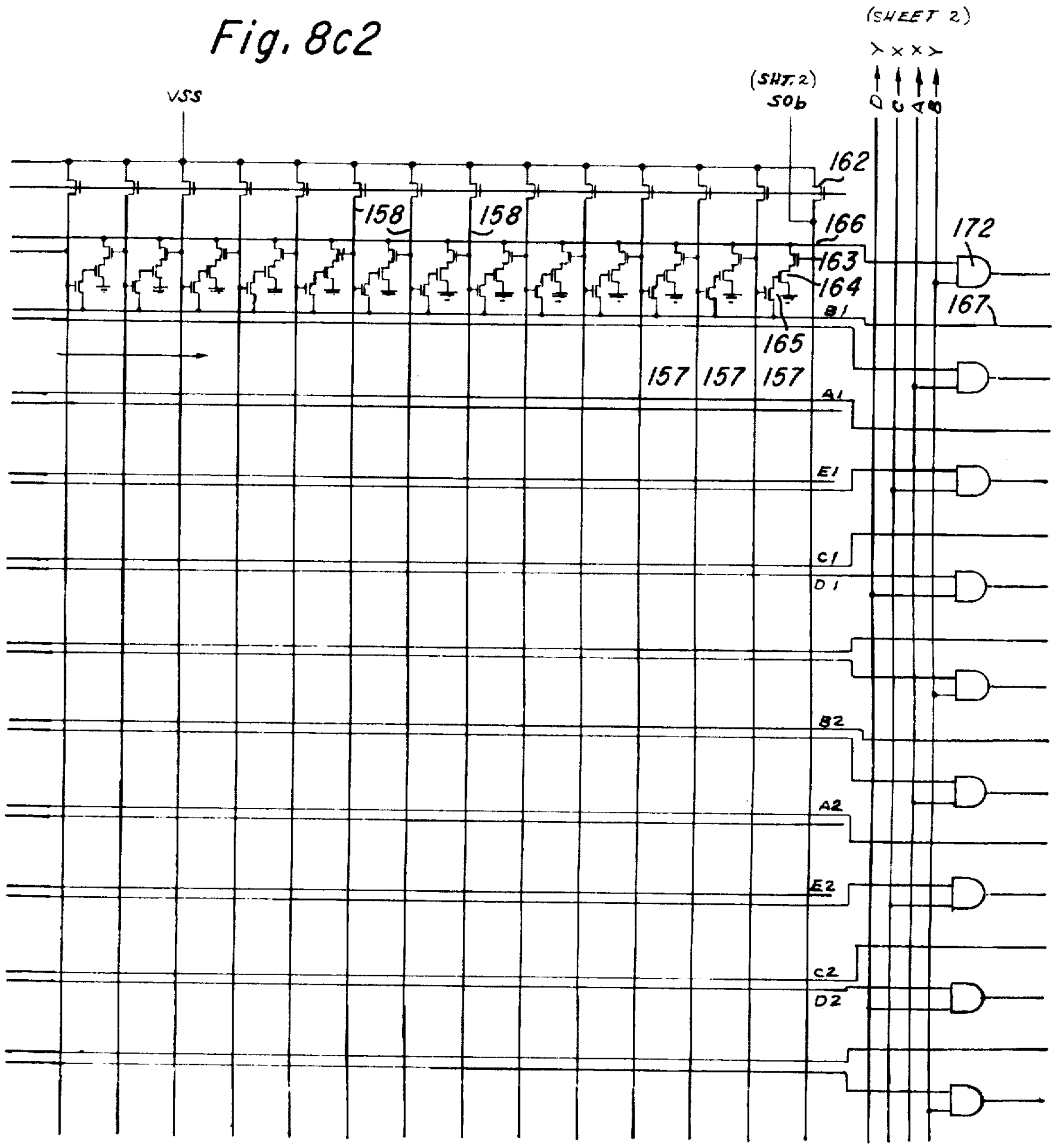

Fig. 8c3
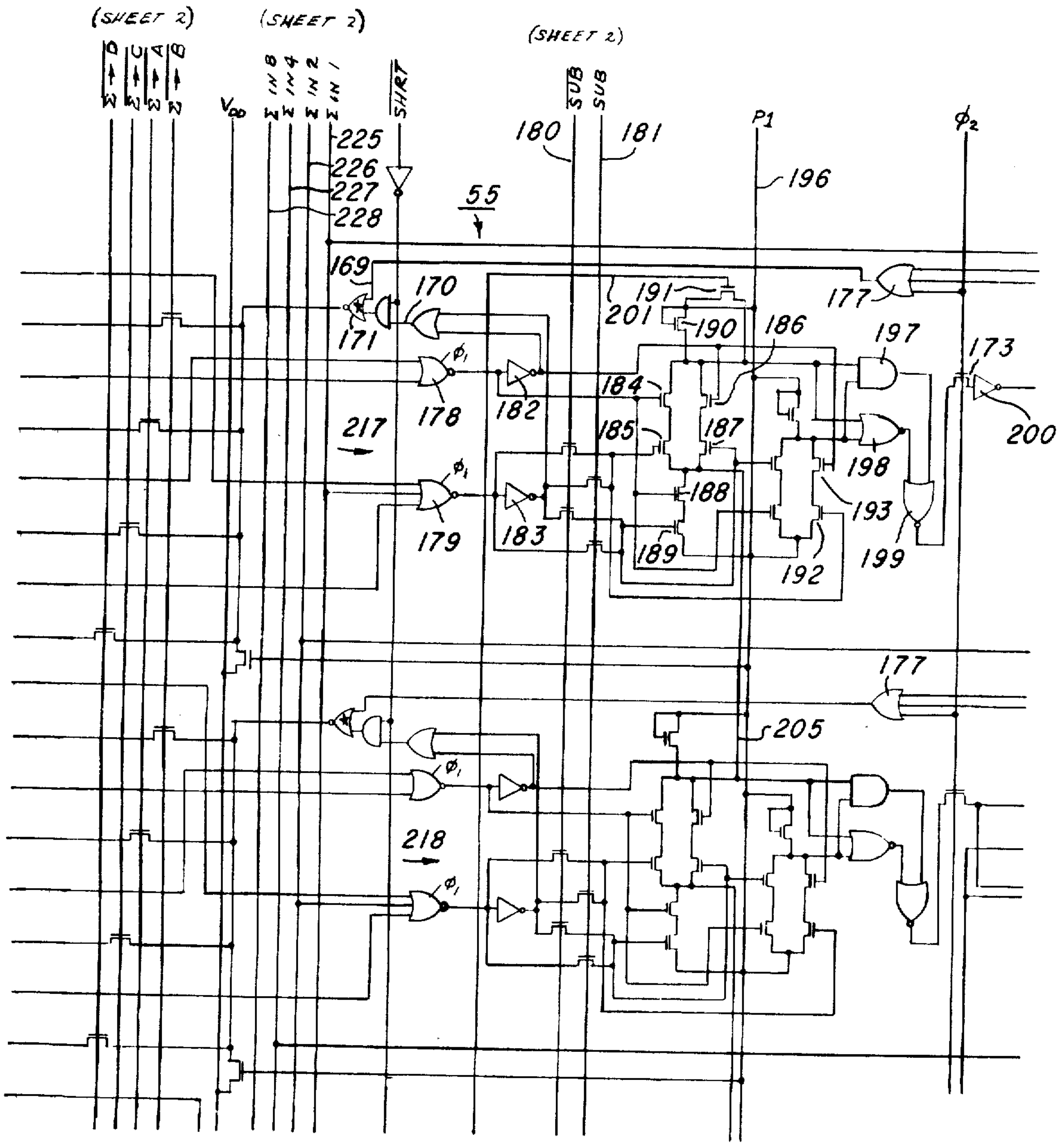

Fig. 8c4
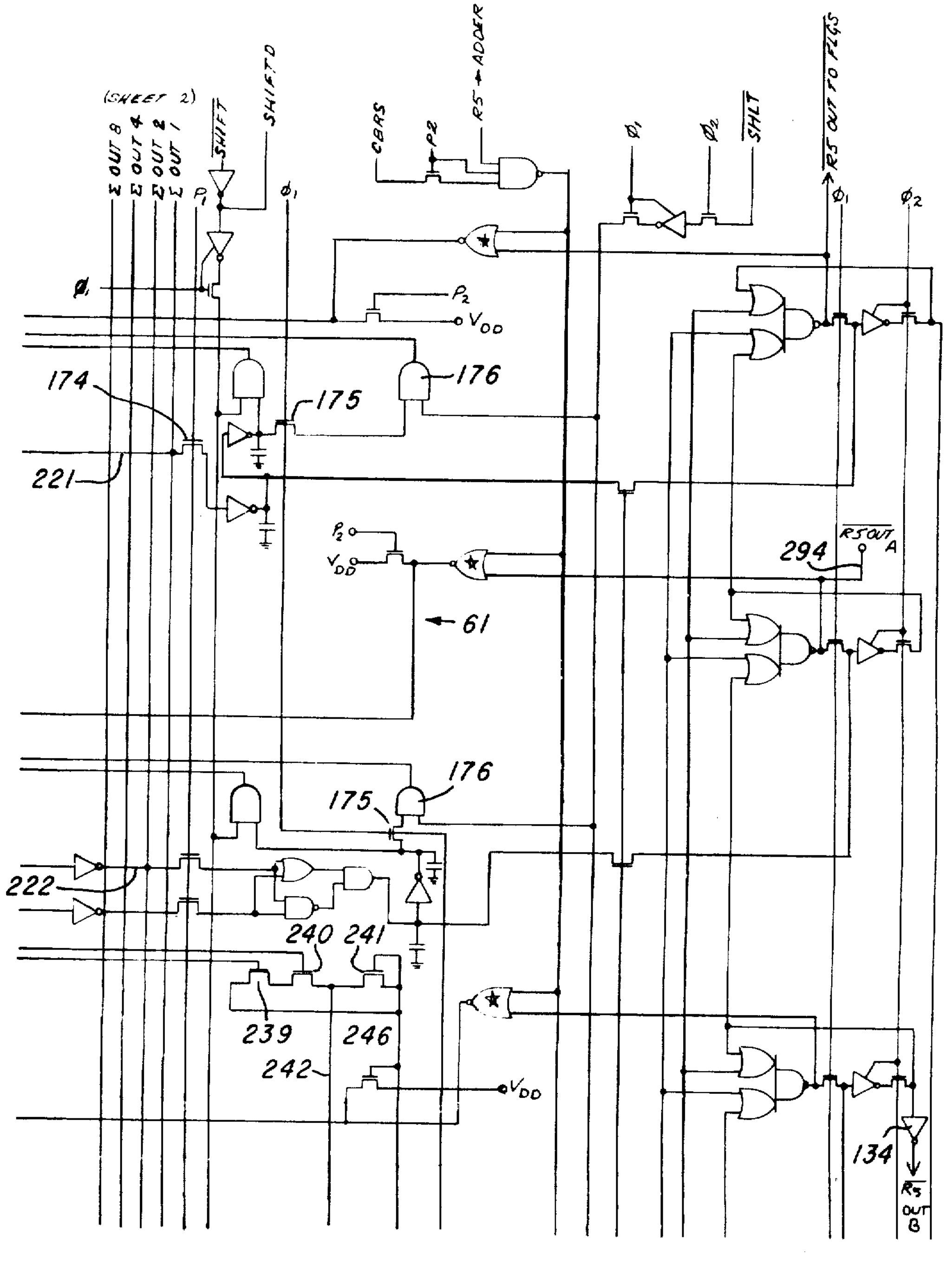

Fig. 8c5
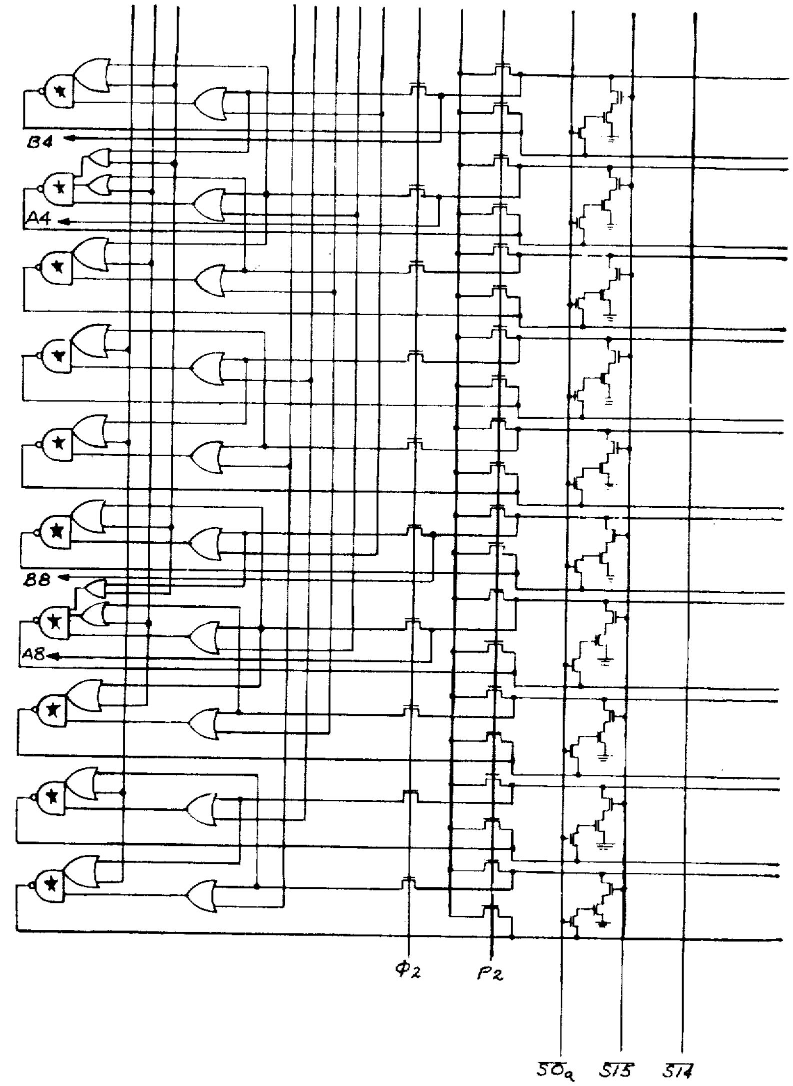

Fig. 8c6
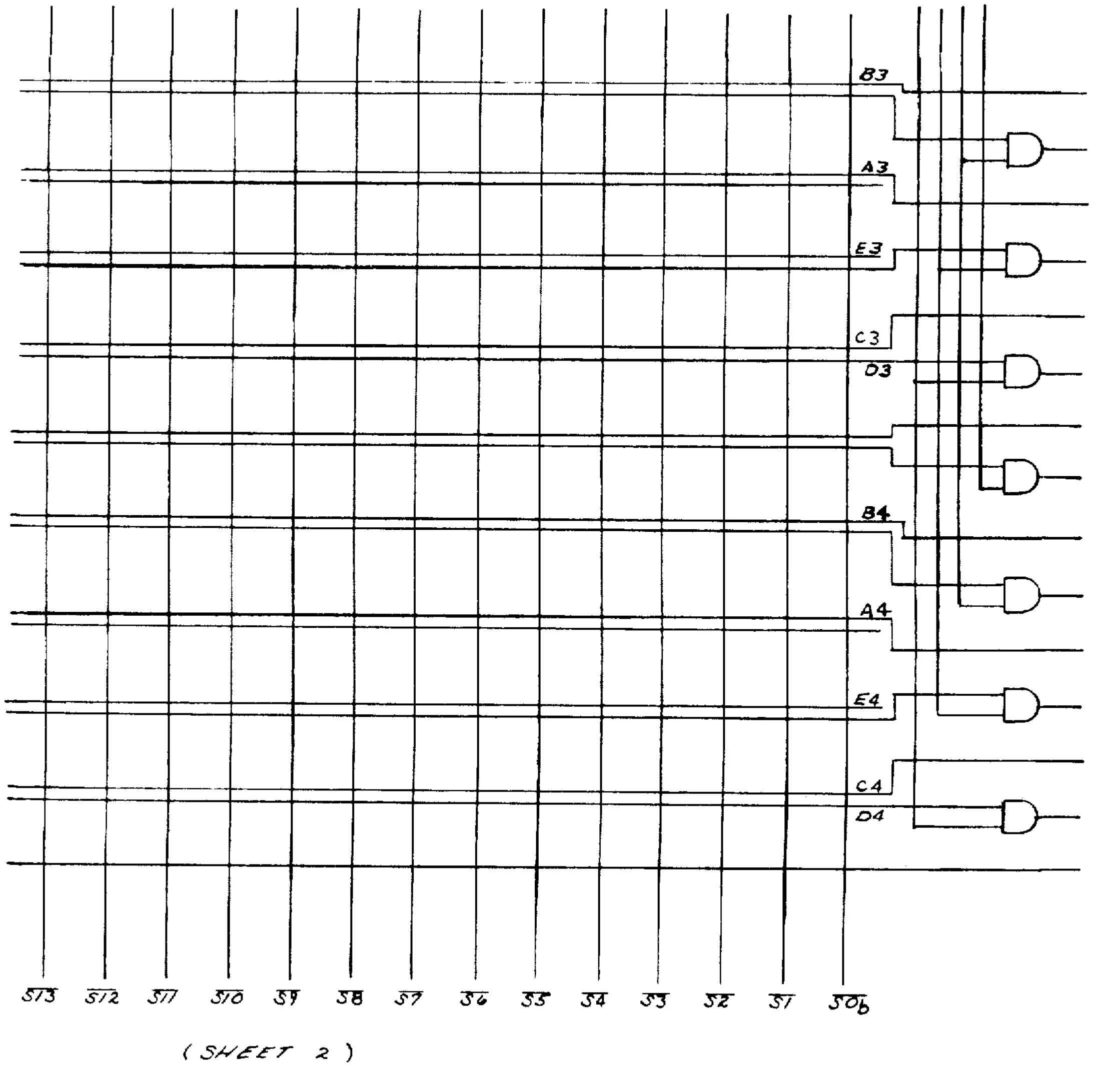

Fig. 8c7
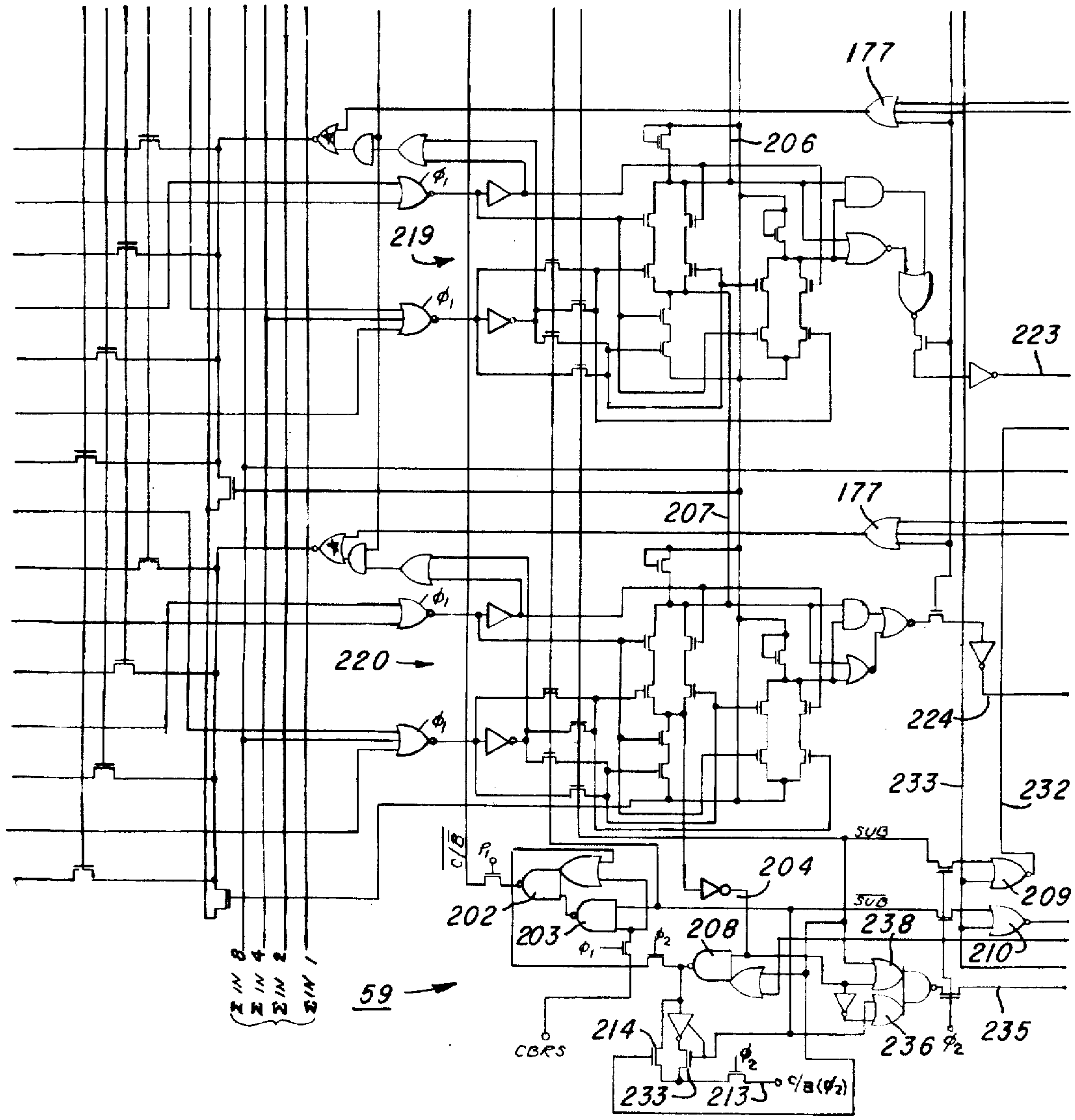

Fig. 8c8
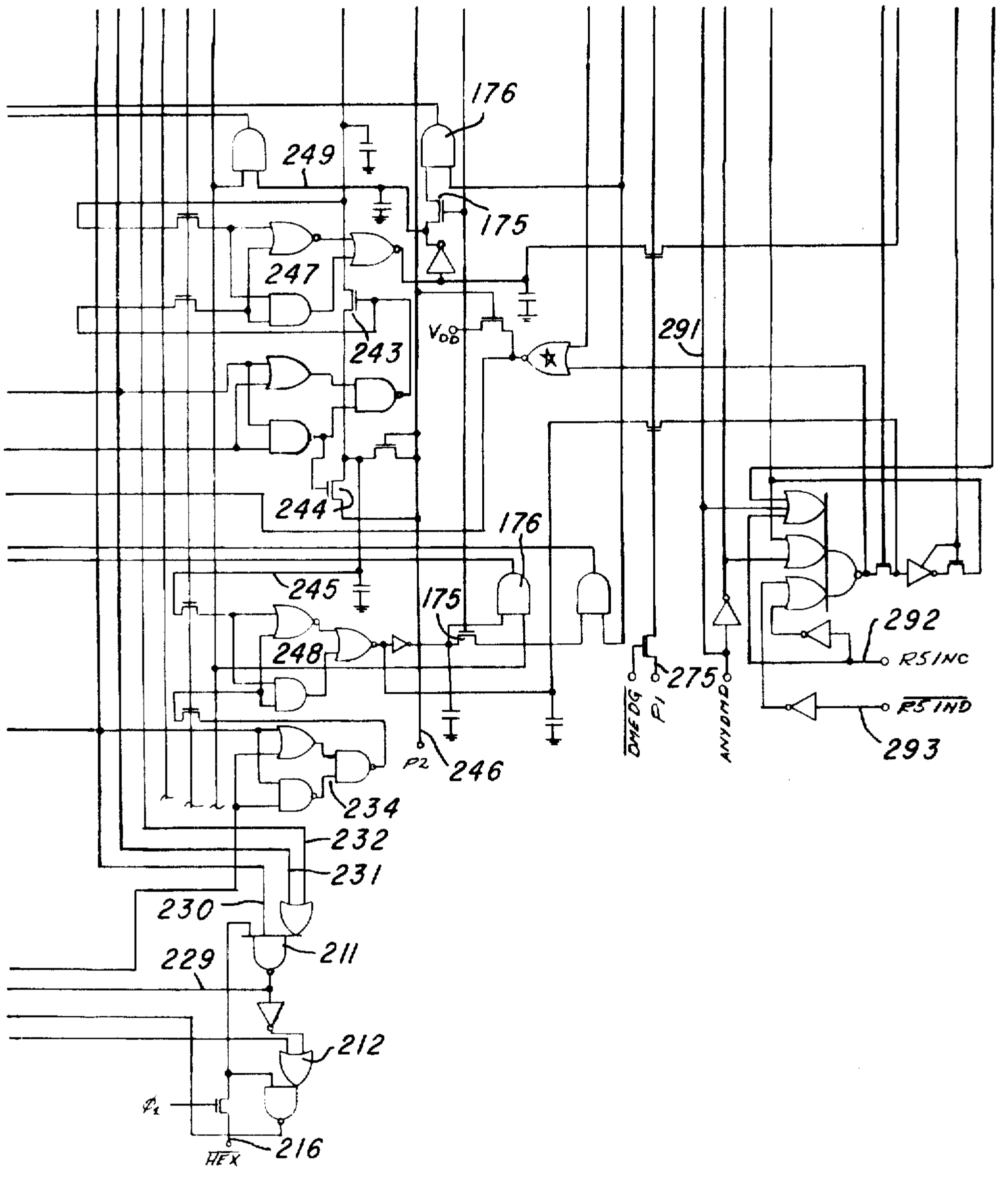

Fig. 8d1
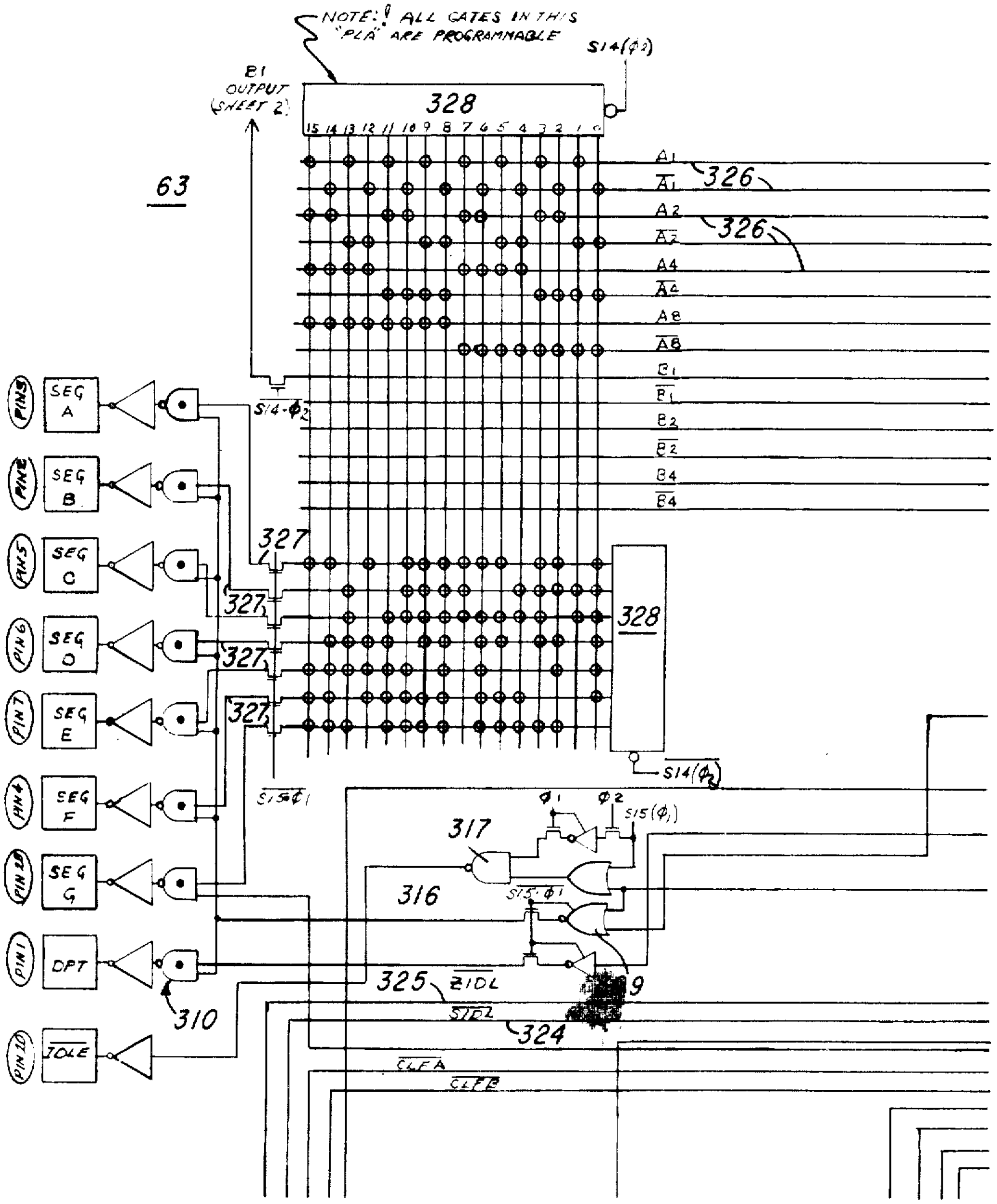

Fig. 8d2
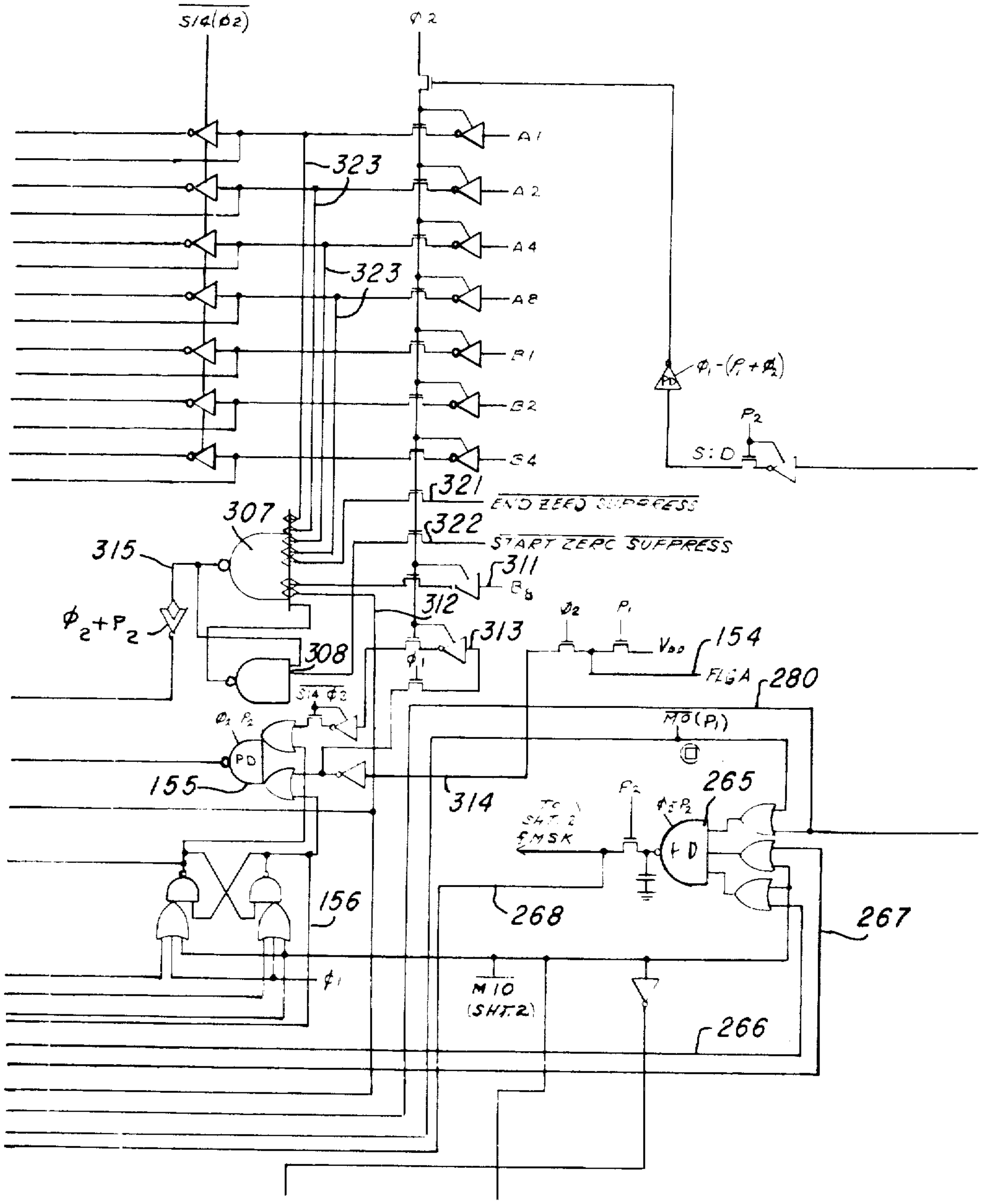

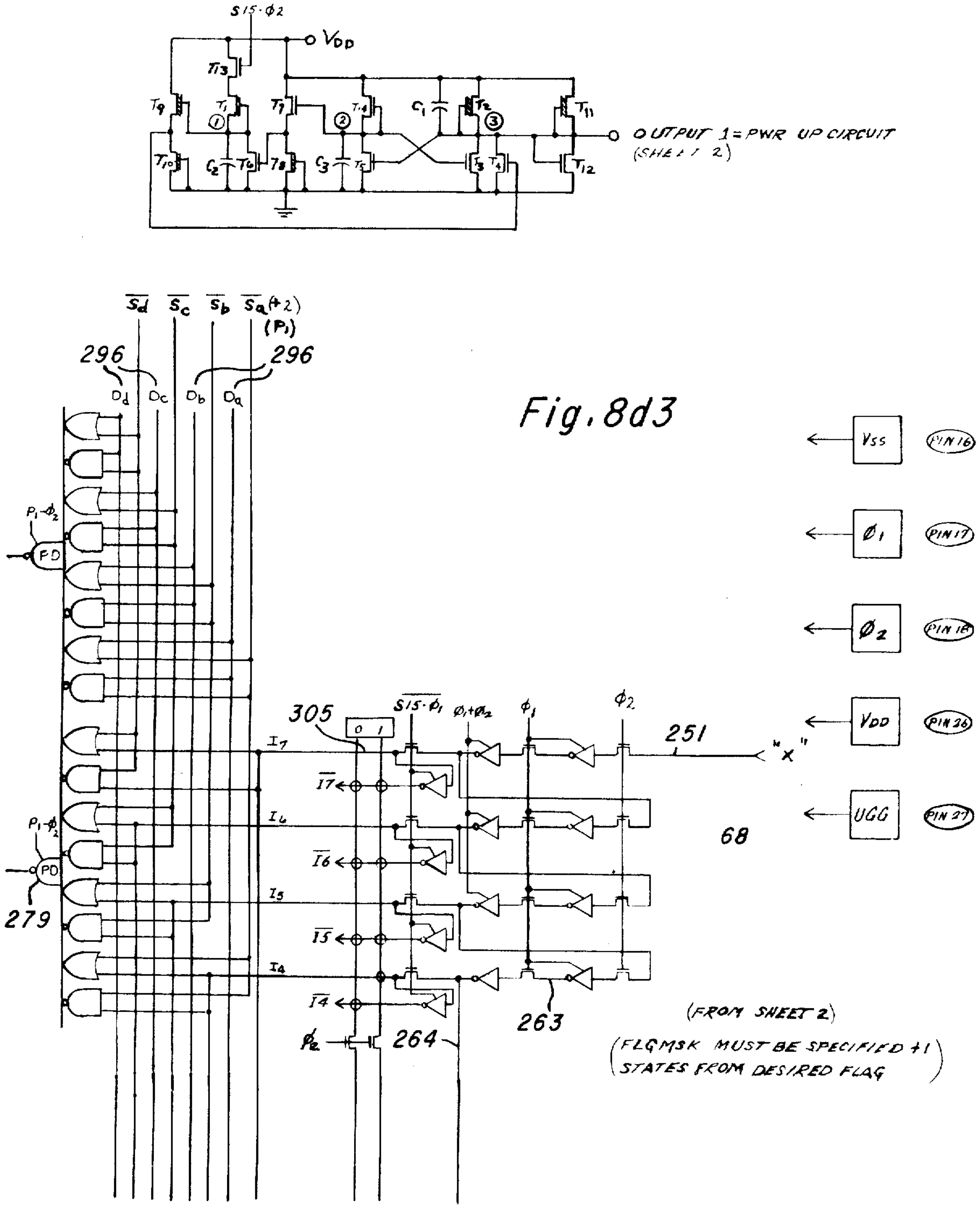
Fig. 8d3

Fig. 8d4
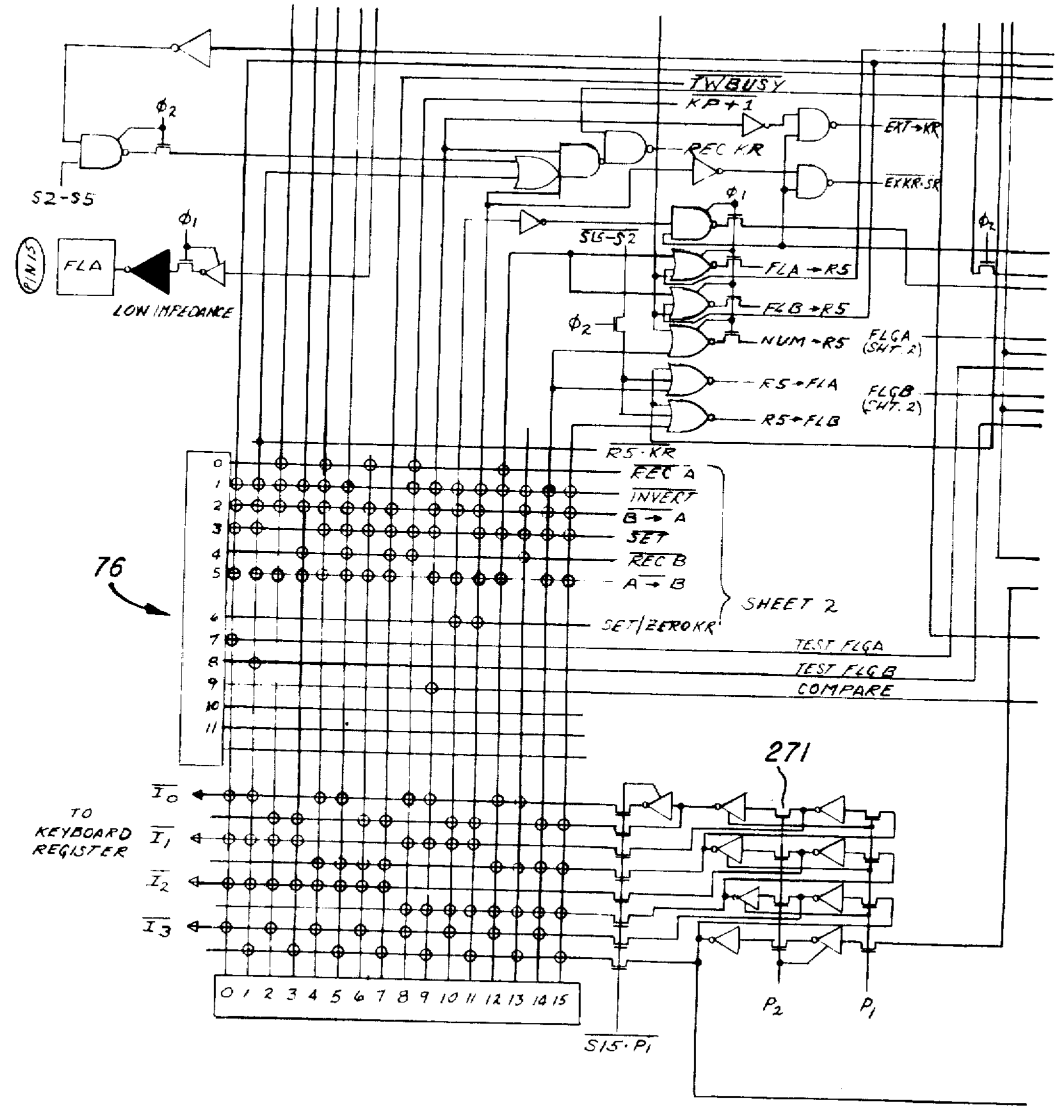

Fig. 8d5
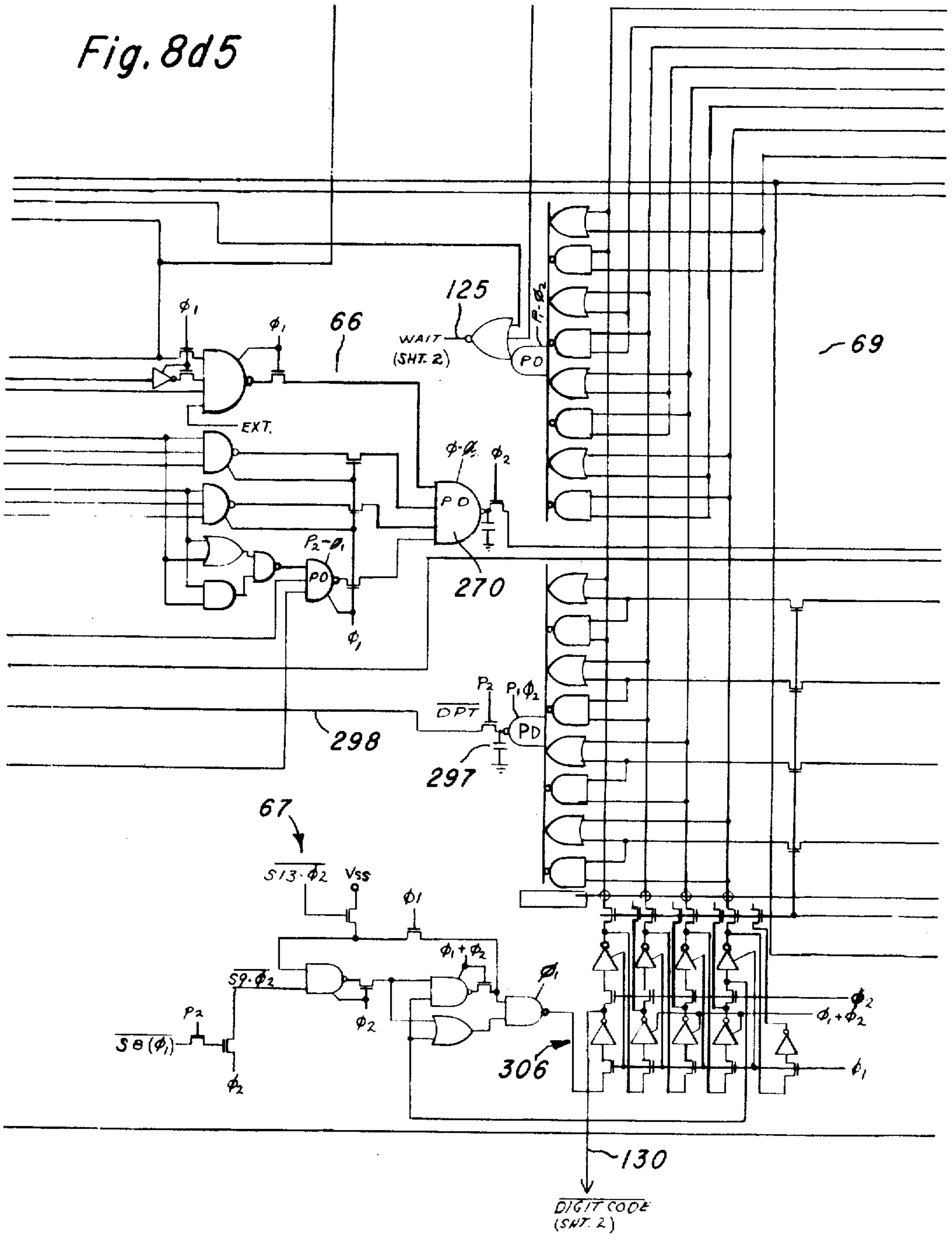

Fig. 8d6
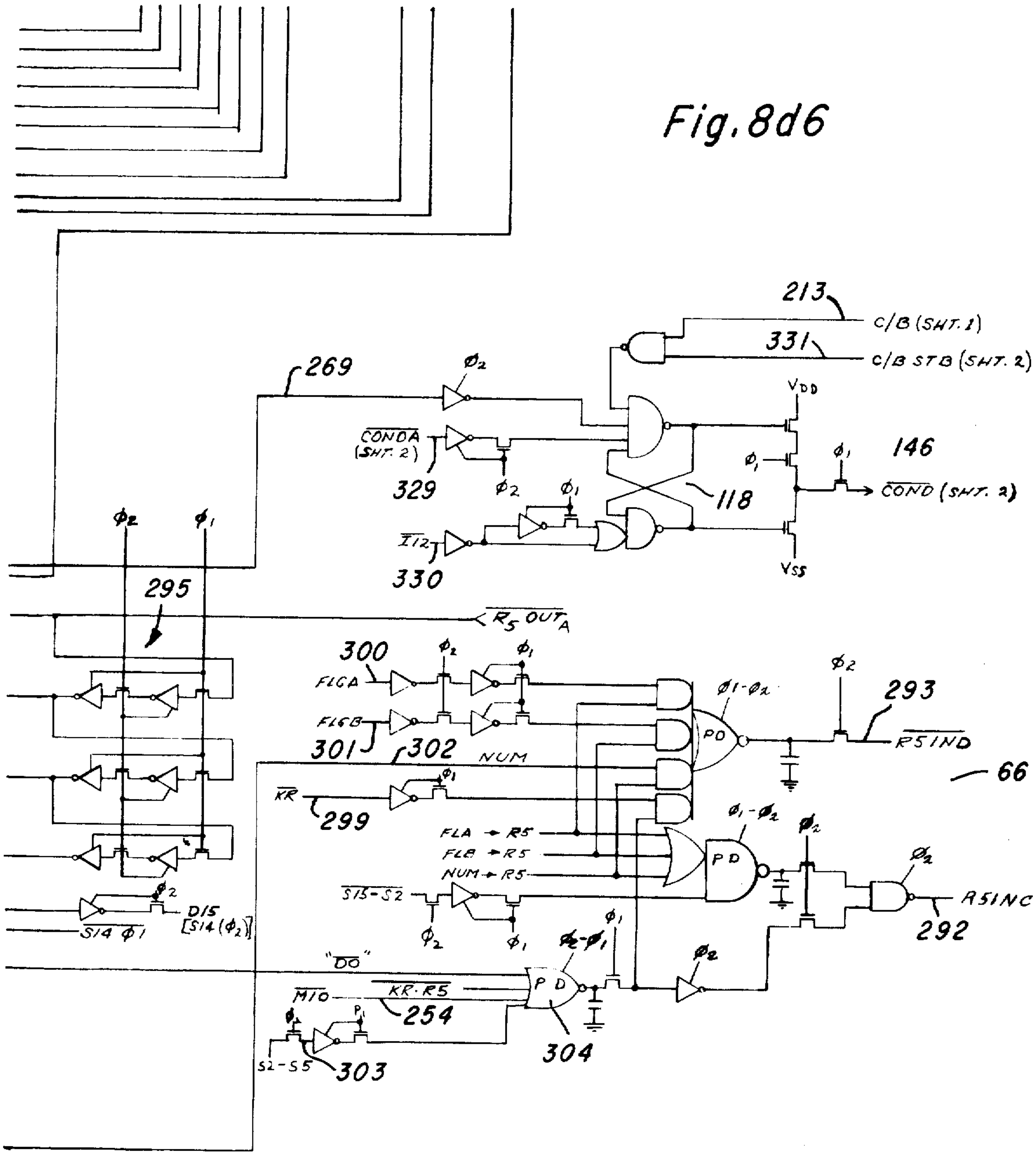

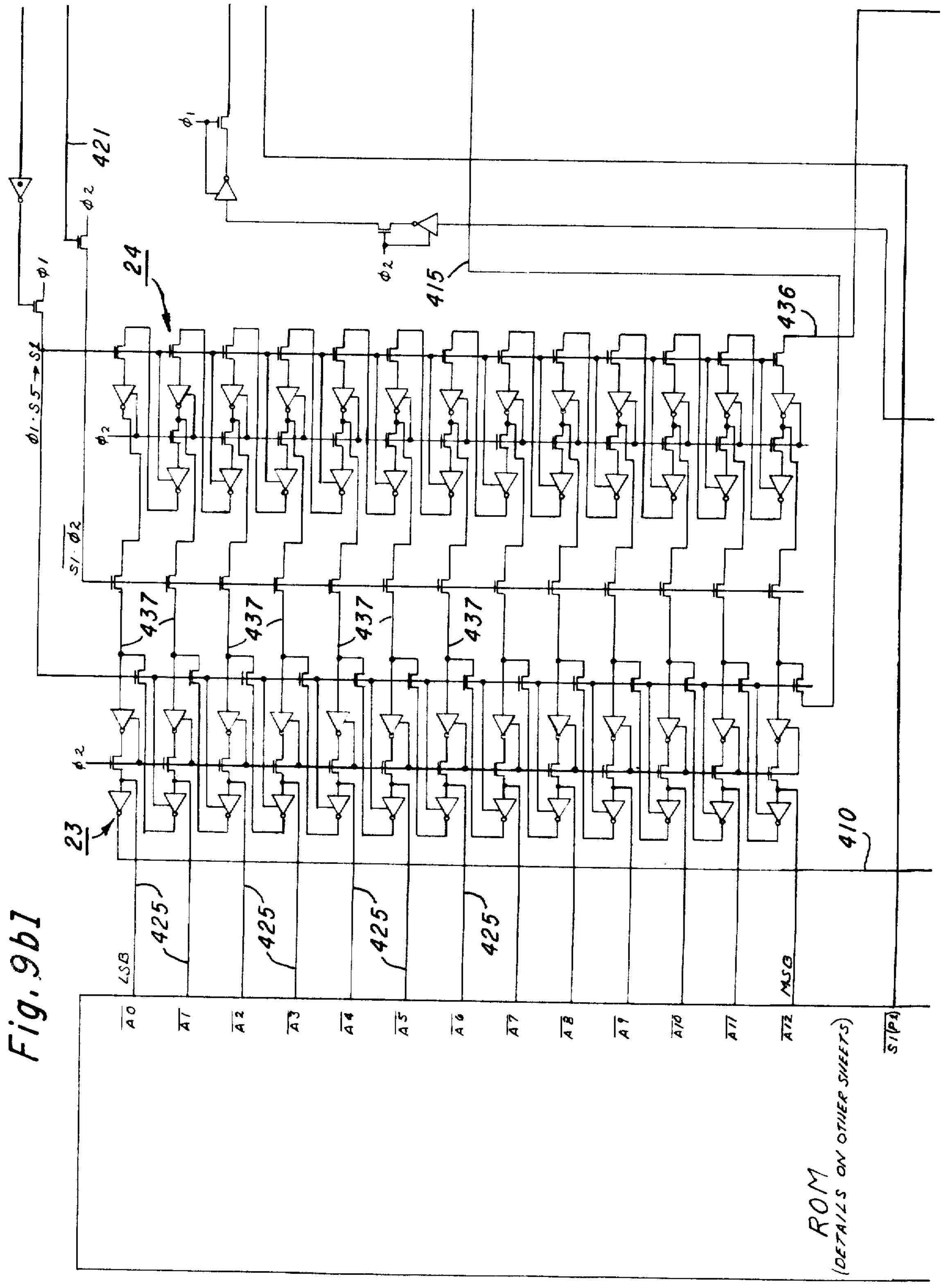
Fig. 9b1

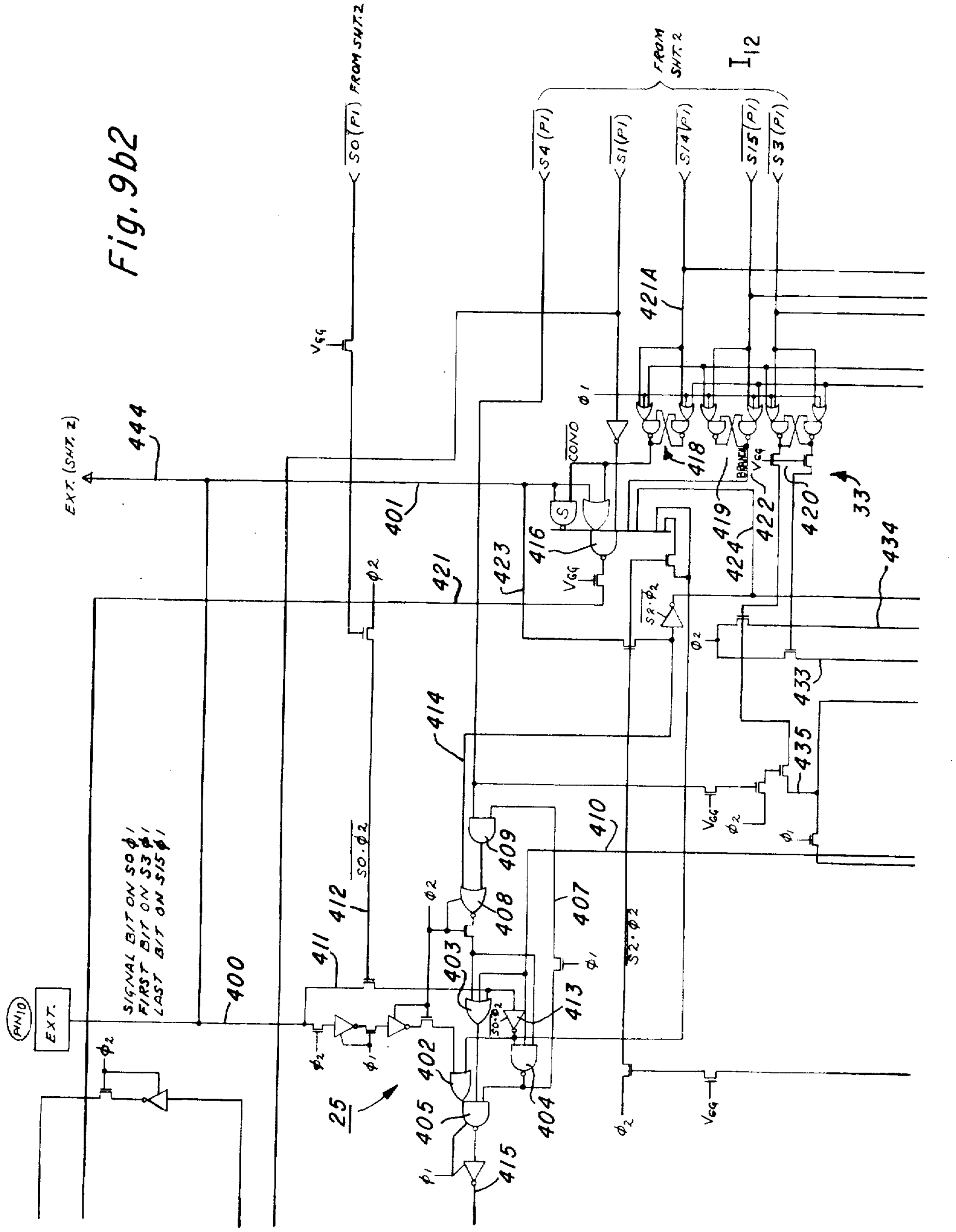
Fig. 9b2

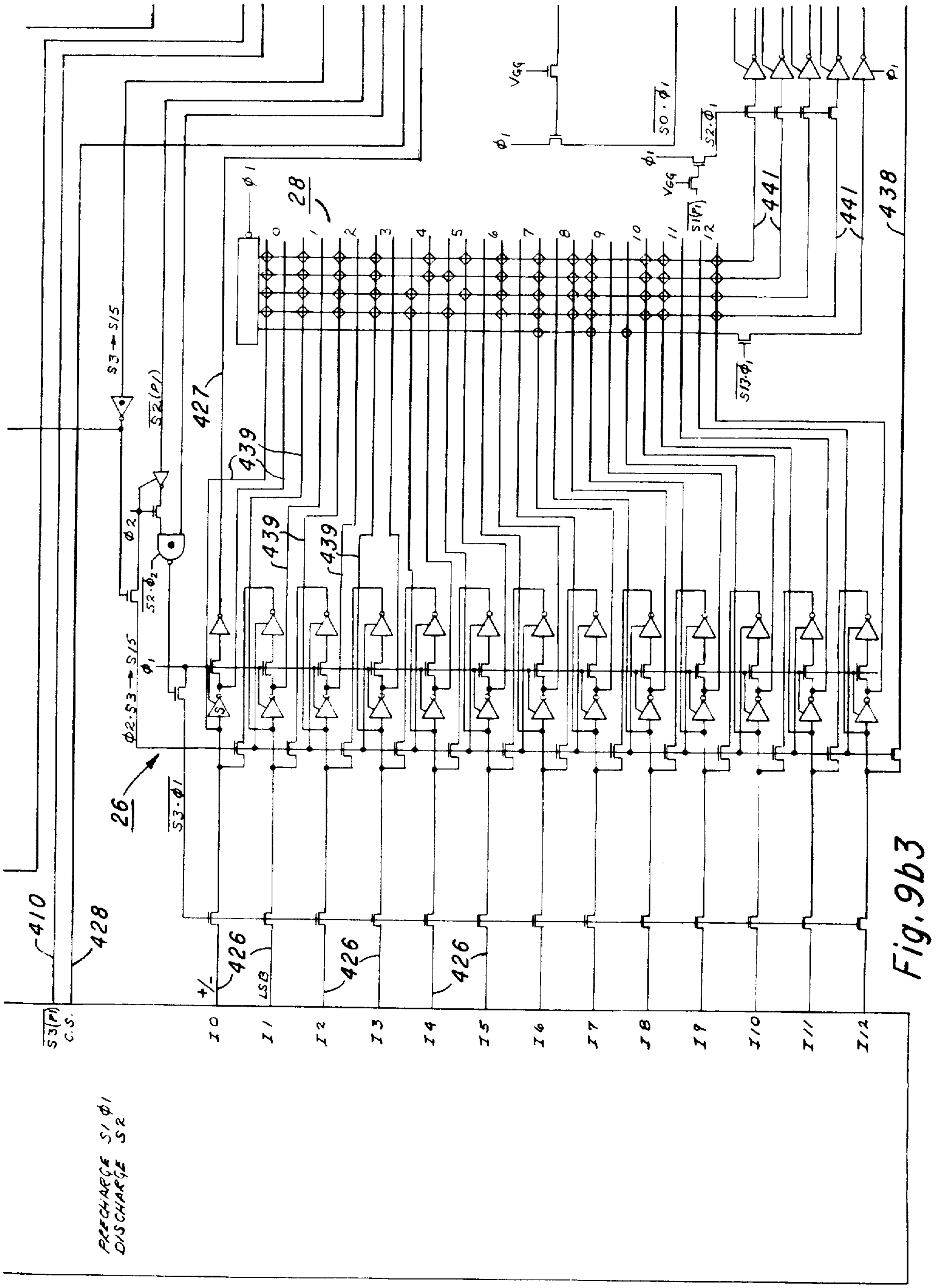
Fig. 9b3

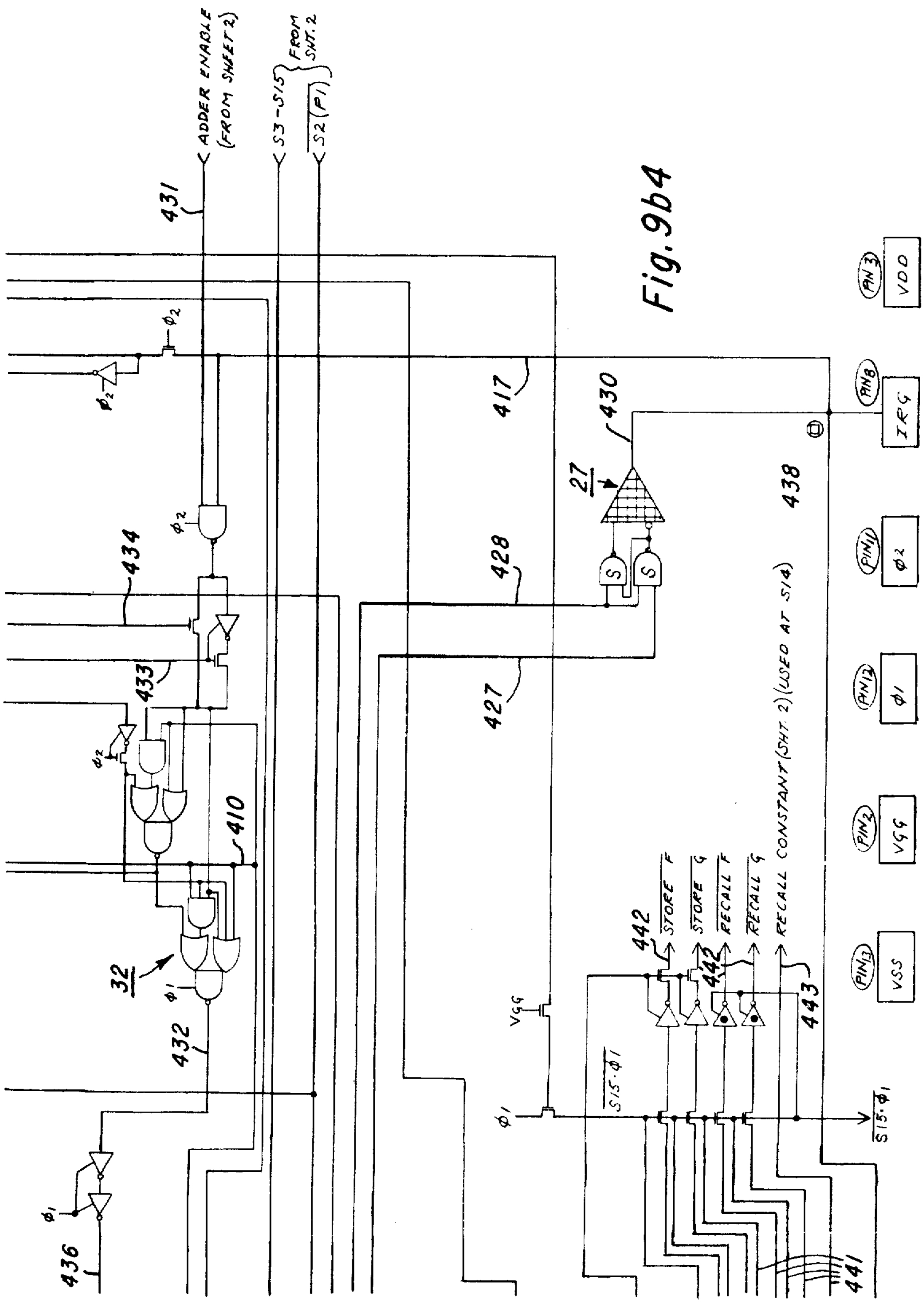
Fig. 9b4

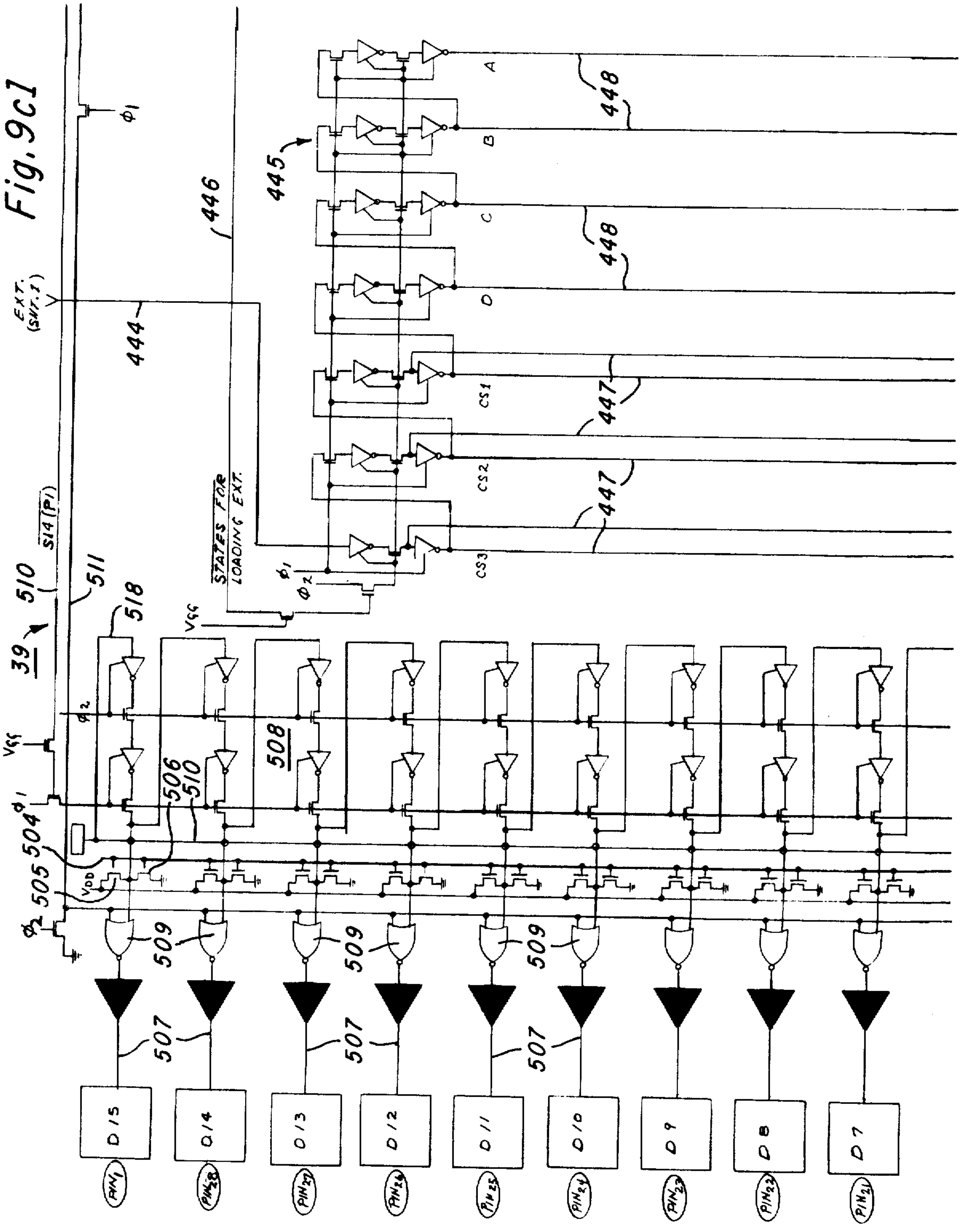
Fig. 9c1

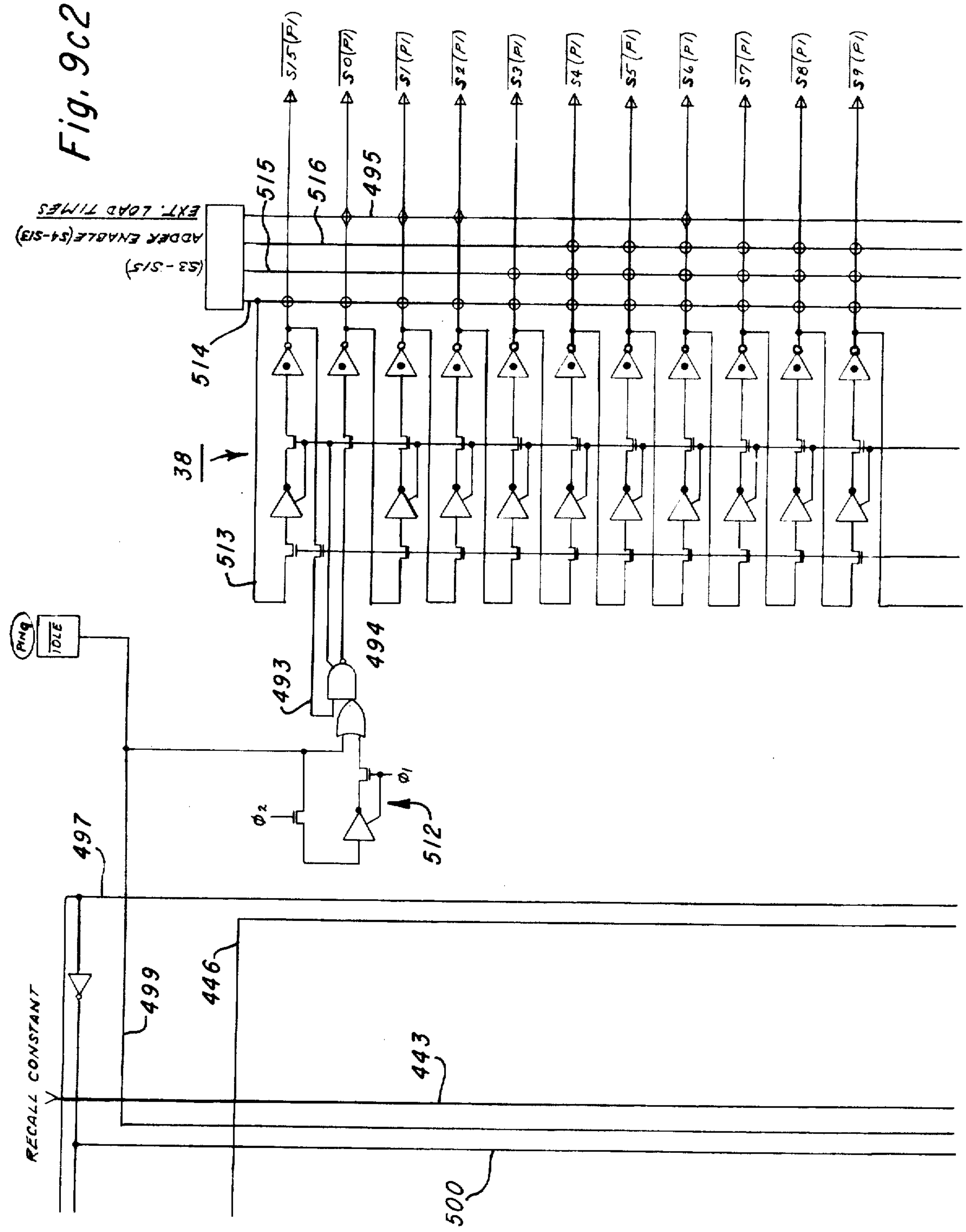
Fig. 9c2

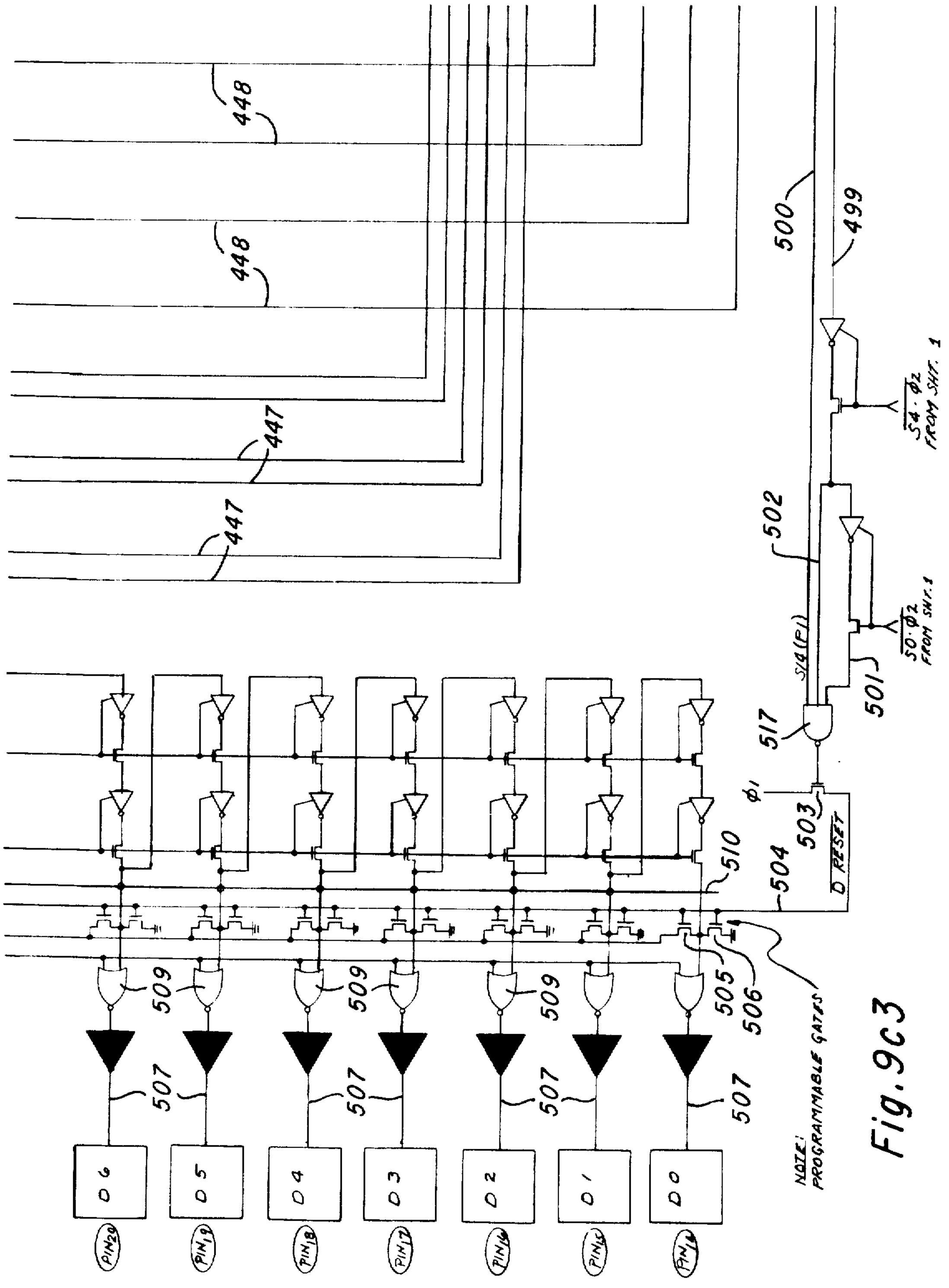
Fig. 9c3

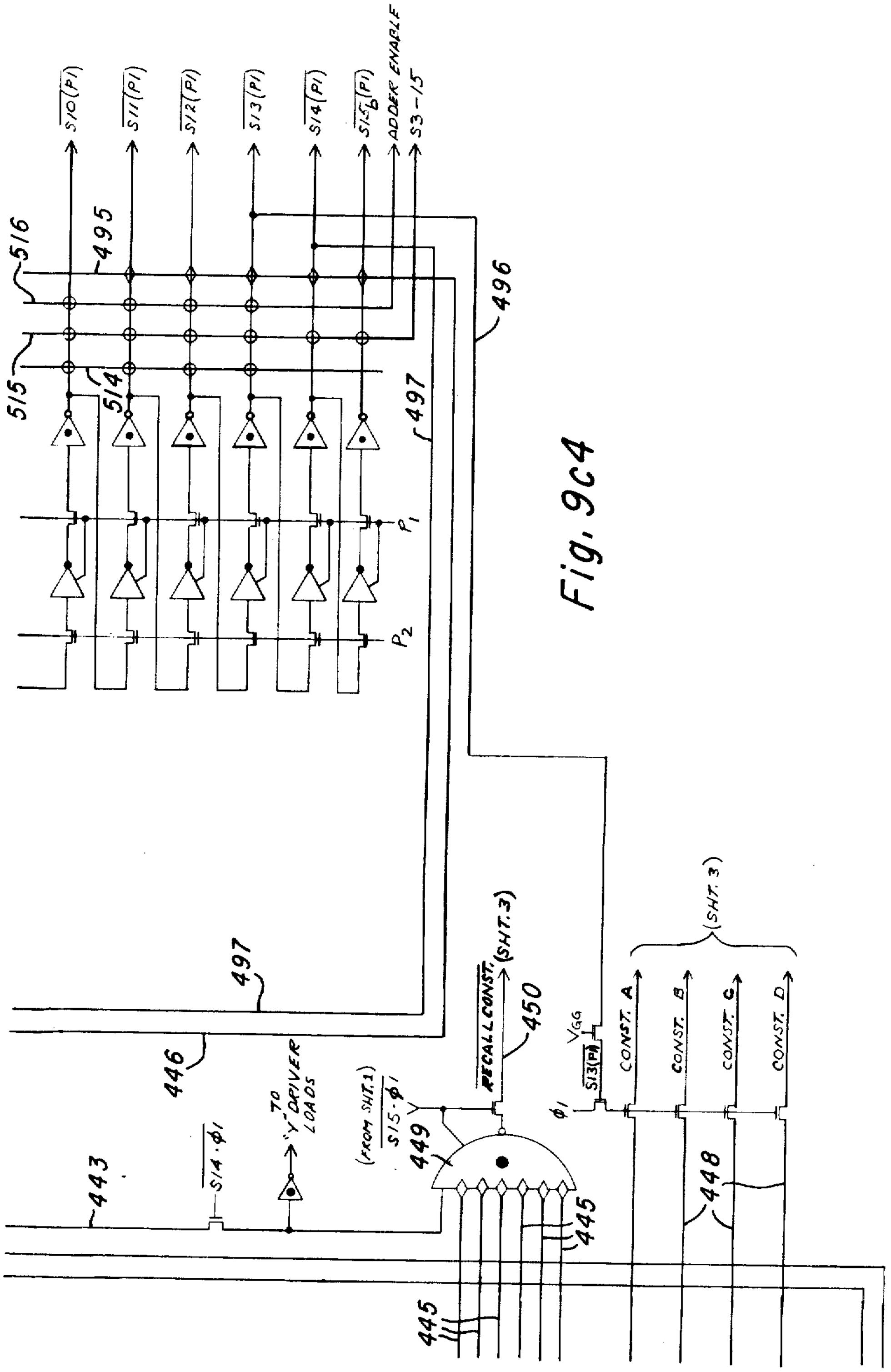
Fig. 9c4

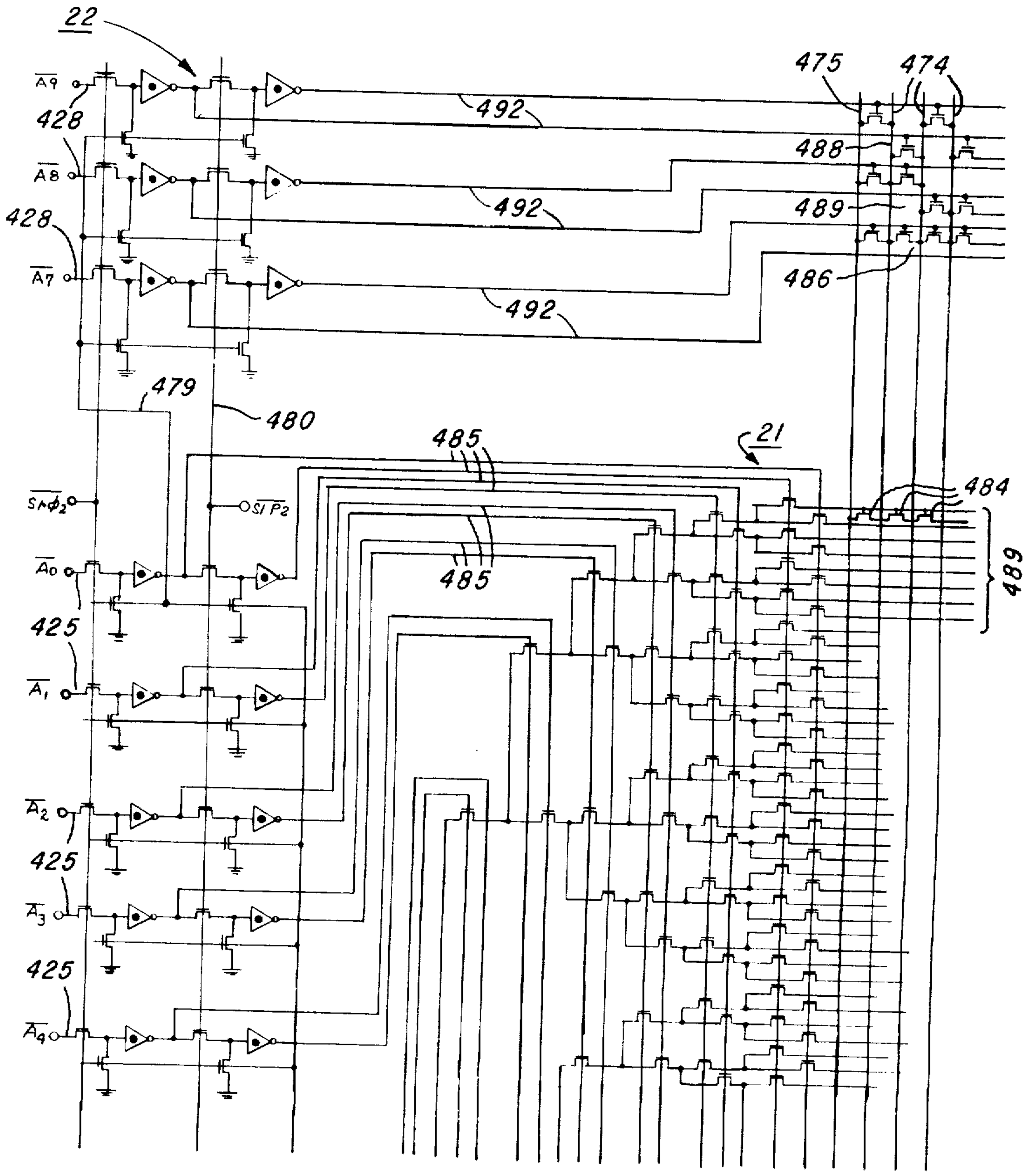
Fig. 9d1

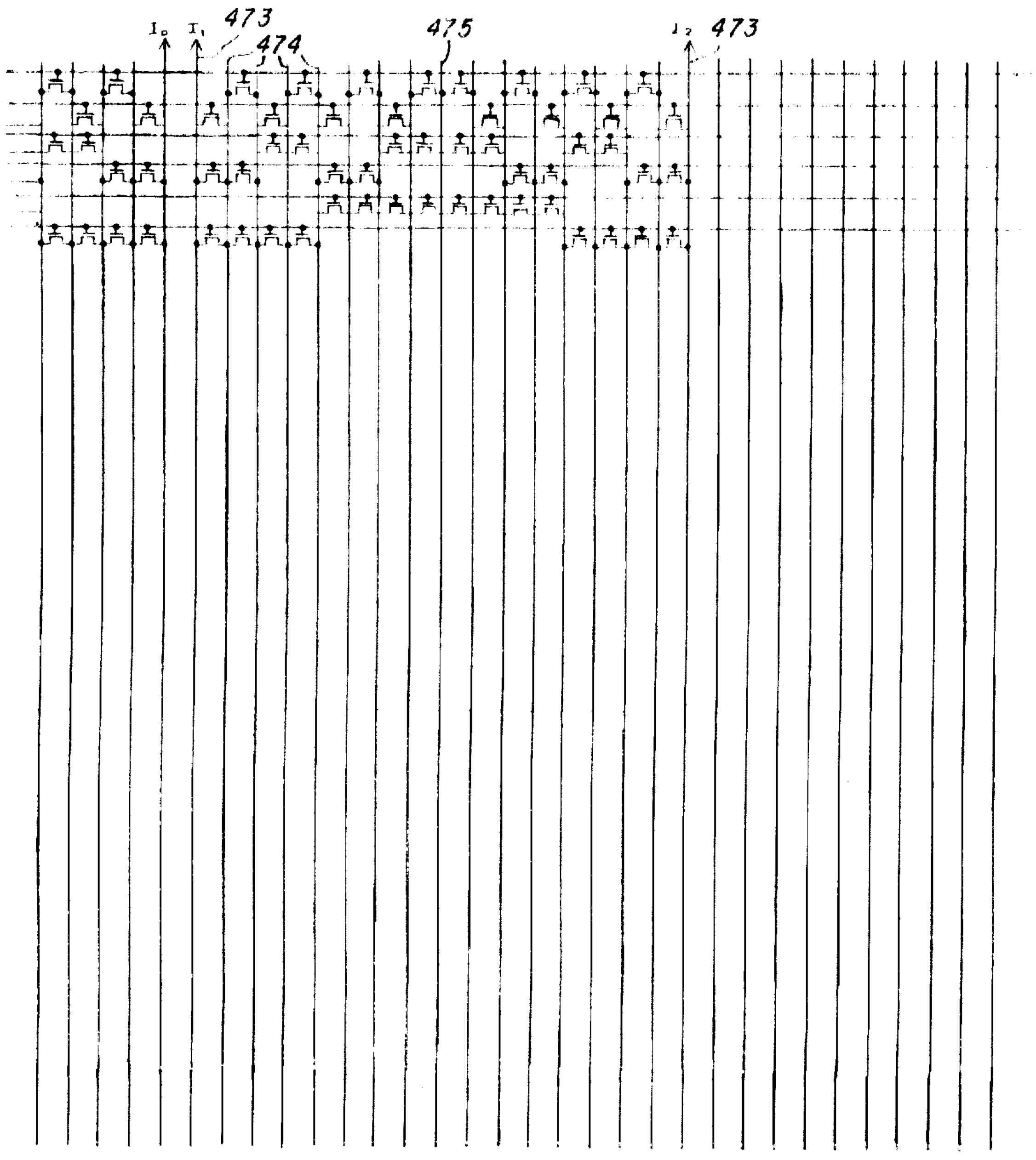
Fig. 9d2

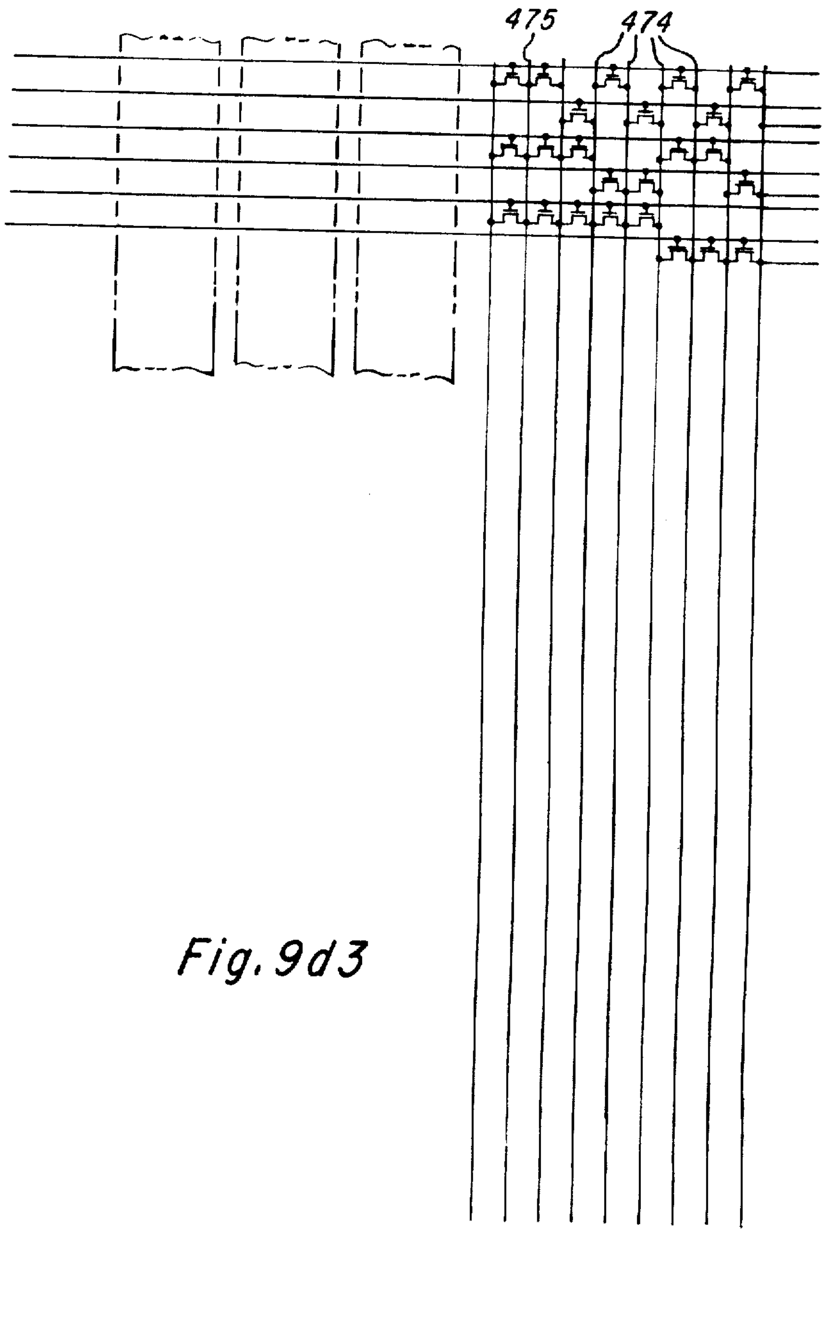
Fig. 9d3

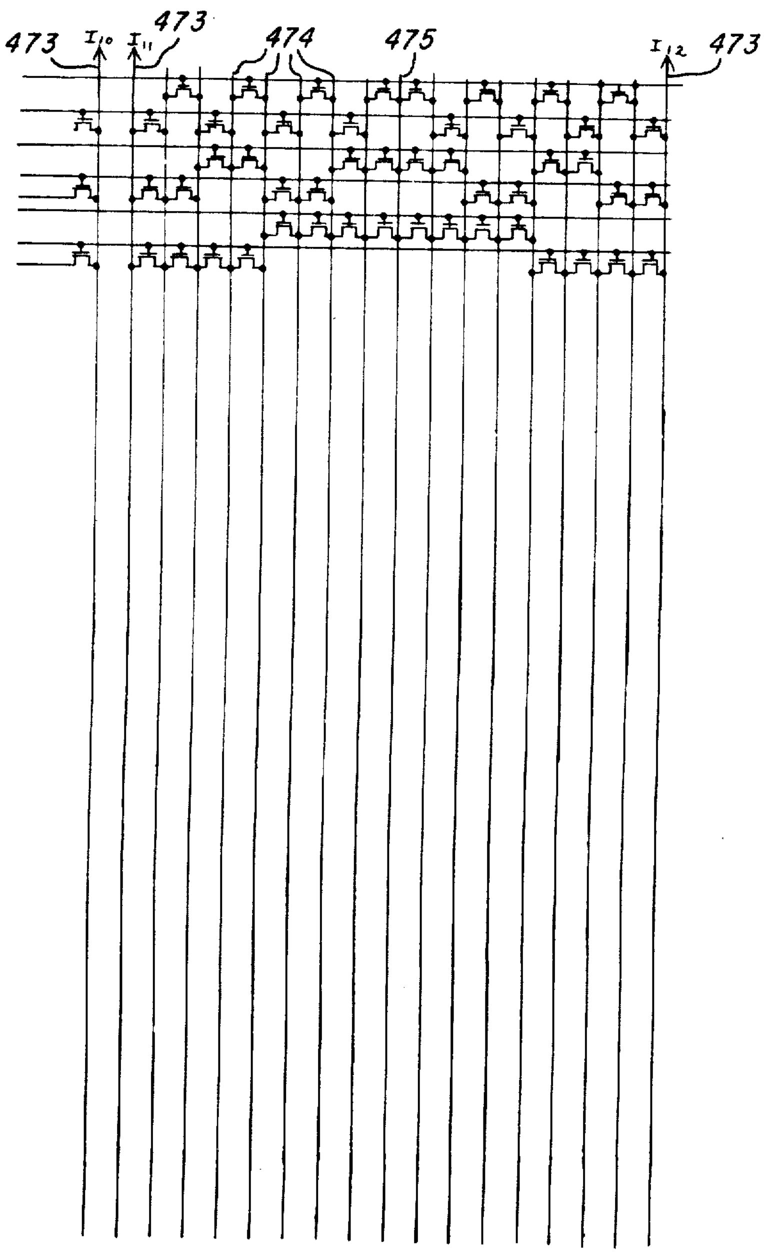
Fig. 9d4

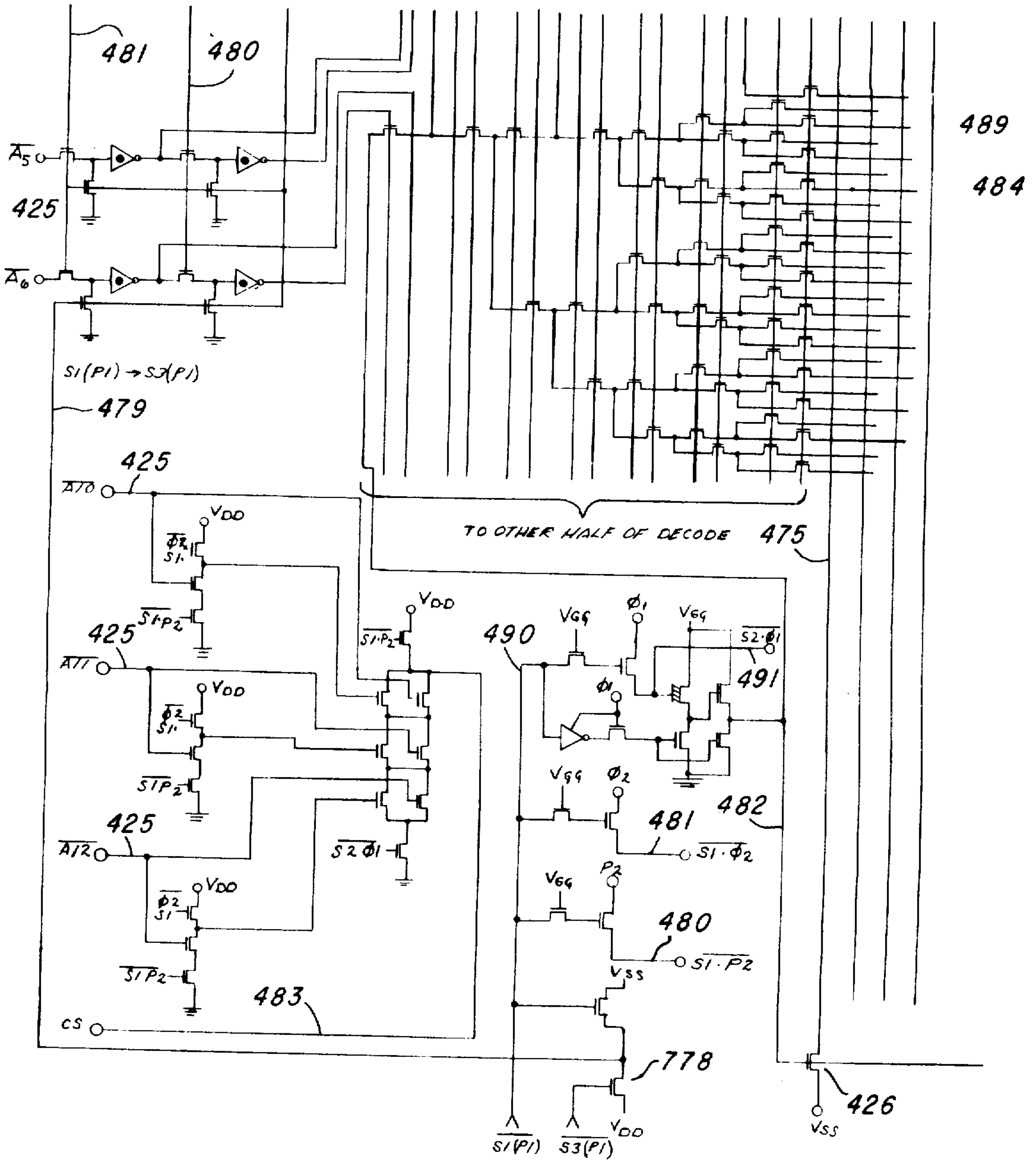
Fig. 9d5

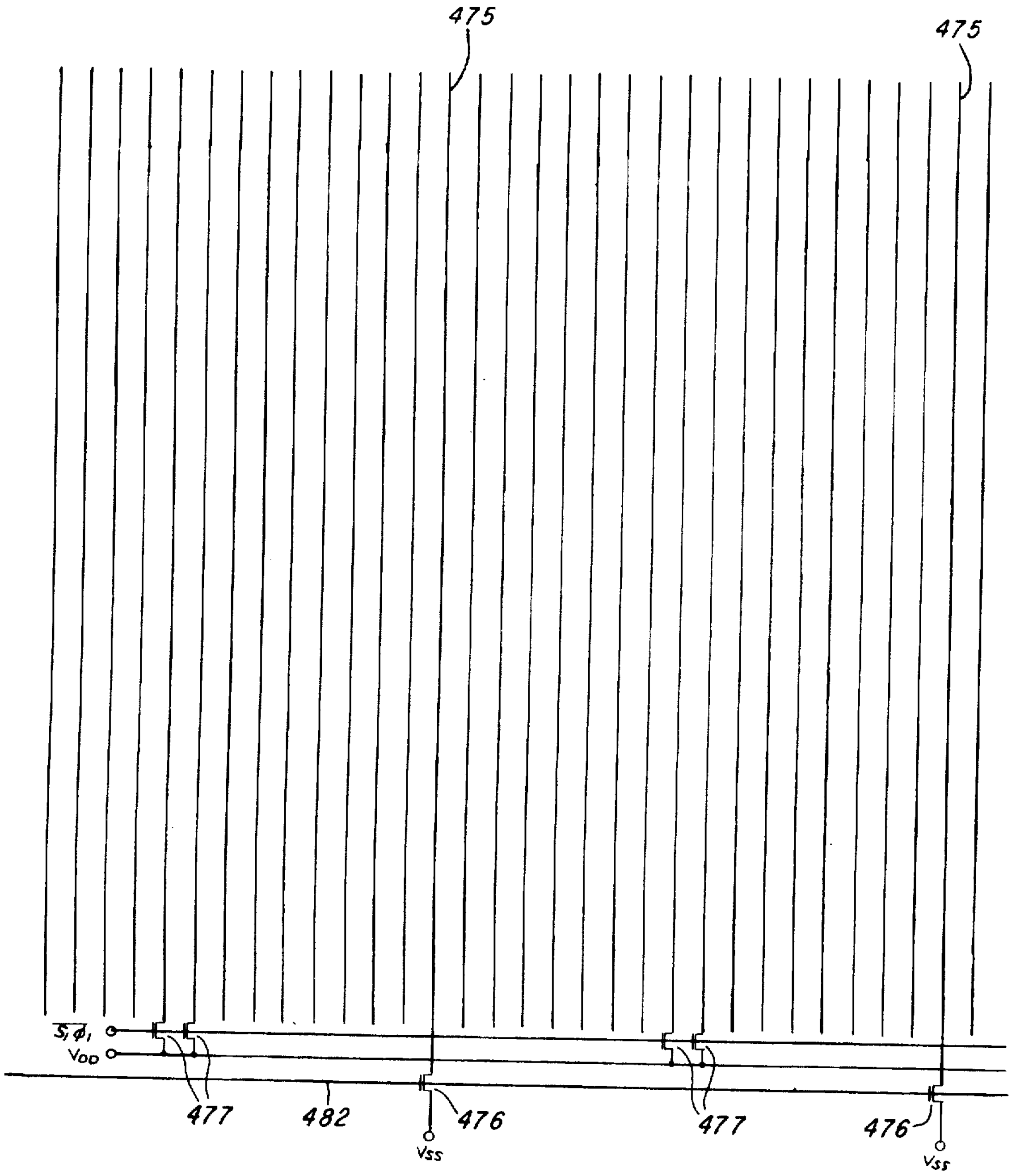
Fig. 9d6

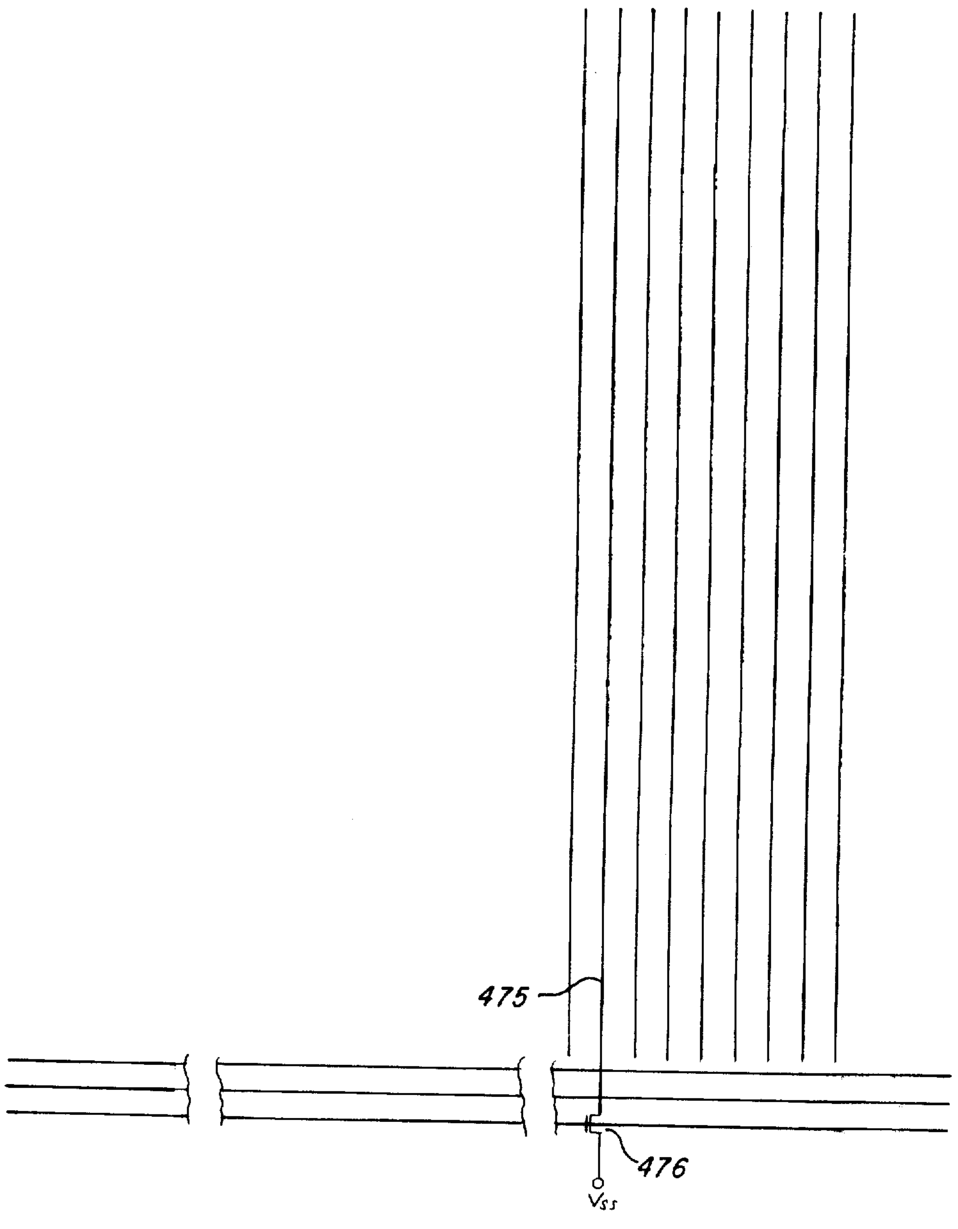
Fig. 9d7

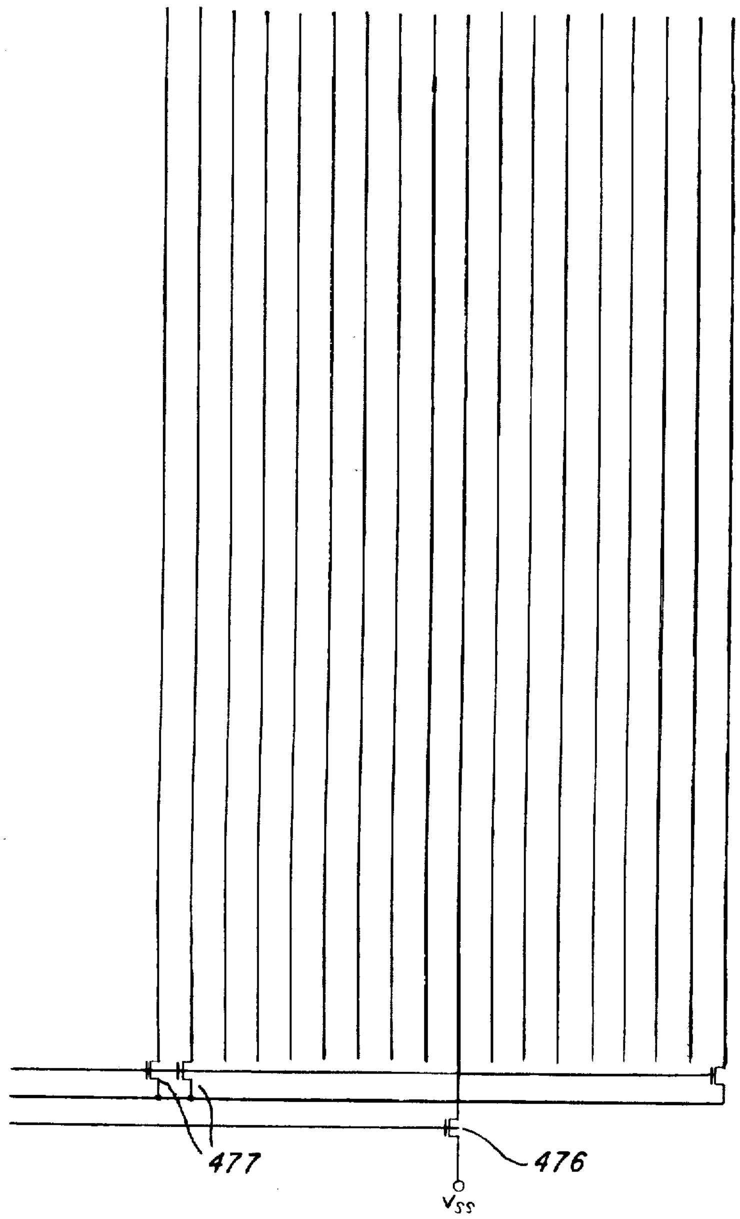
Fig. 9d8

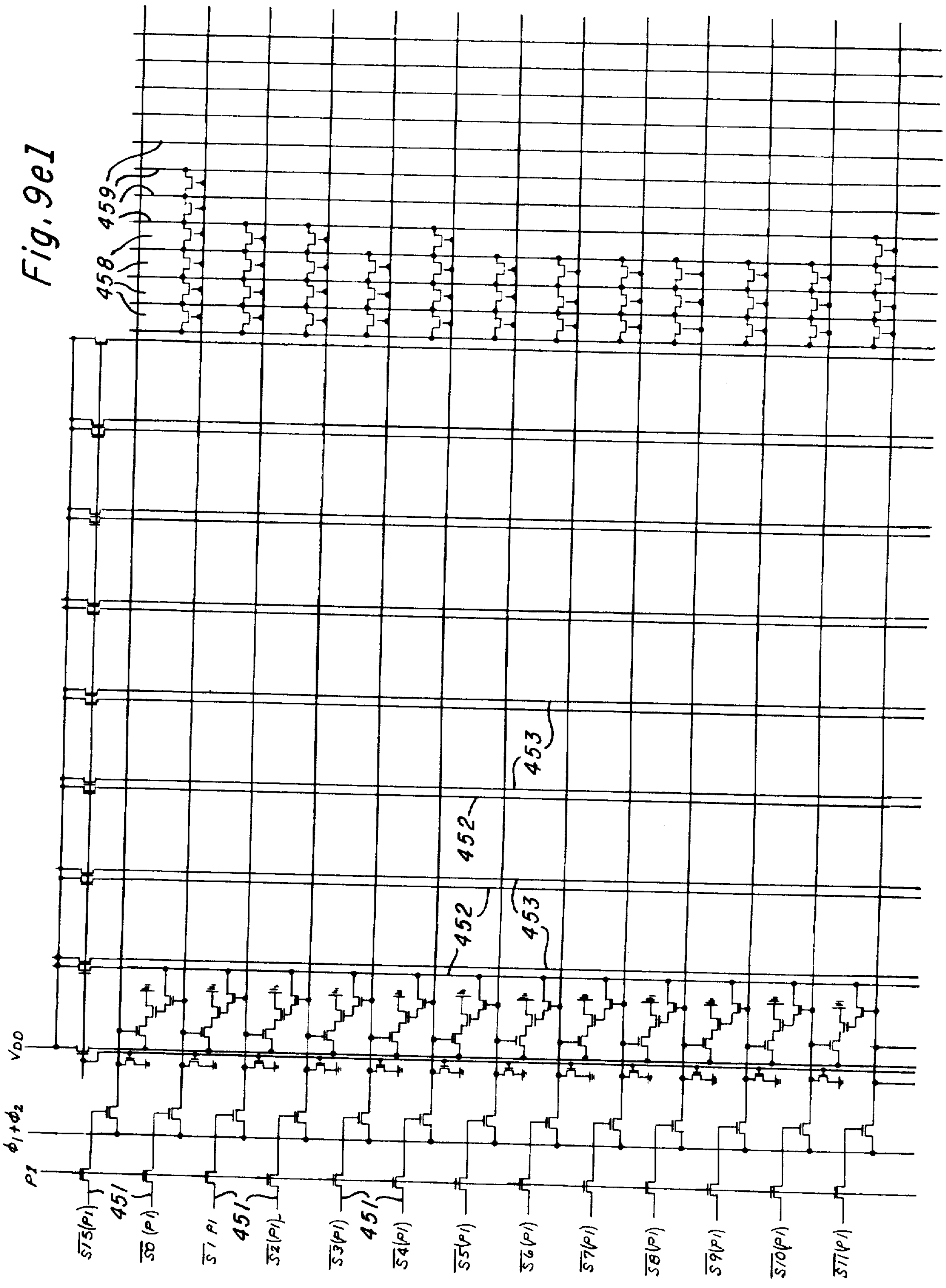
Fig. 9e1

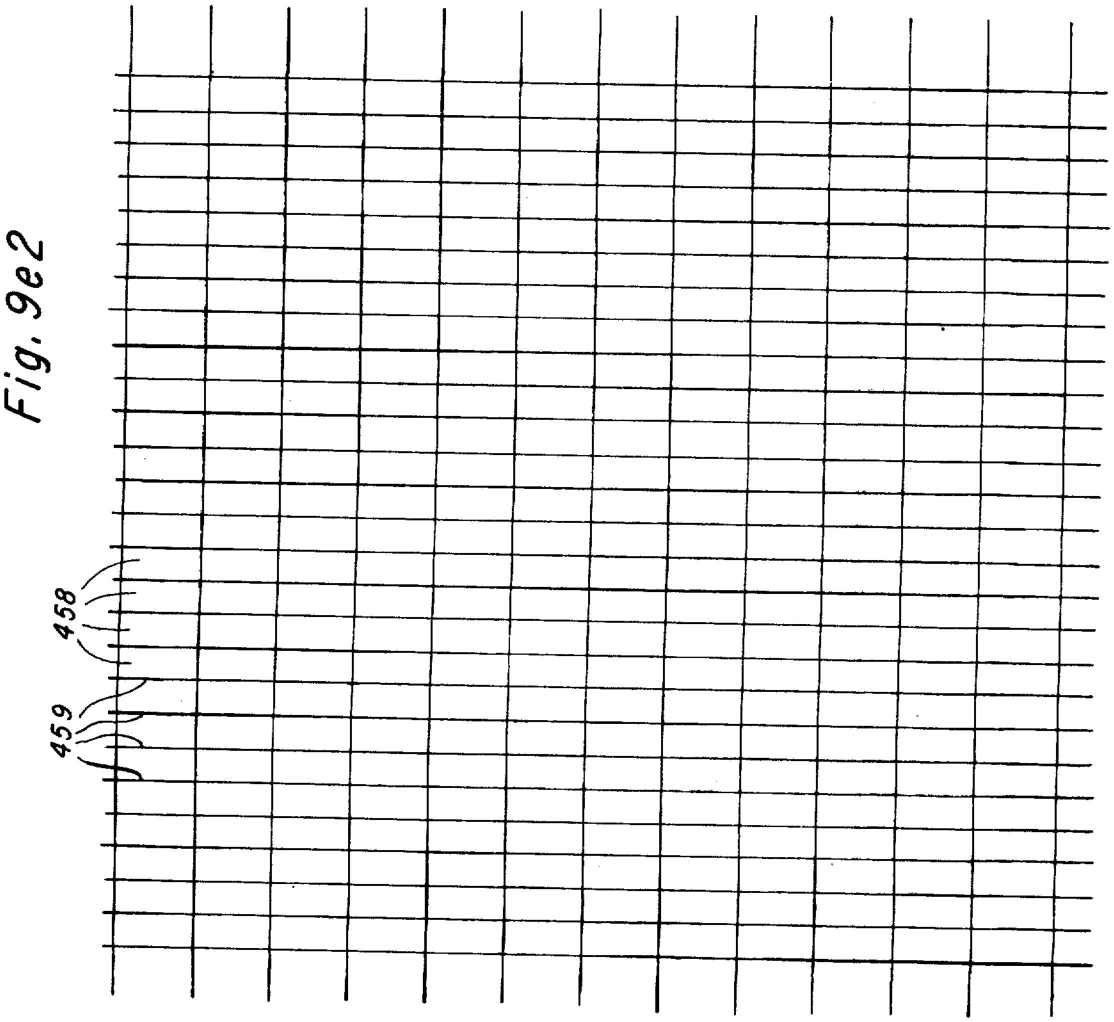
Fig. 9e2

Fig. 9e3
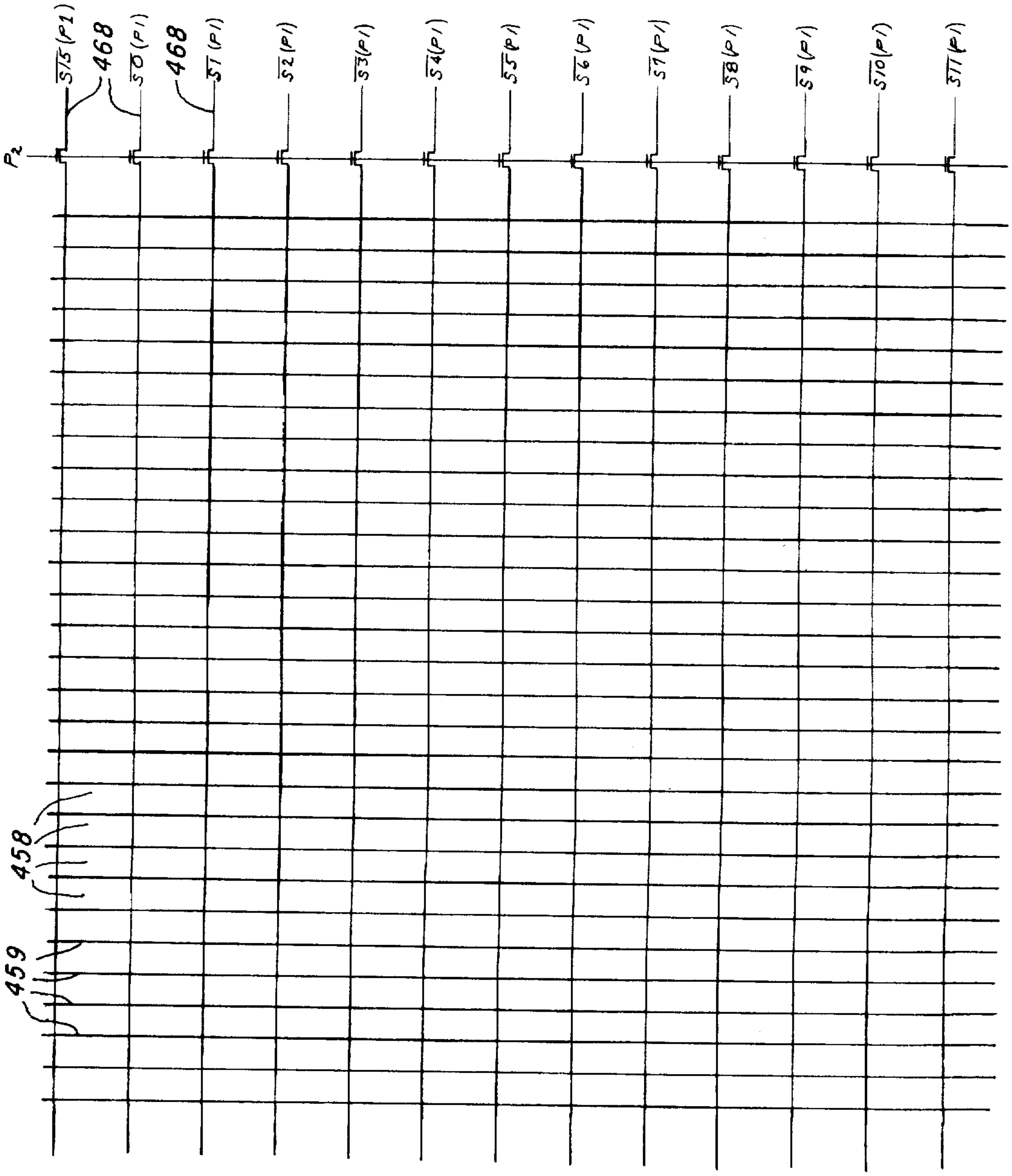

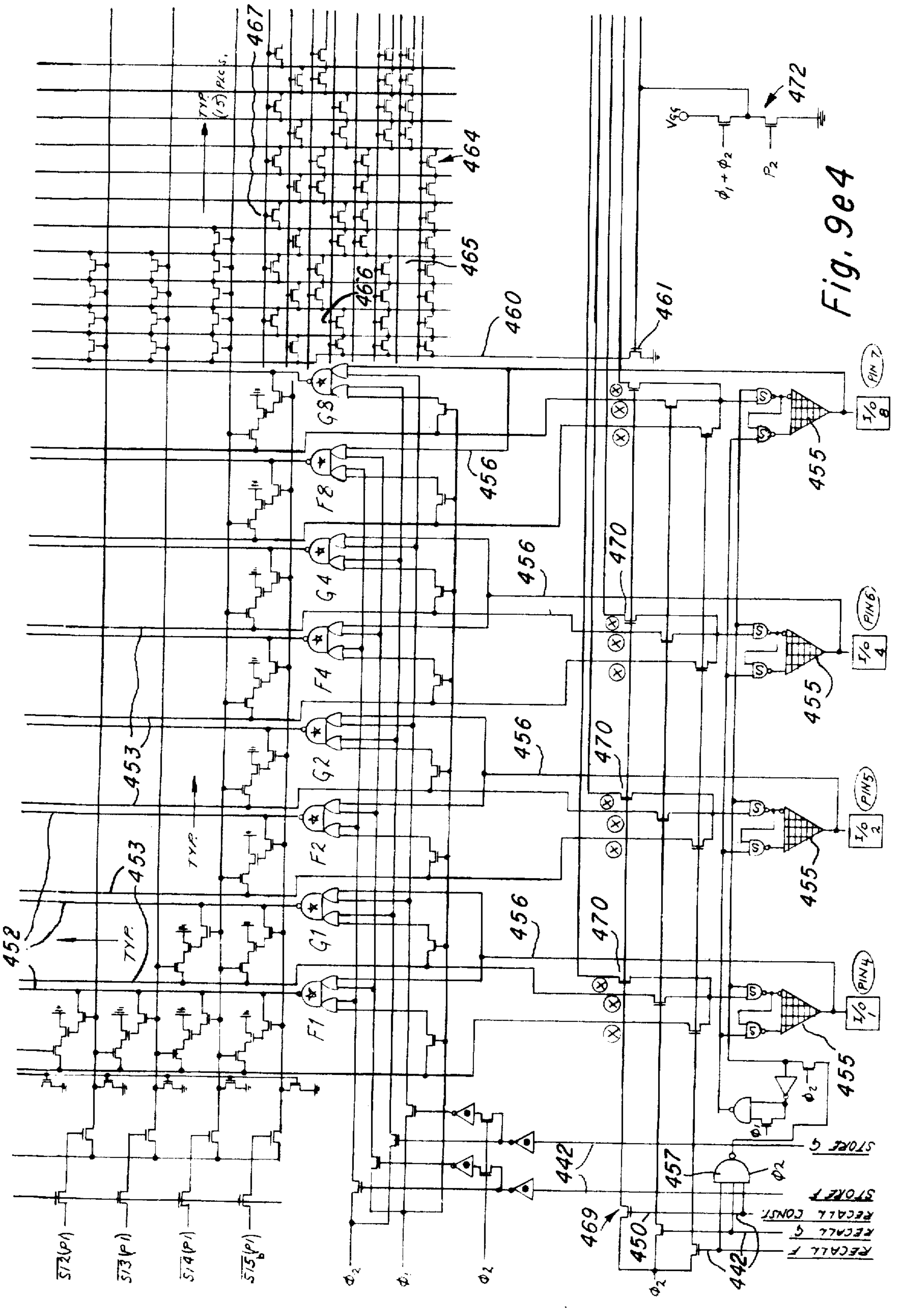
Fig. 9e4

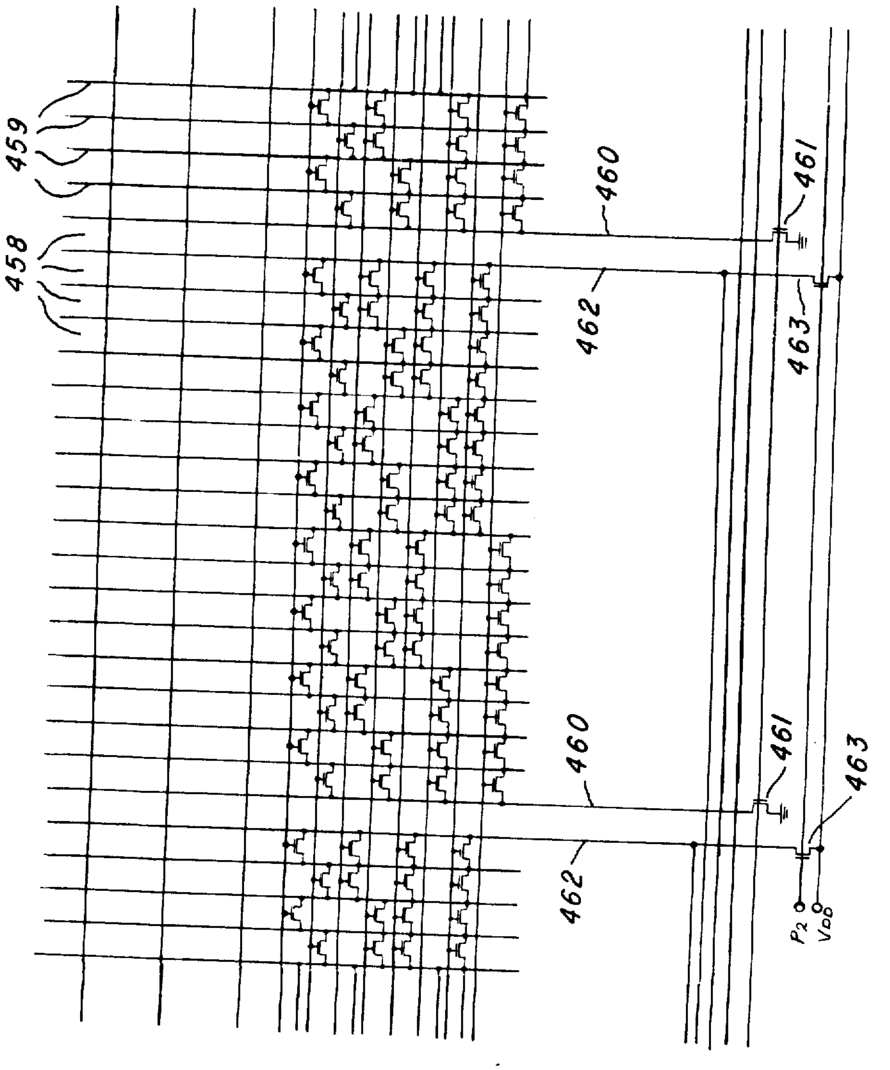
Fig. 9e5

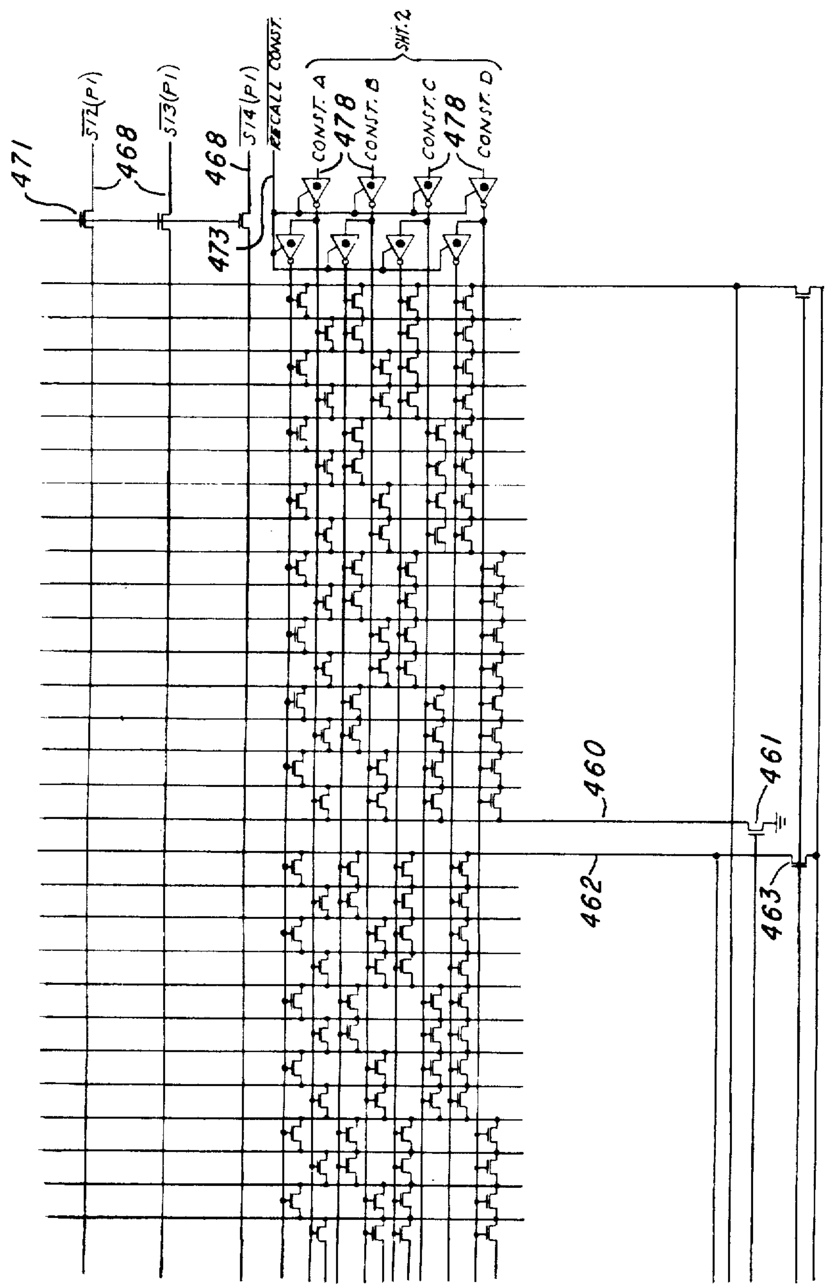
Fig. 9e6

CALCULATOR SYSTEM FEATURING A SUBROUTINE REGISTER

Related subject matter is found in the following co-pending patent application filed concurrently herewith:

Ser/No 397,060, filed Sept. 13, 1973 TI-5084 - MULTI-CHIP CALCULATOR SYSTEM

Ser/No 396,902, filed Sept. 13, 1973 TI-5190 - CALCULATOR SYSTEM FEATURING RELATIVE PROGRAM MEMORY ADDRESSING Ser./No. 397,185, filed Sept. 13, 1973 TI-5192 - CALCULATOR SYSTEM HAVING AN EXCHANGE DATA MEMORY REGISTER Ser./No. 397,048, filed Sept. 13, 1973 TI-5193 - CALCULATOR SYSTEM HAVING PRECHARGED ARITHMETIC LOGIC UNIT Ser./No. 397,181, filed Sept. 13, 1973 TI-5194 - CALCULATOR SYSTEM HAVING A CONSTANT MEMORY Ser./No. 396,959, filed Sept. 13, 1973 TI-5195 - CALCULATOR SYSTEM HAVING KEYBOARD WITH DOUBLE ENTRY PROTECTION AND SERIALIZED ENCODING Ser./No. 396,901, filed Sept. 13, 1973 TI-5196 - CALCULATOR SYSTEM HAVING A PRECHARGED VIRTUAL GROUND MEMORY Ser./No. 396,903, filed Sept. 13, 1973 TI-5199 - CALCULATOR SYSTEM HAVING MULTI-FUNCTION MEMORY INSTRUCTION REGISTER Ser/No 397,465, filed Sept. 13, 1973 TI-5200 - CALCULATOR SYSTEM USING INSTRUCTION WORDS AS DATA Ser/No 397,054, filed Sept. 13, 1973 TI-5287 - CALCULATOR SYSTEM HAVING PLURALITY OF PROGRAM MEMORY ADDRESS REGISTERS This invention relates to calculator systems in general and more specifically to a subroutine register in calculator systems.

TABLE OF CONTENTS

BACKGROUND OF THE INVENTION
BRIEF DESCRIPTION OF THE DRAWINGS
DESCRIPTION OF GENERAL BLOCK DIAGRAM
DESCRIPTION OF BLOCK DIAGRAMS OF ARITHMETIC AND SCOM CHIPS
THE IDLE HOLD, AND COND COMMAND BITS
INSTRUCTION/ADDRESS/CONTROL WORD FORMAT
TIMING
THE KEYBOARD INPUT MATRIX
THE KEYBOARD INPUT SYSTEM
THE KEYBOARD REGISTERS I/O CONTROL
REGISTERS A-E AS IMPLEMENTED IN A SAM
THE PUSH/PULL MATRIX
ARITHMETIC LOGIC UNIT (ALU)
DECODING THE INSTRUCTION WORD
THE I/O CIRCUIT AND REGISTER 5
THE D TIME GENERATOR
THE DISPLAY OUTPUT CIRCUITRY
THE COND CIRCUIT
THE SCOM CHIP
THE HOLDING AND ADDRESS REGISTERS
THE F & G REGISTERS
THE MAIN ROM AND DECODER CIRCUITRY
THE S & D GENERATORS
THE GATE CIRCUIT
THE CLAIMS

BACKGROUND OF THE INVENTION

In small hand-held electronic calculator systems of the type implemented in MOS/LSI technology, one method utilized for implementing the series of operational steps necessary for performing sequential operation is utilization of a relatively large read-only-memory programmed so as to store instruction words. Each location in the memory is separately addressable for generating the appropriately addressed instruction word. For example, a calculator implemented using only one MOS/LSI chip is set forth in copending patent application, "Variable Function Calculator", Ser. No. 163,565, now abandoned and replaced by Ser. No. 420,999, filed Dec. 3, 1973, assigned to the assignee of this invention which utilizes such a ROM for instruction word storage. A calculator system implemented using at least two MOS/LSI chips which also utilizes such a ROM for instruction word storage is set forth in "Electronic Calculator", Ser. No. 255,856, now abandoned and replaced by Ser. No. 360,984, filed May 16, 1973 and assigned to the assignee of this invention. However, such calculators suffered from the inconvenience of requiring conditional branch instructions, and then having to either regenerate a specific address or use ROM memory to store such addresses when subroutine loops were required. That is, additional software requirements and/or program memory space were necessitated for relocating the operational sequence of the calculator back to the specific memory location immediately previous to the beginning of the subroutine.

This invention provides subroutine storage and a method of operating the subroutine storage in conjunction with an instruction memory for overcoming the above enumerated inconveniences. The calculator system of this embodiment utilizes a keyboard storage means comprising a plurality of individually addressable bits for selectively addressing an instruction. The subroutine storage means, like the keyboard storage, is preferably implemented as a sequentially addressed memory (SAM), but its only function is to exchange its contents with that of the keyboard storage, under control of the instruction memory. To effect return after a subroutine, a specific memory address stored in the keyboard storage effects addressing of the memory and the address is placed into the subroutine storage via an exchange command. Then after the subroutine has been executed, another exchange command replaces the specific address into the keyboard storage for subsequently readdressing the instruction memory for returning the operational sequence of the calculator to the location immediately prior to the beginning of the subroutine.

BRIEF DESCRIPTION OF THE DRAWINGS

The novel features believed characteristic of the invention are set forth in the appended claims. The invention itself, however, as well as its objects and advantages thereof, will be best understood by reference to the following detailed description of the illustrative calculator system featuring an embodiment of the invention, when read in conjunction with the accompanying drawings, wherein:

FIGS. 8a–8d are a composite schematic diagram of the circuit of the "arithmetic chip" part of the system of the invention;

FIGS. 9a–9e are a composite schematic diagram of the circuit of the SCOM chip part of the system of the invention.

DETAILED DESCRIPTION OF SPECIFIC EMBODIMENT

Figure 1:
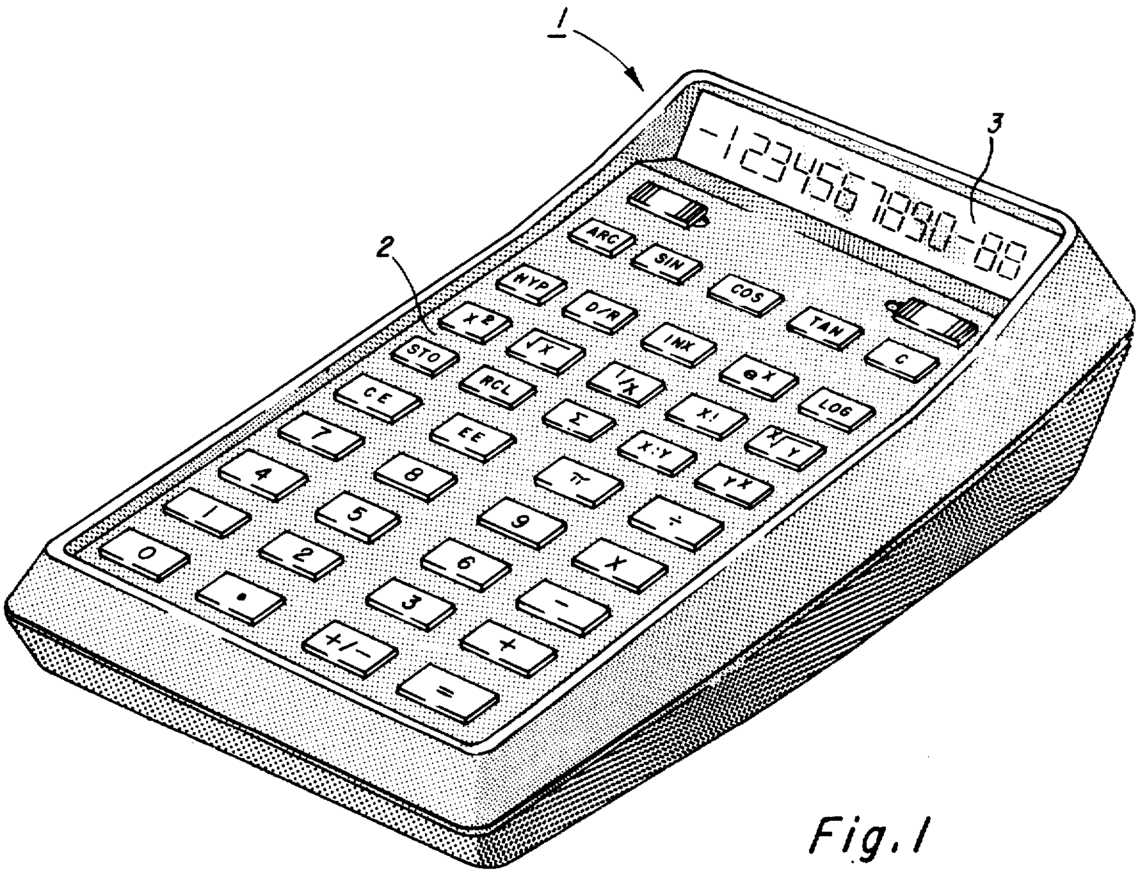
FIG. 1 is a pictorial view of the electronic portable calculator of the invention.

Referring to FIG. 1, an electronic portable calculator 1 of the type which may employ features of this invention is shown in pictorial form. The calculator 1 comprises a keyboard 2 and a display 3. The display, in one embodiment, consists of fourteen digits or characters, each provided by a gas discharge tube, a liquid crystal display unit, an array of light emitting diodes or other display means. The display is preferably implemented using scientific notation, allowing display of ten significant digits. Ordinarily, the display would be of the so-called seven segment or eight segment variety, with provision for indicating a decimal point for each digit. The calculator system of this invention is adapted so as to provide a printed readout, if desired, using either thermal printing techniques or drum printing techniques. The keyboard 2 includes a set of number keys of zero through nine, a decimal point key, and a plurality of function keys including exponential, logarithmic and trigonometrical functions. The exponential and logarithmic function keys include $X^2$, the square root of X ( $\sqrt{x}$), the reciprocal of X,(1/X),$E^X$, the log to the base 10 of X, (LOG) and the natural log of X, (1n X). The trigonometrical functions include the arc sine, arc cosine and arc tangent of X, the sine, cosine and tangent of X, and the hyperbolic sine, hyperbolic cosine, and hyperbolic tangent and arc hyperbolic sine, arc hyperbolic cosine and arc hyperbolic tangent. Other function keys include the store, (STO), and recall, (RCL), keys for respectively storing and recalling a number in/from the memory registers in the SCOM chip. The enter exponent, (EE) key, allows exponent entry of the number displayed in scientific notation. A +/− key is provided for changing the sign of the displayed number. An exchange key, (X:Y), is provided for exchanging operator and operand in an arithmetic function. Other more conventional keys are sûpplied including the clear all key, (C), the clear entry, (CE), and the +, −, ×, ÷, and = keys. A sigma key, Σ, allows incrementing a number stored in the memory register directly. An X factorial key, (X!), is provided as well as a degrees to radian/radian to degrees conversion key, (D/R), and a degrees/radian switch to set the calculator for operation in either degrees or radians.

Figure 2:
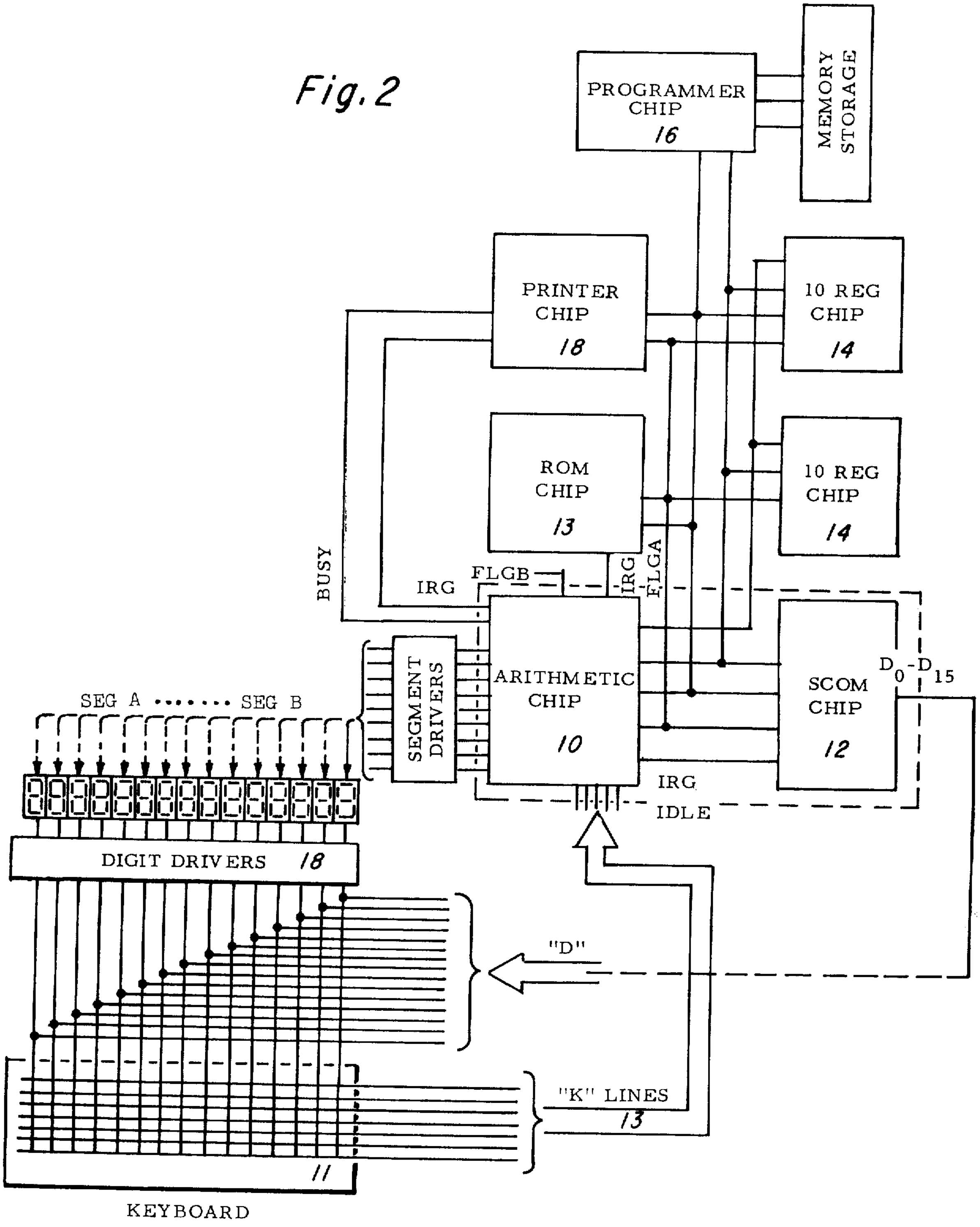
FIG. 2 is a simplified block diagram of the multi-chip calculator system of the invention.

Referring now to FIG. 2, there is shown a functional block diagram of the multi-chip calculator system of this invention showing the arithmetic chip and SCOM Scanning and Read Only Memory) chip, hereafter described in detail, interconnected with peripheral chips providing expanded calculator capacity and capability. This invention is principally directed however to the arithmetic and SCOM chip pairs enclosed in the dotted lines 15, which chip pair provide one operable system without the peripheral chips. The arithmetic chip 10 generates a plurality of control signals to the SCOM chip 12, to an external ROM chip 13 providing for increased instruction word storage capacity, to the external multi-register chip set 14 providing external data word storage capacity, to the external programmer chip 16 providing a means for programming specific subroutines in the calculator externally, and to an external printer chip 18 for controlling an output printer responsive thereto (not shown). The output printers may be of conventional design with adaptions to the printer chip 18, but preferably are of the thermal printer type or the drum printer type.

The control signals generated by the arithmetic chip 10 include the control signals:

EXTERNAL (EXT) indicates that the arithmetic chip is addressing SCOM storage and indicates which ROM storage (constant or program) is being addressed, and further communicates in multiplexed bit fashion the HOLD and COND control signals:

The HOLD bit in EXT indicates that an interrupt is desired in the normal sequencing of the ROM in the SCOM to allow additional executions by the system before the next instruction word is to be executed;

The CONDITION (COND) bit in EXT indicates that a condition latch has been set indicating status of a particular flag or the results of a comparison of flags;

IDLE ($\overline{IDLE}$) is indicative of the idle condition of the data chip, i.e., whether the data chip is actually in the calculating mode (non-idle) or in the display or scanning mode (idle), and provides synchronization of the timing generators of the SCOM to the timing generators of the arithmetic chip;

Flag A (FLGA) is the serial output of the Flag A register in the SAM at an output rate determined by COND;

Flag B (FLGB) is the serial output of the Flag B register in the SAM of the arithmetic chip or is the BI or first bit of the B register output.

Segment (SEGA-SEGG) is the data output of the Data Registers for actuating the seven segment display per digit to indicate a 0–9 numeral per digit according to the D times.

Display Time (D time) comprises timed signals, each an instruction cycle of sixteen S times duration, wherein the D times are generated in cycles of sixteen so that D times precess from the particular D time of the preceding cycle;

Keyboard Inputs (K lines) are signals from the keyboard for entering externally commands to the arithmetic chip;

Instruction Words (IRG) indicate the particular instruction word comprising thirteen bits ($I_0$–$I_{12}$) stored in a particular SCOM memory storage unit;

Busy (BUSY) represents the condition of peripheral chips such as the printer, as determined for example by the printer chip 18 that the printer is not/is busy and can/cannot receive another command for printing.

Input/Output (I/O) are data lines conveying data bits from any of the various data registers and memories located in the arithmetic chip, SCOM chip, and 10-register chips.

Referring again to FIG. 2, the arithmetic chip 10 provides output data information from Registers B and/or A and Flag Register A to the segment drivers 17. Necessary information which is provided is: position of the comma, position of the decimal point, actual data results to be displayed from the B and/or A register and data to be displayed from the Flag A register. The segment drivers 16 comprise conventional driver circuits for actuating the above-mentioned displays 3, here shown to have a seven segment display plus decimal point per digit, with one digit actuated per D time. Thus for a 16 digit display in scientific notation driven by 16 D times, there are up to 14 digits in the mantissa, 2 digits for the exponent, with 2 digits utilized as annotators for the mantissa and exponent being strobed non-exclusively.

The SCOM chip provides the D times to the digit drivers 20 for selectively scanning in sequence the digits of the display 3 and the keyboard. Scanning of the display is explained in detail in the above-mentioned application Ser. No. 420,999. The D time strobing of the keyboard is set forth subsequently.

The SCOM chip 12 is responsive to EXT and $\overline{\text{IDLE}}$ command signals from the arithmetic chip and generates in response thereto the D times, the instruction word $I_0$–$I_{12}$ (IRG) and data from the constant ROM on the I/O lines, all of which is communicated back to the arithmetic chip.

The ROM chip 13 depicted is one of the expandable set of peripheral chips allowing expanded calculator capacity. The ROM chip is responsive to the EXT and $\overline{\text{IDLE}}$ commands from the arithmetic chip for providing a 1024- additional instruction word capacity per additional ROM chip.

The multi-register chip 14 is another set of peripheral chips providing expanded data storage capacity of up to ten registers to the calculator system of this invention. The multi-register chip is responsive to Flag A, $\overline{\text{IDLE}}$, and I/O information from the arithmetic chip for providing recall data through the I/O lines in return to the arithmetic chip.

The printer chip 18 is responsive to the I/O information from the arithmetic chip, the EXT, and $\overline{\text{IDLE}}$ commands from the arithmetic chip for printing in accordance with data on the I/O lines. If an impact printer chip is utilized, the Flag A command is utilized from the arithmetic chip.

For minimizing pin count on the arithmetic and SCOM chips, and for maximizing silicon area utilization. both chips feature separate timing generators for providing S and D times, with the timing generator on the SCOM chip dependent upon the arithmetic chip for synchronization. Furthermore, instead of providing separate signals on separate lines between chips representing various conditions of the arithmetic chip, such as flags and sync signals, as heretofore utilized in earlier multi-chip calculator systems, the two-chip system of this invention features a multiplexed command signal from the arithmetic chip to the SCOM chip wherein each bit of a subset of bits in the command word represents the particular condition required to be transmitted. For example, the EXT signal communicated to the SCOM chip transmits a PREG (program register) signal in the $S_0$ bit indicating that the SCOM chip is being addressed, transmits a second signal in the second bit at time $S_1$ for indicating the COND condition, and transmits the HOLD condition in the third bit at time $S_2$ indicating that the ROM address register is not to be incremented. Heretofore, three separate signals and pins were required for transmitting this information. Although the arithmetic chip 10 and the SCOM chip 12 provide a basic operating calculator system as herein disclosed, the chip pair provides a basic system which anticipates adding peripheral storage and output function chips, preferably implemented in MOS/LSI utilizing novel methods of addressing for minimizing pin count.

Figure 3A:
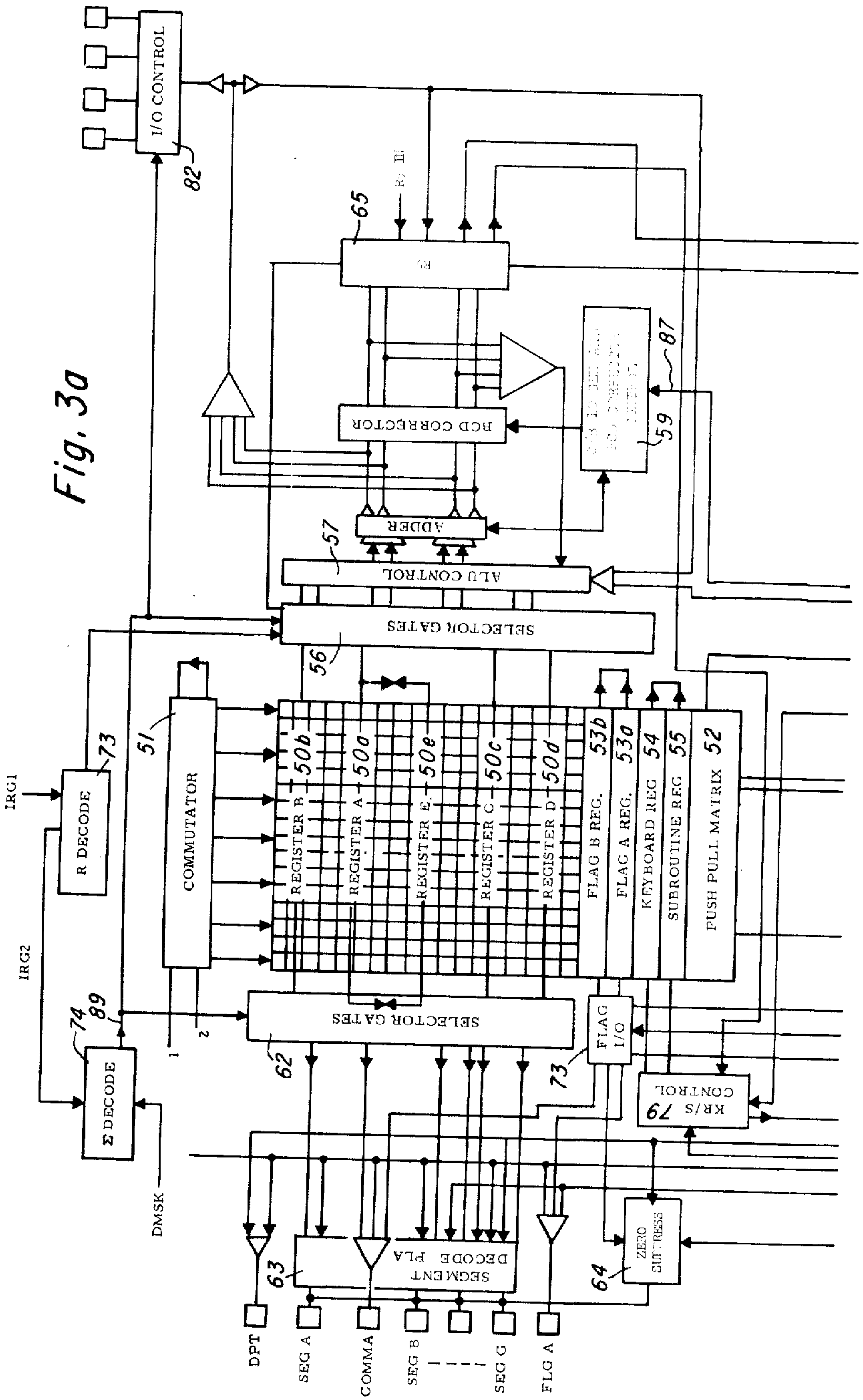
FIGS. 3a–3b are complex block diagrams of the arithmetic chip features in this invention.
Figure 3B:
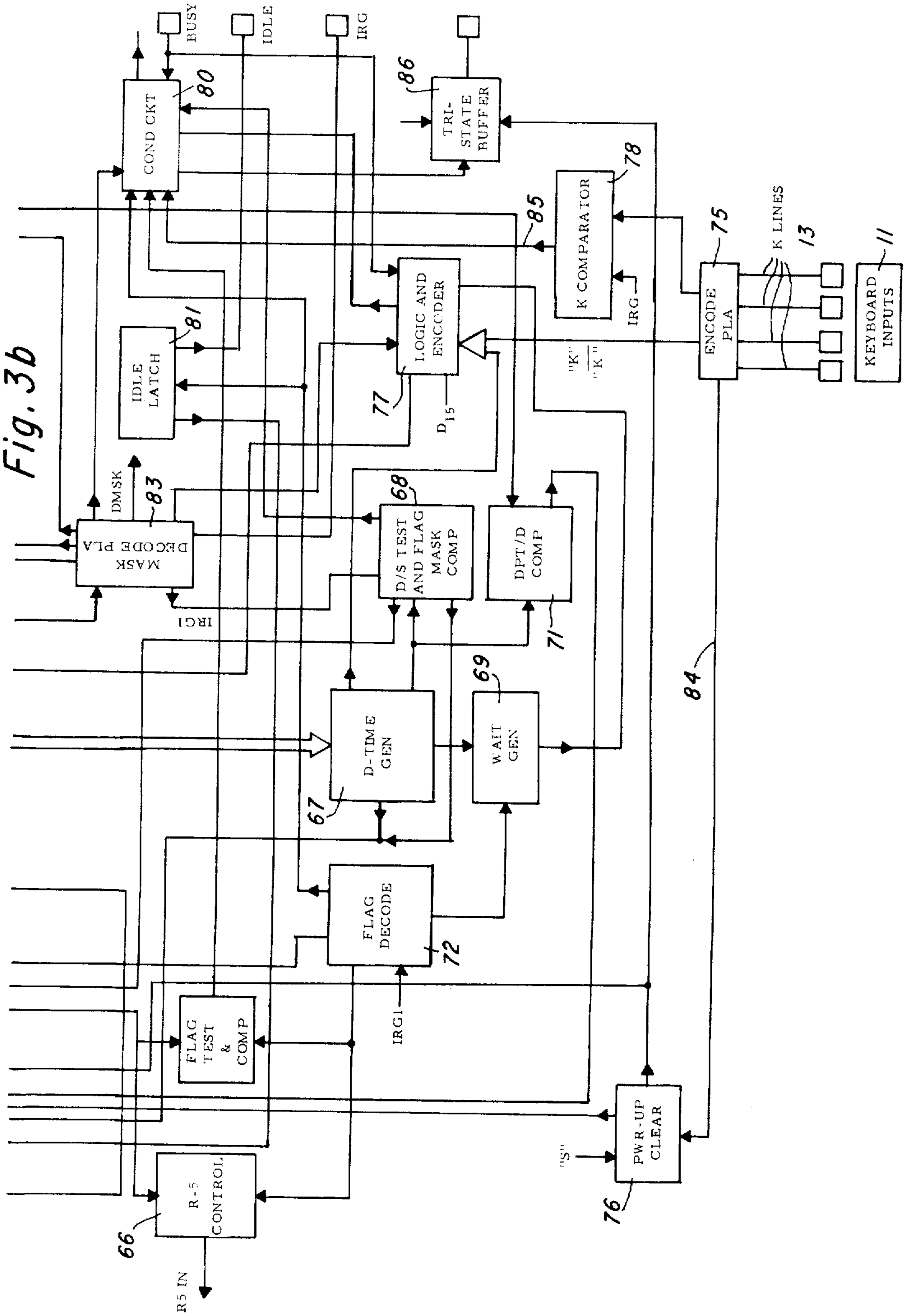
Figure 4:
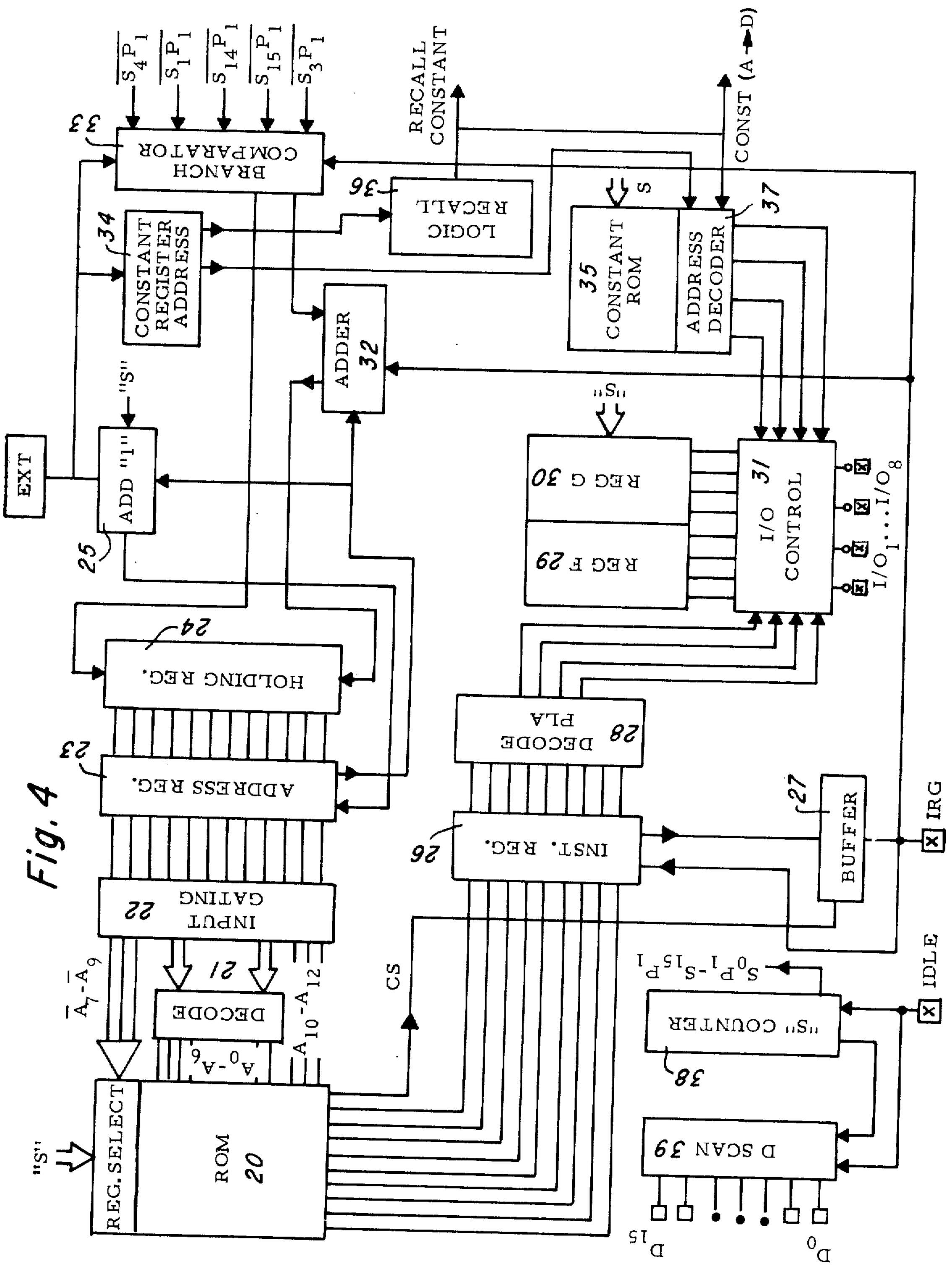
FIG. 4 is a complex block diagram of the SCOM chip featured in the electronic calculator of this invention.

Shown in FIGS. 3*a*–3*b* and FIG. 4 is a detailed functional block diagram of the arithmetic chip and the SCOM chip depicted in the calculator system of FIG. 2. A detailed description of the individual functional blocks will be discussed subsequently with regard to FIGS. 9 and 10, with only a general functional description of the basic "two-chip" system here set forth. It is understood that in the block diagrams of FIGS. 3*a*–3*b* and 4, a connection represented by a single line may represent a plurality of actual hardware interconnections, and for ease and simplicity of illustration, a single line may represent a plurality of different functions. The calculator system of this invention includes on the SCOM chip a main program ROM 20 responsive to decode and gating means 21 and 22, respectively, which selectively couple the address word in the address register 23 to the ROM for controlling which ROM location is being addressed. A holding register 24, in combination with an add-1 circuit 25, selectively generates a new ROM address in the register 23 when a branch instruction word has been executed. As will subsequently be discussed, branching will be implemented utilizing a relative technique wherein, instead of conventionally jamming in a complete new address, the old address will be incremented positively or negatively by a relative numerical amount to generate the new address.

An instruction register 26 is reponsive to the output of the ROM 20 for storing the instruction word $I_0$–$I_{12}$ which enters the instruction register 26 in parallel. Thereafter, the instruction word is serially communicated to the arithmetic chip through the output buffer 27 which is under control of the ROm 20. A decode PLA 28 is responsive to the instruction register 26 after the instruction word has been transmitted through the buffer 27 and re-entered into the instruction register 26. Then the decode PLA 28 decodes the instruction word providing store and recall commands to the registers F and G, 29 and 30, respectively, and to the constant ROM 35, through the I/O control circuit 31.

After the instruction word leaves the buffer 27 for transmission to the arithmetic chip, it is further communicated to the adder 32 and to the branch comparator 33, wherein, if the $I_{12}$ bit of the instruction word indicates a branch is to be executed, the branch comparator enables the holding register 24 to accept the new instruction word from the adder 32, which adds a positive or negative increment to the old address storage received from the address register 23 to generate the new address.

The constant register address 34 is responsive to a command word EXT from the arithmetic chip for addressing a constant in the constant ROM 35 which provides up to sixteen 16-digit 4-bit constant words. Logic :all circuitry 36 couples the constant register address to the address decoder 37 of the constant ROM 35. ⁻urther implemented on the SCOM chip is an S unter 38 and a D scan generator 39 for generating ; S and D time timing signals of this calculator sysn, which D times $D_0$–$D_{15}$ are outputed to the digit ivers and keyboard as shown in FIG. 2. Both generars are synchronized by a command from the arithme- : chip which command is synchronized with the D d S times on the arithmetic chip.

The arithmetic chip of FIGS. 3a-3b is generally reonsive to the instruction word IRG from the SCOM ıip and to external operator inputs from the keyboard ıd other peripheral chips for executing the particular struction word and performing the indicated arithme- : operation. The main data registers in the calculator stem of this invention are Registers A—E, **50*a*–50*e*, spectively. They are implemented in sequentially ad- ressed memory (SAM) form which are driven by a ommutator 51 which also drives a push-pull matrix 52 ır generating timing signals. Also implemented in AM format are four 1-bit registers utilized as two flag gisters, Flag A, 53*a*; Flag B, 53*b*; the keyboard regisr 54, a multi-purpose register; and a subroutine regisr 55. It is understood that although the term "regisr" is here utilized as descriptive of the SAM impleıentation, this is only a "black box" type description s internally there is no actual shifting of data. Accordıgly the SAM "memory" elements which are sequenially addressed are not "shift registers" in the literal ense. Data in Registers A—E, as will be discussed subequently in detail, is acted upon by the adder circuit ;5 as controlled by the selector gates 56, ALU control ;7, carry/borrow generator and BCD corrector control :ircuit 59, and BCD corrector 61.**

Selector gates 62 control exchanging and recirculaion of Registers A-E. The calculator displays its results by outputting the contents of Register B and/or Register A, preferably Register A, and the Flag A register to drive the segment decode PLA 63 which provides the output display as shown in FIG. 2. Zero suppress circuitry 64 provides leading zero suppression so that only the most significant non-zero digit is first exhibited.

A fifth 1-bit register, Register 5, of four digits duration, is a multi-purpose register responsive to the output of the adder circuit 55, to I/O lines, and to the instruction word from the Flag Decode PLA 72 as controlled by R5 control 66. R5 control 66 provides control data inputs and control inputs to Register 5 responsive to decoded instruction information. A feature of this invention is the means allowing four bits of the instruction word to be entered into Register 5 upon the "NUM ——▶ R5" command. Since Register 5 is coupled to the main SAM registers and to the ALU, such provision allows use of a subset of the instruction word as data for execution. Such a feature facilitates software generation of data required in various subroutines.

The push-pull matrix 52 provides timing information to the D time generator 67 which is a ring-tail counter to generate one D time or instruction cycle comprising sixteen S times. Generator 67 counts backwards from 15 to zero in cycles, causing the D times to appear to precess in sequence. The D/S Test and Flag Mask Comparator 68 is responsive to S and D times for generating sync pulses and masking signals for flag operations, respectively, and for setting COND circuit 80. The wait generator 69 is responsive to the D time generator and to a decoded instruction word from decoder 72 for generating a wait command to logic and encoder 77 for controlling keyboard scanning.

The decimal point/D comparator 71 is responsive to D times and to Register 5, 65, for generating a decimal point at the proper timing location and for ending zero suppress.

Decoding of the instruction words from the SCOM chip is done locally on the arithmetic chip. That is, the instruction words are initially decoded in the mask decode PLA 83 for generating masks to the arithmetic logic unit for communicating such information as decimal point location, mantissa, and exponent location. The instruction word is then communicated to the D/S mask comparator 68 and also to the flag decode matrix 72 which controls input and output of the flag registers **53*a* and 53*b* through the flag input/output control 73. The instruction word also is communicated from the mask decode PLA 83 to the R decode matrix 73 and then to the sigma decode matrix 74 for controlling the selector gates 56 and 62** for register selection/-functioning.

External inputs are supplied to the arithmetic chip by a keyboard operator through the keyboard 11 via K lines to an encode PLA 75. A particular keyboard actuation commands to the hardware clear circuit 76 generates proper commands for initializing and resetting the calculator upon battery actuation. The encode PLA 75 provides encoded K line information to the logic and encoders 77 and to a K comparator 78. The logic and encoder 77 selectively supplies D time and K coordinates in serial form to the keyboard register/subroutine register control 79 for entry into the keyboard register 54. The K comparator 78 allows determination that a specific K line was not actuated, or conversely determines which K line, by a process of elimination, was actuated. This information is communicated to a condition circuit 80 which is a versatile latch circuit responsive to a plurality of functions for providing status of various conditions at preselected times. Idle latch 81 is responsive to the flag decode PLA 72 and provides information to the display output controls that the calculator is or is not in an idle or non-calculating state for appropriately blanking the display. This information is further communicated to the idle terminal as indicated for transmission to the SCOM chip for synchronizing the S and D generators there.

Another important feature utilized in the calculator of this invention is a technique utilized in reducing power dissipation on the chips by utilizing depletion loads for the decode circuits. That is, the decode circuits such as decoders 28, 72, 73, 74 and 83 are implemented as programmable logic arrays, now well-known in the art, which utilize load devices implemented in depletion mode MOS. To achieve optimum levels of power dissipation, the loads are periodically clocked as needed so as to dissipate power only when needed during the cycle.

For clearer understanding of the novel, useful and unobvious features of this invention, a more detailed functional interrelationship of the above circuit components follows.

The program memory 20 comprises a novel 13 × 1024 ROM for storing the control program and advantageously features virtual grounding, a novel method of precharging, and a novel layout pattern reducing the number of ground lines. By implementing a virtual ground ROM as the program memory, significant power reduction and silicon economy are achieved.

Instruction words $I_0$–$I_{12}$ are read out of the ROM 20 one word at a time in bit-parallel into an instruction register 26 which functions as a parallel-to-serial converter for serially communicating the instruction word to the arithmetic chip through the buffer 27 on the IRG line. Buffer 27 is controlled by the ROM 20 via the chip select, CS, line which indicates that the particular ROM 20 has indeed been addressed allowing the instruction word read out of the instruction register 26 to be communicated to the data chip. Otherwise, an instruction word from another ROM on another chip, for example, the ROM chip 12 would be exported under control of its CS. When buffer 27 has been enabled by the chip select line, the instruction word is transmitted on the IRG line to the data chip and is thereafter reentered into the instruction register 26 to be subsequently decoded by decode PLA 28. Such a re-entry and subsequent decoding is a feature of this invention, whereby the multi-functional use of register 26, first as a parallel to serial converter of the instruction word, and then as a register for decoding the instruction word, reduces component and software requirements.

Furthermore, because the calculator system of this invention is adapted to accommodate up to 8 SCOM or ROM chips, or any combination thereof, such a reentry and subsequent decoding allows the up to 8 ROM/SCOM memories to be coupled in parallel at the buffer 27 into the two-chip system with minimum control and timing requirements.

On the arithmetic chip, the instruction words from the ROM 20 are decoded locally in several decode PLA's, including the mask decode PLA 73 and the sigma decode 74, the functions of which will be subsequently discussed. Data is stored in registers 50 which are basically sequentially addressed random access memories organized as five data registers of sixteen digits each. Register E, 54c, although similarly implemented as Register A – Register D is a basic SAM configuration, has no direct output terminals, functioning only to exchange its data with the data in the A register. The flag registers 53 and keyboard 54 and subroutine 55 registers are sixteen bit registers, implemented as a SAM, each bit of which is separately programmable for providing optimum utility. The keyboard register functions mainly to receive encoded controls from the keyboard for eventually interrupting and controlling the main ROM 20 on the SCOM chip 12. The subroutine register, like Register E, has no direct external outlet, instead its function is limited to exchange with the keyboard register, functioning chiefly as a memory for storing program address during a jump instruction, so as to remember the location to which control is to be returned after the subroutine has been executed. All operations on the data entered into the registers 50 is carried out in an arithmetic logic unit on the arithmetic chip which is of the bit-parallel, serial-digit type, and features a novel carry-propagate binary adder 55. The novel binary adder utilizes bidirectional IGFET switches for switching IGFET current sources to provide a binary adder especially adapted for MOS application in general and specifically in calculator ALU's. Exclusive-or circuitry conventionally utilized in the input and output circuitry has been eliminated by incorporating it into the adder logic itself to reduce required circuit size. The 4-bit register, Register 5, is responsive to the arithmetic logic unit and I/O control 82 and functions to store the decimal point location along with any other four bit number for entry into the A, B, C and D registers or into the adder. The BCD corrector 61 appropriately adds six (for addition) or ten (for subtraction) for correcting the output of the binary adder back into BCD.

Responsive to the instruction word from the SCOM chip, the sigma decode 74 and the R decode 73 respectively control recirculate and exchange of the various registers and control which registers are coupled to the arithmetic logic unit (ALU). The mask decode PLA 83, in response to the instruction word from the SCOM, generates the appropriate mask for aligning the proper set of digits of the data word, such as the mantissa or the exponent, for operation thereon by the arithmetic logic unit.

The visual display 3 in FIG. 1 displays the contents of the B register and/or the A register in combination with the Flag A register. The segment decode PLA 63 is programmable such that either the output of the A or the B register may be decoded to drive appropriate segments in the display, and is programmable so as to accommodate up to 7 segments plus decimal point. A zero suppression circuit 64 provides suppression of the leading zeros so as to provide up to 10 digits of significant digits in a 12 digit display utilizing scientific notation. Suppressor 64 is responsive to the push/pull matrix 52 for beginning and ending suppression, and is also responsive to the decimal point generator and B register.

Inclusion of Register E in Registers 50 is a feature of the invention. Sigma decode matrix 74 controls the selector gates so as to allow exchange of Register E with Register A. Thus, the contents of Register E, although having no direct outlet, may be indirectly displayed via exchange with Register A or the contents may be acted upon by the arithmetic logic unit by exchange with Register A. Such a feature allows five registers to access a four input ALU, i.e., an N input adder addressed by N + 1 registers.

Another feature of this invention is the application of the subroutine register 55 in combination with the keyboard register 54 in a SAM configuration. Because the keyboard register functions mainly to address a specific location in the main ROM on the SCOM chip, the ability to store that location in, for example, the subroutine register via an exchange instruction, saves both hardware and software requirements. For example, by storing this information in the subroutine register, the keyboard register is free to perform other functions without endangering the loss of the memory address. Thus, when the subroutine has been executed and control of the program is to be returned to that address, another exchange between the keyboard register and the subroutine register allows that address in the ROM chip to be directly addressed via the keyboard register upon a specific comman "P Reg" which communicates a 1 at time So on the EXT line.

The P Reg command supplies both control instructions and ROM address on the external line in multiplexed format on the SCOM chip. This address accesses address register 23 on the SCOM chip which is capable of addressing each of the addressable locations in the ROM 20, whereby the instruction stored in each location is read out into the instruction register 26. Usually the address register is incremented by one for each instruction cycle, as controlled by timing means and the ADD-1 circuit 25, so that the instructions of a particular subroutine stored in the ROM are normally read out in sequence. However, branch instructions appearing at the instruction register 26 are recognized by the branch comparator 33 and interrupt the sequencing of the ROM address by a relative addressing method. That is, the "old" ROM address is incremented positively or negatively in accordance with the instruction word from one of the ROM's available on either the SCOM or other external chip and the new location is stored in the holding register 24. For example, an incremental address read out from the specific ROM location to the instruction register 26 and transmitted to the arithmetic chip through buffer 27 on line IRG in transmitted to the adder 32 along with an actuation signal from the branch comparator indicating a branch condition. The previous ROM address stored in the address register 23 is also communicated to the adder 32 via line 40 and the sum is transmitted via line 41 to the holding register 24. During the next instruction cycle, the new address word is read into the address register in parallel from the holding register 24.

The branch comparator 33 is responsive to the instruction word and to the command word from the arithmetic chip transmitted on the EXT line. If the $I_{12}$ (or $S_{15}$) bit of the present instruction word is for a branch, and if $S_0$ is not a 1 allowing a branch possibility, and if the $S_1$ digit bit thereof, the COND bit, matches the condition bit at $S_{14}$ of the previous instruction word, then a branch results. If a COND match doesn't result, the address is incremented by one. The COND bit on the EXT line serves to indicate to the ROM that a special condition has been executed which may interrupt the ROM sequencing.

To address one of the constant registers in the constant ROM 35, or in one of the constant ROMs 35 if a plurality of SCOM chips are utilized in the system, the instruction word from the proper ROM 20 in one of the ROM/SCOM chips is communicated to the IRG pin and then communicated into all the instruction registers 26. The instruction word communicated to the arithmetic chip inhibits the $S_0$ bit to provide a logic 0 at $S_0$. If the instruction is not for a branch as above explained, then the instruction word is decoded by decode PLA 28 to generate "recall constant" command. The command word from the arithmetic chip on the EXT line having a zero at $S_0$ is decoded in the constant register address circuit 34.

Upon a recall constant command received from the decode PLA 28 recall constant and constant A-constant D signals appropriately address the constant ROM 35 for recalling one of the sixteen constants therein contained in sixteen, four bit constant registers. The constant ROM 35 comprises a 64 × 16 (or 16 × 4 × 16) unit array to generate the sixteen, 16-digit, 4-bit constant.

Decode PLA 28 also provides input/output controls to register F 29 and register G 30 which are additional data registers providing increased data storage suitable for memory storage under the operator's control. Data is stored into and recalled from the registers F and G, respectively, through I/O 1...I/O 8 lines, in response to the decode PLA 28 which decodes the instruction word from the ROM. As explained with respect to recall constant, the instruction word from the SCOM inhibits the $S_0$ bits preventing PREG. Only then will the F and G registers be addressable through decoder 28 as the I/O control 31 is under the control of the recall constant signal, which is generated in response only to the appropriate chip select signal.

Inputs from the keyboard 11 are entered into the arithmetic chip on seven keyboards lines or K lines 13 which are encoded into a 3-bit binary code by the encode PLA 75 for entry, along with the appropriate D time, into the KR Register 54. Data is entered into the encode PLA for an entire D time when a line is discharged, and then the lines are precharged awaiting a new code. As will be subsequently explained, because of the relatively long duration of a key depression on the keyboard as compared to the relatively high clock operating rates, a single key depression actuates the PLA 75 for sufficient instruction cycles to complete the routine called for; for example, upon expiration of one instruction cycle when the lines are discharged, the same keyboard entry is again reimpressed upon the decode PLA 75 for the next several instruction cycles upon the occurrence of the respective D time of each cycle. The detailed explanation and description of the timing of the calculator system will be described hereafter with regard to FIGS. 5a and 5b.

The K inputs are encoded by the PLA 75 and strobed into a K comparator 78 and into control logic and encoder 77. The K comparator 78 is also responsive to selected bits of the instruction word IRG which are programmed so that a comparison of the IRG bits and the encoded keyboard information provides information representing either that a specific K line has not been actuated, or provides information determining which K line has been actuated by a process of elimination. If a match is accomplished at the K comparator 78, the output thereof on line 85 causes the condition circuit 80 to set the COND latch, which setting has a predetermined meaning to the calculator at a particular S/D time combination.

The encoded K information is also communicated to the logic and encoder 77 which also selectively actuates the condition circuit 80 in combination with internally generated "wait" signals from the WAIT generator 69, and from the BUSY input terminal which communicates with other output chips, such as the printer. Upon a command from the flag mask generator 68, logic 77 allows the encoded K information to be serially combined with encoded D times and entered into the keyboard register 54 through the keyboard register/subroutine register control 79 in accordance with the condition of the COND latch and the WAIT generator. Shown in FIG. 3 is D time $D_{15}$ actuating logic 63 which automatically kicks the calculator out of a SCAN cycle if no keys are found actuated.

Thus, specific, keyboard inputs, encoded as K line data and D time data, are loaded into the keyboard register 54. A P Reg command forces the ROM on the SCOM chip to be addressed to a location as determined by the contents of the keyboard register.

The keyboard register provides functions other than addressing the main ROM and the constant ROM in the SCOM chip. For example, the tri-state buffer 86 on the external line EXT is controlled by instruction words so that data also may be entered onto the arithmetic chip as well as communicated from the arithmetic chip. Upon such an instruction, data on the external line such as from the programmer chip 16, may be entered into the keyboard register through the keyboard register control circuit 79. Another function of the keyboard register utilizes an instruction word which causes the contents of the keyboard register to be incremented by one, allowing it to function as a counter. If the number in the keyboard register represents an address of a constant in the constant ROM on the SCOM chip, then a succession of constants may be recalled during successive instruction cycles so that a subroutine may perform several iterations utilizing progressively smaller constants according to an arithmetic progression. That is, since the keyboard register recirculates and has an add-one circuit, information therein may also be incremented by one, thereby providing a method for addressing constants in sequence in the constant ROM by doing a succession of recall constant instructions with the keyboard register incremented by one each time. Utilizing the keyboard register in such an iteration technique is an important feature which allows implementation of the subroutine function with a minimum of software requirements.

Four bits of the contents of the keyboard register also may be read into register R5 when a KR → R5 instruction word is ordered. Because R5 is coupled into the registers A–D through the adder, then a number generated in the keyboard register may be inserted into the SAM memories for, for example, use in a software routine in the ROM requiring numerical data. By loading data in the keyboard register directly into the registers A–D in the SMA, instruction space in the ROM is saved in that otherwise a subroutine would be required to generate this data.

The instruction word $I_0$–$I_{12}$ on lines IRG in comprised of a 3-bit sigma S field or selector gate field $I_0$–$I_2$, a 4-bit R field or register field $I_4$–$I_7$, a 1-bit sub or subtract filed $I_3$, a 4-bit M or mask field $I_8$–$I_{11}$, an a 1-bit branch field $I_{12}$. As $S_{15}$ after the instruction word has been serially clocked onto the IRG line which started at $S_3$, the 4-bit M field of the instruction word and the $I_{12}$ branch bit is decoded by the mask decode matrix 83. The mask decode PLA functions so as to provide a "mask" for allowing manipulation of only a selected part of the data word, i.e., the mantissa or the exponenet. This function is needed only when an instruction is commanded, as opposed to a branch, so the mask decode matrix is only responsive to the M field when the branch bit is a zero. The mask decoder is further responsive to the push-pull matrix 52 which provides encoded state times, the decimal point and exponent during timing information. The mask decode matrix provides an output signal DMSK or digit mask for providing the mask for the selector gates coupled to the sigma decode matrix 74. Also provided are masks coupled to the ALU control 57 for providing a mask for any particular part of the data word to be added. Line 87 provides control to the BCD corrector 59 for preventing improper carries out of certain mask fields. Bits $I_8$–$I_{12}$ also generate a constant N as decoded by the mask decode PLA 83 for input to the binary adder, as controlled by the R field, bits $I_4$–$I_7$, as decoded by the R decode 73.

At $S_{13}$–$S_{15}$, the 3-bit sigma field is clocked into the sigma decode matrix 74. The sigma field is decoded for selecting, transferring or recirculating data among the registers A–E. That is, lines 89 control the exchange of data between the A and B registers and between the C and D registers and controls recirculation of the A, B, C or D registers. The sigma field also controls the selector gates so as to allow entry of the Reg. 5 back into the adder via lines 88. Sigma control lines also control entry of the output of the BCD corrector 61 back into the SAM for right and left shifting.

The R or register decode matrix 73 receives the R field during $S_6$–$S_9$ of the instruction word which controls the selector gates 56 for determining what main register in the SAM is coupled to the ALU. Also, bits $I_4$–$I_7$ are generated to the K comparator 78 as earlier explained.

The flag mask comparator 68 receives the R field $I_4$–$I_7$ of the instruction word and compares it with the encoded S time for providing "FMSK" or "flag mask" when a flag operation is commanded. Output from the flag test and compare logic 68 is coupled to the COND condition circuit 80 as an indication that the condition exists that, for example, two flags are the same. The flag decode PLA 72 is responsive to the $I_0$–$I_3$ bits for generating flag register commands including recirculate, exchange, R5 to keyboard register, test flags and setting and zeroing idle latch. Bits $I_0$–$I_3$ are also decoded and supplied to the K comparator 78.

Operation of the A-E registers and the ALU is briefly as follows. Assuming data in the SAM register is awaiting operations, the instruction word subsequently is decoded into its M, R and sigma fields. If, for example, the instruction is for an add routine, the sigma filed may cause the data in Reg. A to be entered into Reg. B, awaiting a second data input from the keyboard to be entered into the keyboard register which is then entered into Reg. A through Reg. 5 as above described. Under the control of the R field from the instruction word, the respective registers A and B are coupled into the ALU binary adder. The M field of the instruction word provides masks from decode PLA 83 supplying to the ALU the location of the decimal point, and what part of the word is the mantissa. Reg. 5 in response to the mask decode PLA 83 receives at the edge of the digit mask signal the output of the ALU which is the decimal point location. The mantissa part of the output word from the ALU is then coupled back into Reg. A through a BCD corrector 61 as needed. At a proper time the A reg. is then outputed through segment decode PLA 63 to the display.

In displaying the decimal point information in Reg. 5, a routine generally utilizing the D time generator 67, the decimal point/D comparator 71 and the R5 register 65 is utilized. That is, as above described, R5 contains a number representing the location of the decimal point position. That number is coupled to the DPT/D comparator 71 along with the encoded D times.

When the D time representing the timing of the system matches the adjusted decimal point input, then at time $S_{15}$ the decimal point output at pin 1 is actuated for the duration of the instruction cycle by way of the idle latch circuit. A particular decimal point indicator on the display is energized during the particular D time at the desired location in the display in response to pin 1.

Another feature of this calculating system is the leading zero suppression of the display. The D/S flag test and mask comparator 68 provides a sample signal every instruction cycle when the S time encode and D time encode is coincident so that the time of occurrence of the sample signal is one of precession, i.e., $S_{15}$ of $D_{15}$, $S_{14}$ of $D_{14}$, $S_{13}$ of $D_{13}$, etc. because D times precess. This sample signal gates the segment decode PLA 63 which, coupled with a zero suppression gate 64, provides zero suppression of the most significant digit first. Suppressor 64 is responsive to the DPT generator for ending zero suppression upon occurence of a decimal point, and zero suppress is ended by a bit communication from the B register during an EE entry. Also, the Push/Pull matrix supplies Start/Stop zero suppression signals every D time.

The initial program which the calculator executes ıon actuation by a user is the power up clear routine. ıe power up clear circuit 76 which clears and initial- :s the calculator upon user initial actuation provides first input to the external buffer 86 control circuitry :nerating a 1 at $S_0$ and zeros thereafter on the EXT ıe. This is accomplished by setting the $S_0$ flag of the B register and setting bits $S_3$–$S_{15}$ to zero in the KB reg- ter. The KQ input from the keyboard at time $D_{15}$ pro- des another hardware clear input on the EXT line for itializing the calculator. That is, upon power up, or a :y down at $D_{15}$ on line KQ, the clear circuit 76 forces 1 at time $S_0$ to be outputed on the EXT output line ıd causes zeros during the remaining S times. At time $_0$, the SCOM sees a 1 and realizes that the subsequent ıstruction during $S_3$–$S_{15}$ is an address which is zero. he ROM is thereby reset back to location zero and :ads out of location zero an instruction word to begin s initial sequencing.

THE IDLE, HOLD AND COND COMMAND BITS

Sequencing of "new" instructions coming from the ꞮOM to the arithmetic chip at times are desirously in- errupted. That is, if the calculator is waiting for a par- icular time before executing the next instruction, the ꞮOM must send out a succession of "WAIT" instruc- ions. The ROM is then instructed to stop incrementing ınd for it to "HOLD" at its present location and to con- inue sending out the instruction stored in the instruc- .ion register location. To accomplish this, the old ad- ɪress in the address register is recirculated through an nhibit increment circuit. An example is during a key- ɔoard scan requiring a comple D or instruction cycle.

On the standard programming of the two-chip system of this invention, the $S_2$ or "HOLD" bit is controlled by the presence of a wait instruction from wait generator 69 or the test/wait busy or test/scan decoded command having its respective test condition fulfilled. These are commands for the ROM to stop incrementing at its particular location until reactuated by the data chip. During the one state of hold, the holding register 24 on the SCOM chip receives back the same previous instruction, which genrates either the wait or the scan instruction. The same command is read back into the holding register as the HOLD signal inactivates the add-1 circuit 25 and the instruction register 26. The calculator stays in the recirculating loop until the presence of a $D_{15}$ signal which changes the state of HOLD allowing entry of a new address into the address register and then a new address from the instruction register, as incremented, to be entered into the holding register. One example of such a wait or scan function is scanning of the keyboard where a wait until $D_{15}$ is necessary. This ensures that the scan is started on $D_{15}$ to assure scanning of all keyboard lines. Otherwise, if a scan started at $D_{13}$ instead of $D_{15}$, remembering that the D times count backwards, a complete scan would comprise $D_{13}$–$D_0$–$D_{15}$, without scanning $D_{14}$. At the next time $D_{15}$, the calculator is kicked out of the wait/scan instruction as a hardware function at time $D_{15}$ and a new instruction word is executed.

The signal IDLE communicates to external chips whether or not the data chip is in the "idle condition" and changes state at a predetermined S time and D time to synchronize the SCOM's timing generators. This synchronization is a feature of the invention as a separate sync signal and transmission line is not required, as in conventional systems. In the idle condition, the calculator's outputs to the segment terminals Seg A-Seg G and DPT are actuated at D time rate, and the machine is awaiting further information. When the calculator is not in the idle mode, it is actually computing, and the external display is blank except for the flag output which is displayed at S time rates. Thus, the idle output will either be in a high or low state representing a calculating/not calculating conditions. Idle is responsive to the idle latch circuit, above discussed with respect to hold, which selectively actuates idle in response to instructions such as set idle or zero idle whether or not data is actually being operated on. For example, the idle instruction is utilized to transport synchronization information to the SCOM chip at $D_{14}S_0$ wherein the S counter 38 is synchronized at $S_0$ and the D scan generator is set at $D_{13}$ by respective edge detector circuits. By programming a WAIT $D_{15}$ instruction followed by a set idle the idle terminal transmits a level change of logic one to logic zero at $D_{14}S_0$ (remembering that $D_{14}$ is the next instruction cycle after $D_{15}$ as D times precess). This is a feature of the calculator system which allows a one pin reduction of the conventional requirement.

$\overline{\text{Idle}}$, in addition to providing idle conditions and sync timing, also performs other functions. That is, if flag condition information is being sent to other chips, $\overline{\text{Idle}}$ is utilized to indicate at what rate the flag information is being sent. That is, whenever data is being displayed, i.e., the calculator is in the idle condition, the flags are being sent at the same timing rate as the register information, i.e., one particular flag is transmitted during each instruction cycle or D time. This enables the flag to actuate functions such as decimal points, minus signs, or commas depending upon the specific program.

When the calculator is not in an idle mode, and $\overline{\text{Idle}}$ is in the "other" condition, the flags are being transmitted at state time rates; that is, one flag per state time or sixteen flags per instruction cycle or D time. The flag during this time may be utilized to selectively actuate other chips depending on whether or not a particular figure flag is set. Therefore, $\overline{\text{idle}}$ controls whether other chips will look at a particular flag by knowing whether or not the calculator is in idle.

The condition circuit 80 provides an output COND at $S_1$ during the second bit of EXT for providing to the ROM a conditional branch instruction. That is, if upon a particular test command the condition circuit and the COND bit is set and the $S_{14}$ or COND bit of the branch instruction is also set, a new branch address generated and stored in the holding register is transferred to the address register causing the ROM to jump or branch thereto. If the condition circuit is not set in relation to the $S_{14}$ bit, the next instruction word in sequence in the ROM is executed. For example, if the software routine requires a branch instruction when a particular flag is set, then at a particular time in the instruction cycle the flag is tested, and if the condition circuit is set in relationship to whether the flag was set, then the ROM branches to the location of the desired routine. If the condition circuit is not set with respect to the flag condition, then the next sequential instruction from the original ROM location is executed.

The feature of a condition circuit and COND signal provides the machine the capacity of decision making dependent upon conditions which are under software control increasing versatility. Other software controlled conditions which may set or reset the condition latch circuit is the depression of a particular key on the keyboard input, setting the latch. In response to this particular setting of the condition latch when a keyboard key is depressed, the keyboard scan is terminated. The condition latch is also set if, during any add or subtract operation, a carry out of the last digit of the register or a borrow out of the last digit is required. In other words, the condition circuit functions to indicate an overflow condition. The condition latch may also be set upon a particular test flag operation, wherein if the flag is set hen the condition latch will also get set and conversely.

The busy signal is an input to the arithmetic chip which may be tested in a manner similar to that of testing a flag. For example, upon a test busy instruction, if there is an input on the busy terminal, software causes a setting of the condition circuit. If a printer chip is included in the expandable calculator system herein described, it may be desirous for the calculator to stay in the idle mode until the printer chip has finished printing out the results. Then an input on the busy terminal from the printer chip indicates to the arithmetic chip that the printer is active and cannot take any more data in to be printed. The arithmetic chip monitors the busy terminal and if a signal is thereon, the condition circuit will be set, allowing the calculator to perform a conditional branch to a particular wait condition until the printer is finished printing and ready to receive more information. The busy terminal may also be used to create a wait condition until the signal subsides and also to provide feedback to the arithmetic chip as to the status of other peripheral chips such as the 10-register chip in addition to the printer chip in a manner similar to that above-described.

The input/output circuit 82 is used to both output data from registers in the SAM to external chips and to input data from the external chips to the data chip. Whether or not data is being input or output and to which registers the data is channeled is under software control.

The Flag A, FLGA, output is utilized to display particular conditions of the calculator, such as error, arithmetic overflow, or entry overflow conditions. The output may also be utilized as a comma output which is stored in the Flag A register. Flag A is under control of the $\overline{\text{Idle}}$ signal and may be utilized for communication to other chips while the calculator is actually in the not idle or computing mode. As earlier discussed, in the calculating or not idle mode, the flags appear at the Flag A output once every gives S time. This particular flag information is communicated to other chips, for example, the 10-register chip, which in combination with idle directs the 10-register chip to store the conveyed data in a particular data memory therin. Utilizing the flags in this way in a feature of this invention as an almost unlimited amount of expansion is possible with peripheral chips in combination with the arithmetic and SCOM chips. The outputs labeled Seg. A-Seg G are the outputs by which the 4-bit output code from the SAM registers is communicated to the display indicating which numeral is to be displayed. The two-chip system of this invention has segment decoding circuits 63 which may be programmed responsive to register B and/or to provide a programmable number of segments. That is, some types of displays require seven segments, as illustrated, to display the data.

The output labeled DPT is the decimal point output which is actuated at the particular D time responsive to the DPT/D generator 71 as controlled by Reg 5. No external decoding is necessary in the embodiment herein described, as the DPT output directly actuates the particular decimal point in the display.

The FLGB output terminal may also be utilized for outputting Flag B information. It is possible therefore in extremely complex systems using many peripheral chips wherein flags are used as means of controlling the chips, to output both sets of Flag A and Flag B. The Flag A output pin 11 has been discussed above. By outputing both Flag A and Flag B information, the amount of available control capacity is doubled. It is understood that in computer technology a flag is merely on binary bit indicating a preprogrammed condition which may be used to trigger circuitry.

INSTRUCTION/ADDRESS/CONTROL WORD FORMAT

Figure 5A:
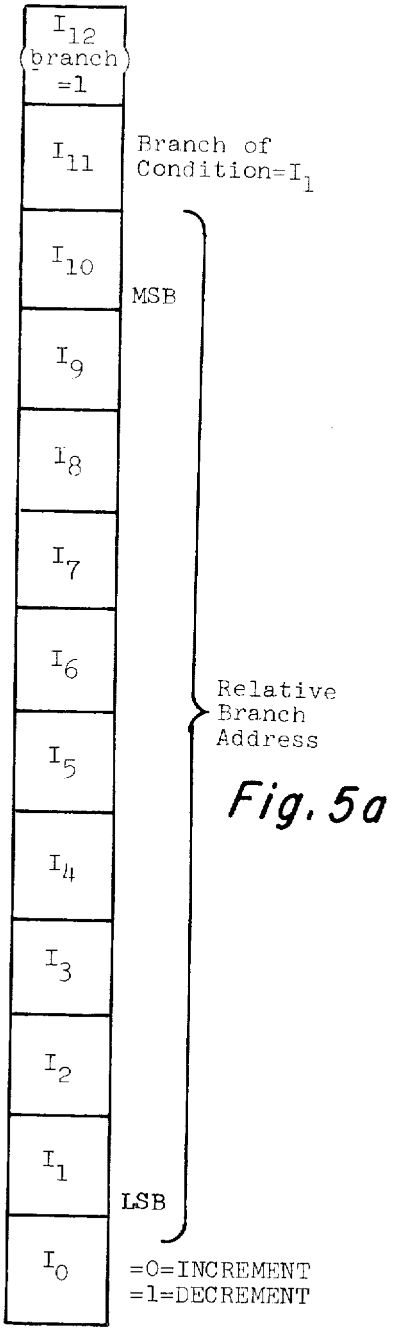
FIGS. 5a–5e are representations showing the coding of the instruction word used in the system of the invention.
Figure 5B:
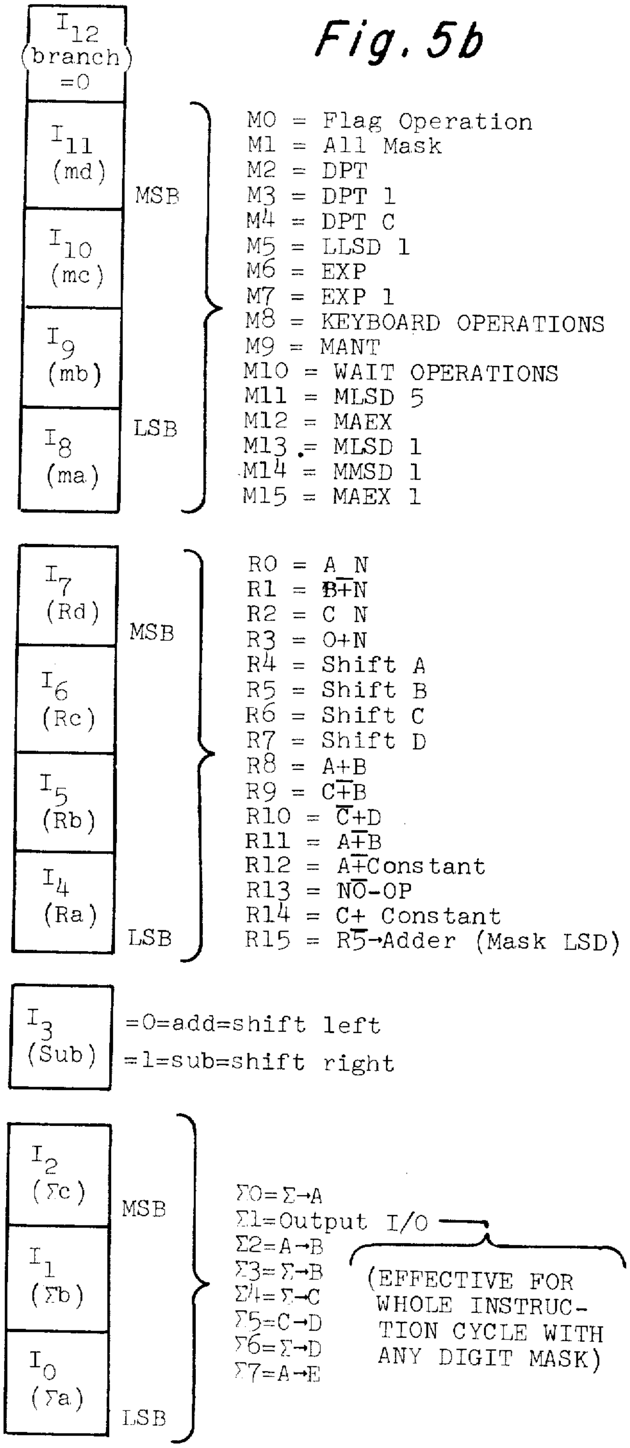
Figures 5C, 5D:
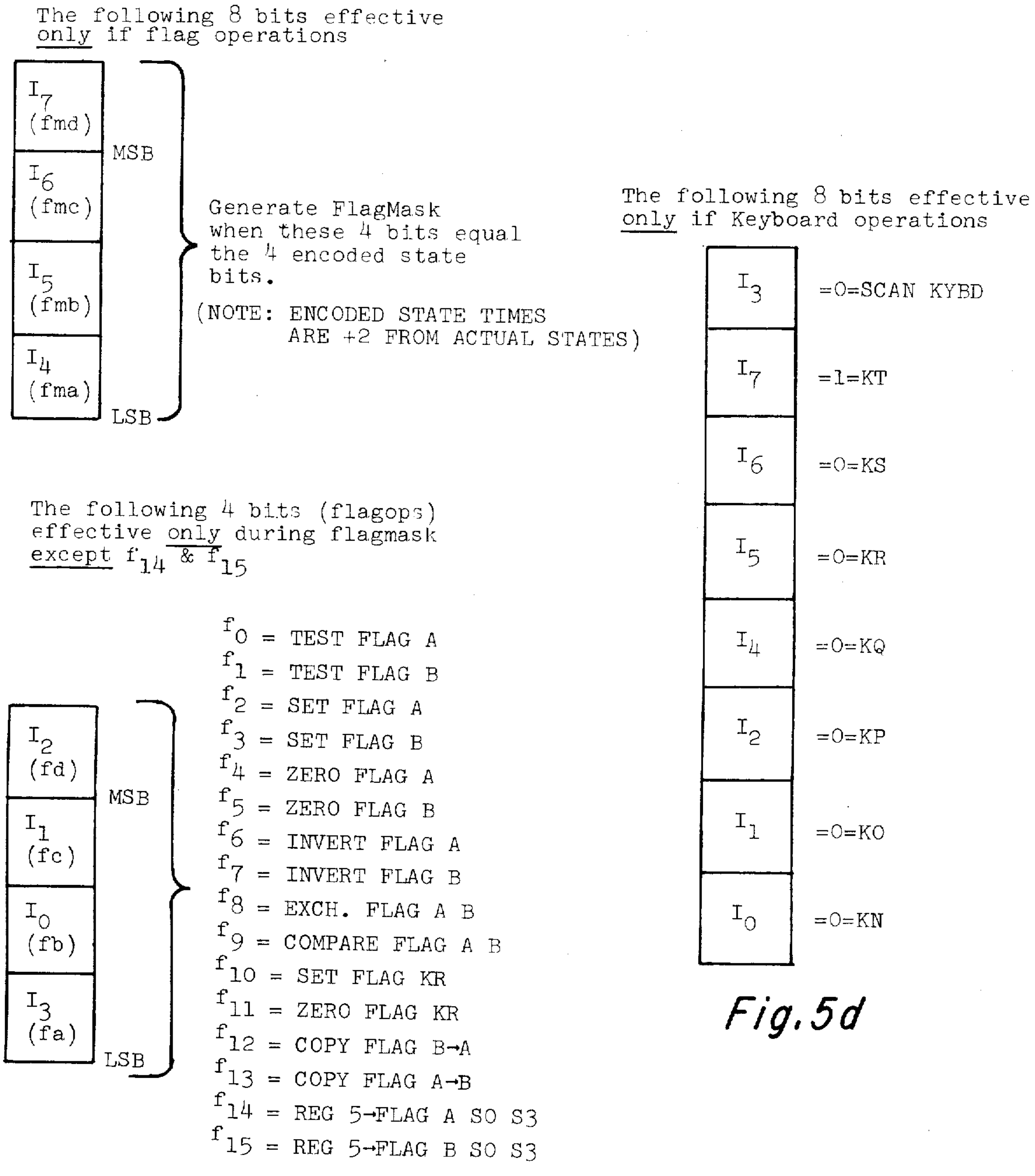
Figure 5G:
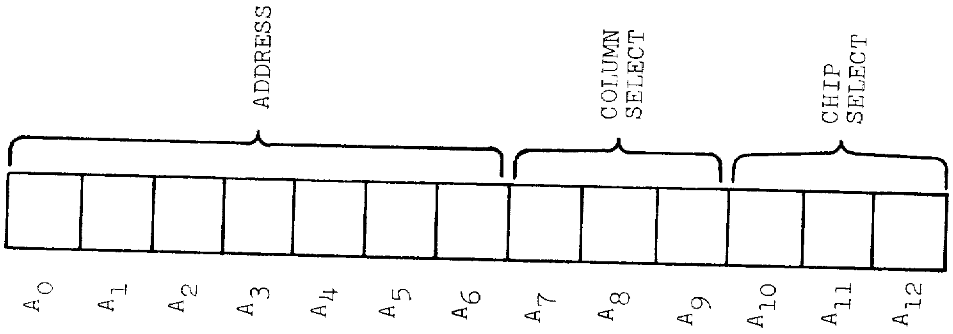
FIG. 5g shows the ROM address as stored in the address register.

Shown in FIGS. *5a–5f* are representations of the instruction word $I_0$–$I_{12}$ as decoded by the various decode PLAs above-mentioned. FIG. 5a denotes the thirteen bit instruction word $I_0$–$I_{12}$ as it appears in the instruction register 26 on the SCOM chip after is has been read out of the ROM 20. The formats for operations on branches (or increments) are different as seen in FIGS *5a* and *5b*. The $I_{12}$ bit is shown containing a 1 indicating that the instruction word is either an increment or a conditional branch command and not an instruction. That is, if bit $I_{11}$, the COND bit, matches the COND bit of external communicated from the arithmetic chip at time $S_1$, then bits $I_1$–$I_{10}$ of FIG. 5a represent a relative branch address. That is, bits $I_1$–$I_{10}$ represent an incremental number which is to be added or subtracted from the previous ROM location as commanded by the $I_0$ bit in FIG. 5a to generate a new address as shown in FIG. 5g. IF the $I_0$ bit is a zero, then the relative branch address in bits $I_1$–$I_{10}$ is to be added to the old address. If $I_0$ is a 1, then the relative branch address is to be subtracted from the old address.

If the $I_{12}$ bit of the instruction word in the instruction register 26 is a zero, then bits $I_0$–$I_{11}$ represent an instruction which is decoded locally on the arithmetic chip and in the decode PLA 28 on the SCOM chip. For example, bits $I_8$–$I_{12}$ are decoded in the digit mask PLA 83 to provide the M or masking operations defined for an M field of $M_0$–$M_{15}$ and to provide a constant N. Bits $I_4$–$I_7$ are decoded by the R decode PLA 73 to provide the register or R operation indicated. Bits $I_4$–$I_7$ are also decoded in the D/S flag test and mask comparator 68 for providing FMSK as shown in FIG. 5c. Bits $I_0$–$I_2$ are decoded in the sigma decoder 74 for controlling register select while the $I_3$ bit actuates the logic and encoder 77 for indicating add or subtract. In FIG. 5c, the $I_0$–$I_3$ bits are decoded by the flag decode PLA 72 for generating the F or flag commands for controlling the flag registers. Decode PLA 28 decodes the instruction word for providing store and recall of the F and G registers.

Bits $I_0$–$I_7$ also actuate the K comparator 78 for determining which K line of the keyboard has been actuated upon a key depression. In FIG. 5e, bits $I_0$–$I_3$, which are decoded in the flag decode PLA 72, also generate the wait or W instructions for placing the calculator in a non-operational or waiting condition until a specified condition such as the arrival of a specific D time encoded in bits $I_4$–$I_7$. Bits $I_4$–$I_7$ are decoded in the flag mask comparator 68 for generating the condition whose occurrence controls wait.

Figure 5F:
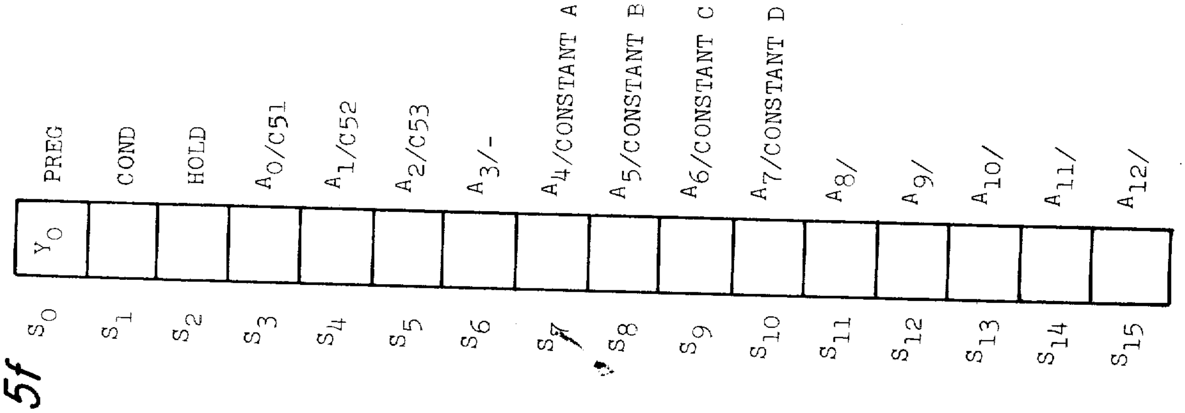
FIG. 5f shows the decoding of the EXTERNAL signal.
Figure 5E:
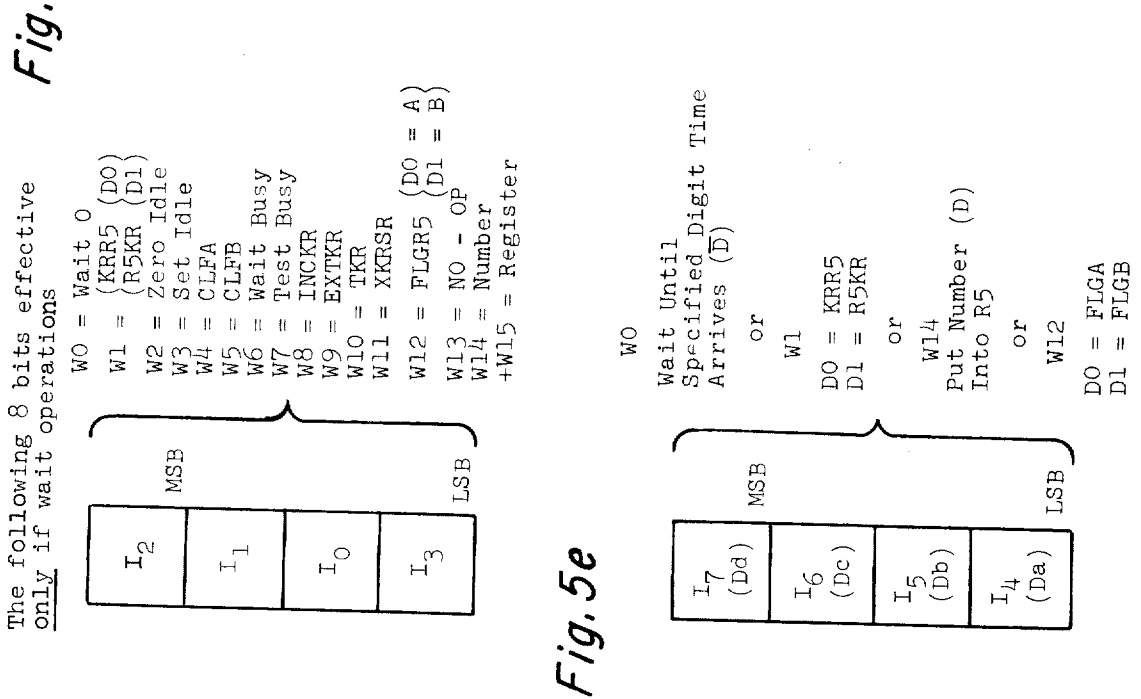

In FIG. 5f, the external command EXT is generated from the data chip in performing a P Reg or constant :OM recall. In bit $S_0$, the P Reg command with a 1 herein represents the condition that the arithmetic hip is desiring to jam a specific address into the ROM or causing an unconditional jump, such as at power up lear. A zero in bit $S_0$ represents the conditions that the rithmetic chip may be either addressing the constant ROM, executing a conditional branch or merely com- nunicating COND and HOLD signals. The P Reg jam- n circuitry is inactivated during constant recall allow- ng the ROM to increment normally. The second bit, occurring at time $S_1$, is the COND bit for communicat- ng to the SCOM chip the status of the condition latch, ndicating that a conditional event has occurred to which the ROM should respond. The COND bit at time $S_1$ controls whether or not a conditional branch is exe- cuted as determined by the most recent instruction word from the ROM. That is, if the $S_1$ bit of external matches bit $I_{11}$ of the branch instruction, then the ROM will be incremented by the relative branch address as earlier discussed.

The third bit of external, occurring at time $S_2$, is the HOLD command indicating that the SCOM is to inhibit the incrementing of the ROM and HOLD the ROM instruction word for a specific period. The HOLD bit is responsive, for example, to the WAIT generator 69.

Bits $S_3$–$S_{15}$ are always specific absolute addresses. If the $S_0$ bit is a 1, then the $S_3$–$S_{15}$ bits represent a specific address in the ROM to which it is to branch. If the $S_0$ bit is zero, then the $S_3$–$S_{15}$ address may be that of a constant location in the constant ROM 35 for doing a recall constant or a conditional branch to the specific main ROM location. Upon a recall constant instruction, as decoded from the decode PLA 28, then the preceeding EXT communication with a zero at time $S_0$ will recall the specific constant.

Depicted in FIG. 5g is the coding format for the ROM address word as stored in the address register 23 on the SCOM chip. As the 1024 13-bit instruction words are stored in the ROM 20 in a 64 × 16 × 13 bit array, bits $A_0$–$A_6$ address the 64 rows of the ROM, while the $A_7$–$A_9$ bits address the 8 columns per row for selecting the proper column addressed. Bits $A_{10}$–$A_{12}$ represent chip select and are decoded so as to enable buffer 27 so as to control whether or not the instruction word from the ROM 20 is communicated to the arithmetic chip.

TIMING

The entire system operates on two externally provided clocks $\phi_1$ and $\phi_2$ and two internally generated clocks $P_1$ and $P_2$. The frequency used is 250 KHz for $\phi_1$, $\phi_2$. The clock generators may be conventional and are not shown herein.

One set of clocks $\phi_1 P_1 \phi_2 P_2$ is referred to as a state time, and represents the time for one bit from each of the main registers A, B, C and D to be operated on in parallel by the ALU, etc. The BCD arithmetic used in the invention requires one full set of clock pulses for each digit, so sixteen sets or state times are needed to perform arithmetic operations on all sixteen digits in a register. Sixteen state times represent one D time or instruction cycle, as seen in FIG. 6b.

Individual address lines in the registers 50–55 are energized only for three of the clocks $\phi_1$, $P_1$, $\phi_2$, rather than all four; these groups of three are also referred to as state times $S_0$–$S_{15}$. The same state times generated to operate the address lines of the SAM register 23 also operate or time the remainder of the system.

D times generated directly from the state times $S_0$–$S_{15}$ are used to scan the keyboard and the display. As seen in FIG. 6b, the D times count down, $D_{15}$, $D_{14}$, $D_{13}$ $D_0$ while the state times count up, $S_0$, $S_1$, $S_2$ $S_{15}$; this feature aids in the zero suppression technique since leading zeros to be suppressed are on the left or MSD first while the ALU must operate from right to left or LSD first.

THE KEYBOARD INPUT MATRIX

Figure 7:
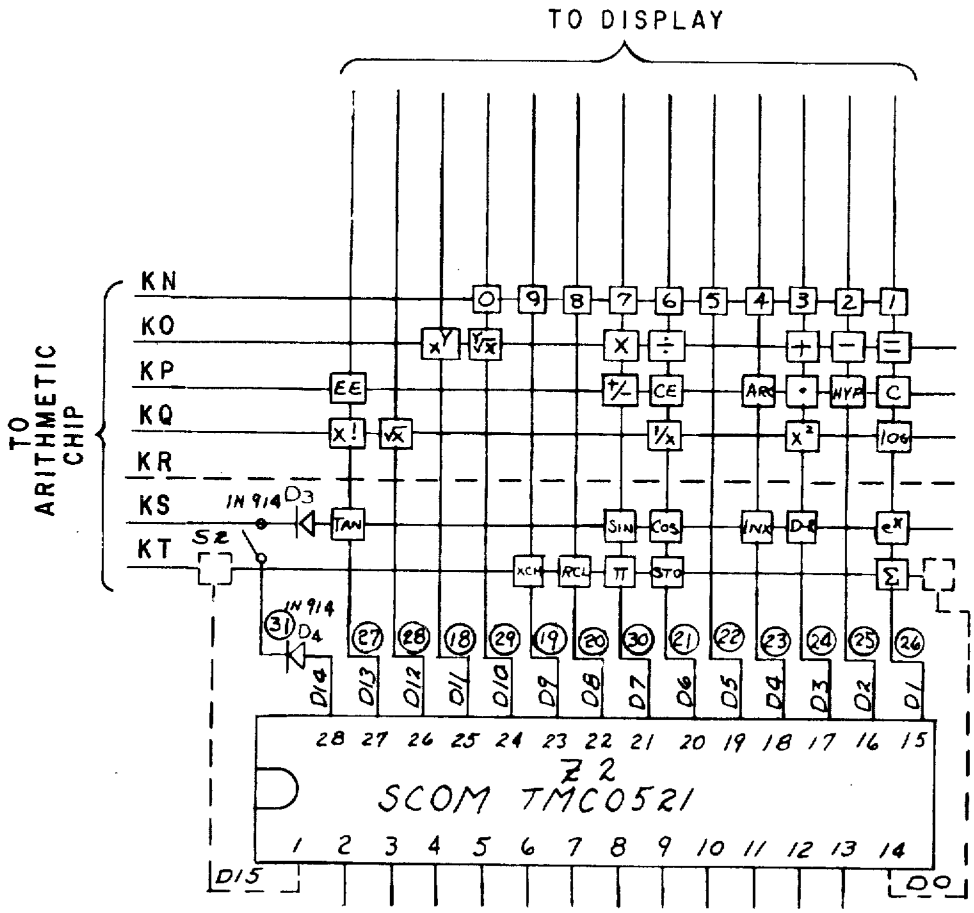
FIG. 7 is a representation of the keyboard input matrix.

In FIG. 7, there is seen a sixteen by seven matrix showing the keys from the keyboard arranged as scanned by the sixteen digit timing signals $D_0$–$D_{15}$, and as sensed on the seven outputs at KN–KT, from which keyboard information is entered into the system. If a 1 voltage appears on line KP at $D_{13}$ time, then the EE key is depressed, etc. The combination of a digit time and a sense line identifies a key, and these sixteen and seven line items are binary encoded within the machine to appear as 4 and 3 bits respectively; TABLE 1A shows the format for loading keyboard and digit time information into the keyboard register 54, with the code of TABLE 1B being used for K information. If a key at $D_{10}$, KP is down after a keyboard scan, the keyboard register will contain the word of TABLE 1c.

TABLE 1A

| | $K_a$ | $K_b$ | $K_c$ | $D_8$ | $D_4$ | $D_2$ | $D_1$ |
|---|---|---|---|---|---|---|---|
| MSB | | | | | | | LSB |

TABLE 1B

| K - line | Ka | Kb | Kc |
|---|---|---|---|
| KN | 0 | 0 | 0 |
| KO | 0 | 0 | 1 |
| KP | 0 | 1 | 0 |
| KQ | 0 | 1 | 1 |
| KR | 1 | 0 | 0 |
| KS | 1 | 0 | 1 |
| KT | 1 | 1 | 0 |

TABLE 1C

| | | | | | | | |
|---|---|---|---|---|---|---|---|
| X | 0 | 1 | 0 | 1 | 0 | 1 | 0 |
| | KP | | | D10 | | | |

DETAILED DESCRIPTION OF THE CIRCUITS

THE KEYBOARD INPUT SYSTEM (FIGS. 8b5–6, 8b9–10)

Keyboard or K information communicated from the KN–KT keyboard lines enters the data chip via pins 8–14. Bias elements 100 bias lines KN–KT to a logic 0 state so as to effectually precharge the lines in anticipation of signals from the keyboard, Precharge gates 101 precharge each of the lead-in lines from pins 8–14 at times $S_{15}\phi_1$ through $S_{15}P_1$. A keyboard scanning technique similar to that set forth in "Expandable Function Electronic Calculator," Ser. No. 255,856 now abandoned and replaced by continuation application No. 444,226, copending herewith, strobes the keyboard lines in accordance with D times to provide the signals entering on pins 8–14. Each line is strobed for one D time, and the input data appearing on lines KN–KT appears for one D time.

For convenience, description of the keyboard will be exemplified for line KN only, but it is readily seen that the other six keyboard information lines are structurally similar and operate in the manner described with respect to line KN. By precharging the lines 102 by means 101 at time $S_{15}$ to logic zero, the keyboard data is effectively entered into the input circuitry at the next succeeding S time, or $S_O$, with actuation indicated by a logic 1.

At time $S_0\phi_1$, inverted K information is entered into the register 103 comprising three clocked transfer gates such that data is allowed to the PLA 104 at time $S_0$ and remains there for one D time until time $S_{15}$ for decoding. Data is decoded for an entire D time to allow time for executing the keyboard command. At time $S_{15}P_2$, the line 102 input to the inverter is discharged to circuit ground, clearing for the next input signal, and the line 103 is precharged to $V_{DD}$ awaiting the next input signal. The succeeding K line signal is typically the same signal, as a keyboard operator actuates a K line for some 1000 instruction cycles per key depression.

Decode means 104 comprises a programmable logic array (PLA) used for generating a code indicating which specific K line was actuated on the keyboard. Programmable logic arrays, which function as a NAND gate, are now well known in the art. Encoder 104 provides first and second sets of encoded output data, $\overline{K_A}$–$\overline{K_C}$, $K_A$–$K_C$, generated as a logic NAND combination of selected K lines. The first set is the logic complement of the second set, a feature which advantageously provides data for determining when more than one key on the input keyboard has been depressed during a D time, i.e., an error condition caused by simultaneously punching two keys. The KN line is seen as an input to $\overline{K_A}$, $\overline{K_B}$ and $\overline{K_C}$ for the $\overline{K}$ set and is not an input for the K set. $\overline{K_A}$ is seen to be the logic combination of KN · KP · KR · KT.

One of the lines 107 from the storage circuit 103 generates on line 108 an output signal providing a hardware clear signal. Although a contact is shown on each K line, they are programmable and only one will be implemented. At time $S_0\phi_1$, this signal is gated into logic arrangement 110 via line 109, so that at $D_{15}S_1$, in response to line 111, a zero is generated and gated to the keyboard register input circuitry for generating a 1 at $S_0$ to be transmitted to the SCOM chip, indicating that an address is being transmitted through EXT during $S_{3-15}$, which address is zero. Further, if a power up latch signal is received during initial powering up of the calculator, logic arrangement 110 similarly outputs a logic 0 for resetting the calculator by transmitting a 1 in the $S_0$ bit of EXT, followed by a zero address.

A set of logic OR gates 112 logically ORs the respective K line information with the respective digits of the instruction word $I_0$–$I_2$, $I_4$–$I_7$ into a comparator arrangement 113 for determining if a particular K line has been activated. That is, fields $I_0$–$I_2$ of the instruction word and $I_4$–$I_7$ are set to a particular logic state; for example, all 1's except for one logic 0 bit which is utilized to test the particular K line. If the match condition of the comparator circuit 113 is realized, then the particular K line corresponding to that logic 0 test but has been activated. That is, at time $S_{15}$ all K lines are precharged to a logic zero and inverted and then one is subsequently activated by key depression to a logic zero. Thus, all K lines except one provide logic 1 bits to the OR gates 112. The instruction digits generate all 1's except for a test zero respectively coupled to the OR gates 111, and if the zero from the instruction bits and the zero on the actuated K line are coincident, then comparator 113 will indicate a match by outputing a 1. A program may be executed testing whether a single line has been actuated, or a set of tests may be performed to determine which K line has been actuated. Comparator 113 is enabled by the M8 mask via line 114 from the digit mask PLA 83 in response to the instruction word decoding for a keyboard operation.

The output of the comparator 113 is coupled to an exclusive OR logic arrangement 116 and to a logic gate 117 for generating the HOLD signal. The exclusive OR gate 116 is a feature of this invention in that it prevents erroneous keyboard inputs or erroneous COND signals to the calculator caused by the dual depression of keys. That is, both sets of data $\overline{K}$ and K are logically combined in gate 116 such that if and only if K is the logic complement of the $\overline{K}$ set, is a signal generated preventing the COND circuit 118 from being set, allowing recognition of the keyboard instruction inputed. For example, upon depression of more than one keyboard key, logic gate 116 provides a logic 1 to the logic arrangement 119 which generated a "zero" $\overline{CONDA}$ signal during "test/scan" causing the condition latch 118 not to be set to a logic zero, i.e., remains a logic one. This logic 1 state of COND is communicated via line 120 to gate 121 controlling entry of the keyboard data into the keyboard I/0 control 79. That is, only when the condition circuit remains unset does the gate 121 provide logic zeros to the keyboard I/0 control allowing entry of the keyboard data via line 122.

Gate 121 is also responsive to line 114 communicating the M8 mask which indicates a keyboard operation, and is responsive to the $I_3$ bit of the instruction word, wherein a zero therein represents a scan keyboard operation, as indicated by FIG. 5*d*.

HOLD signal generator 117 selectively generates the HOLD command on line 127 creating the HOLD bit at time $S_2$ in the external command. Generator 117 is responsive to several decoded instruction commands including the WAIT command on line 125 as generated by the WAIT generator 69. During this instruction, HOLD is generated until a specified condition is met, such as for a specific D time or until the busy line is no longer busy. To prevent the calculator from bcoming "stuck" in a WAIT loop, generator 117 is automatically forced to change state at $D_{15}$ via input 128.

A command from the flag decode PLA 72 on line 124 allows monitoring of the busy input terminal on pin 29 such that busy is tested or causes a WAIT cycle in accordance with the decode of the $I_3$ digit on line 126. If the busy terminal is actuated, typically the output peripheral is presently active and is unable to accept any more information, or is busy. Therefore, a WAIT cycle is generated until the peripheral is able to accept more data.

Figure 6A:
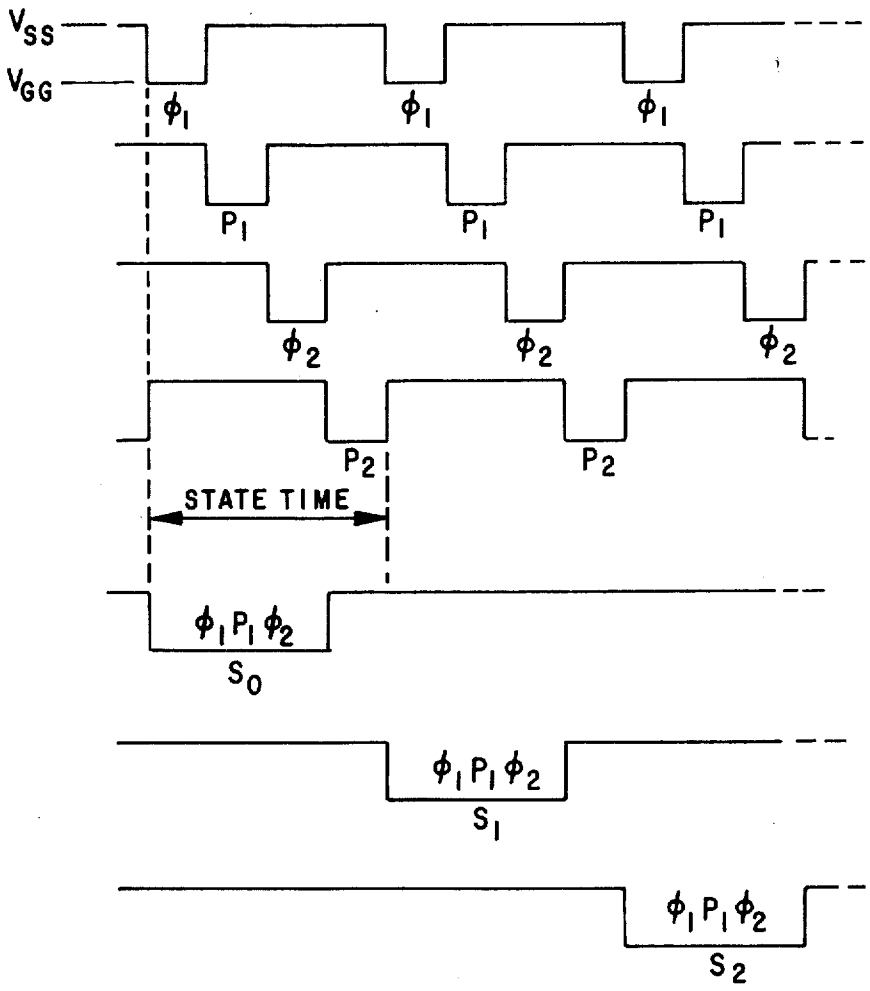
FIGS. 6a–6b are timing diagrams showing the timing of various parts of the system of the invention.
Figure 6B:
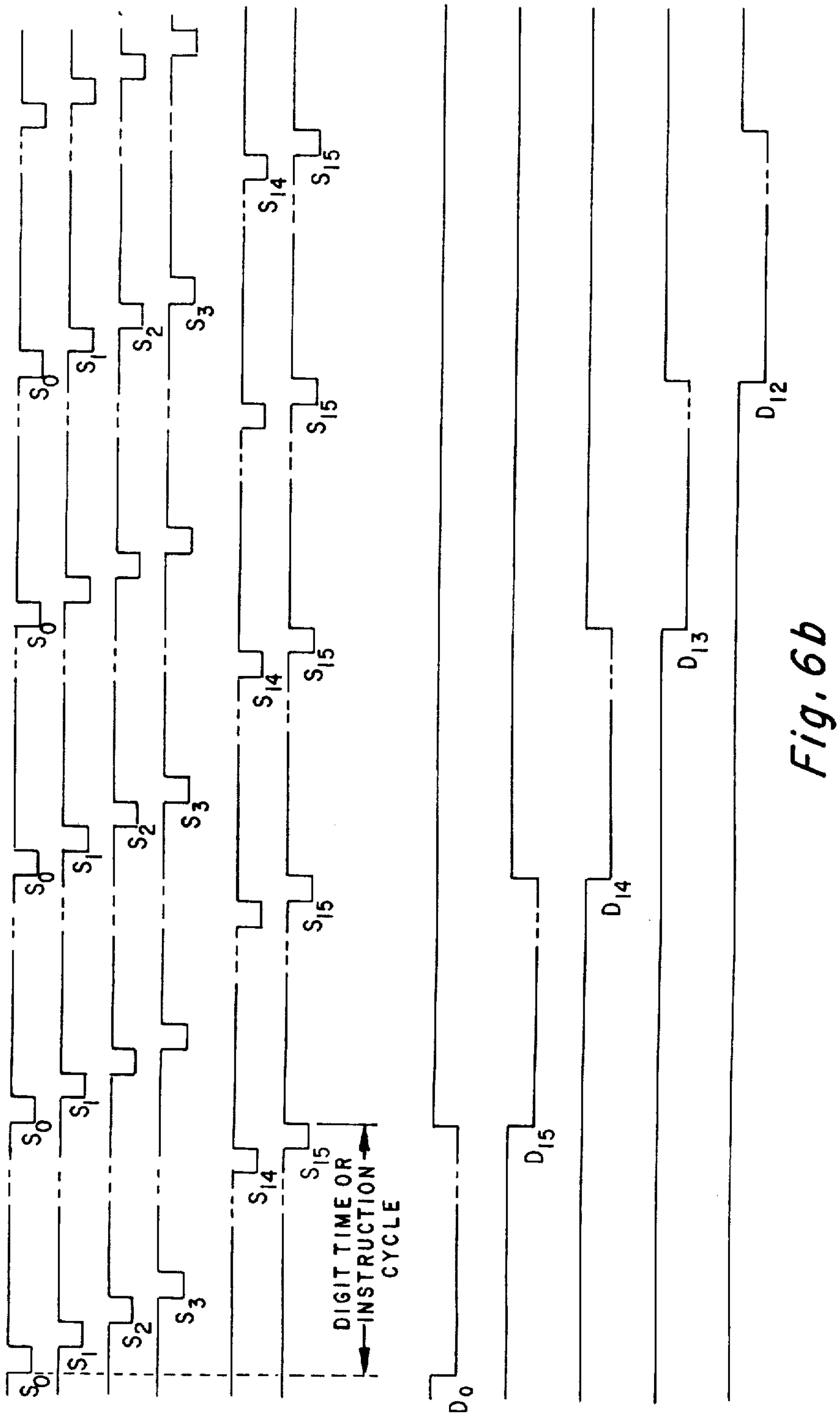
Figure 8A:
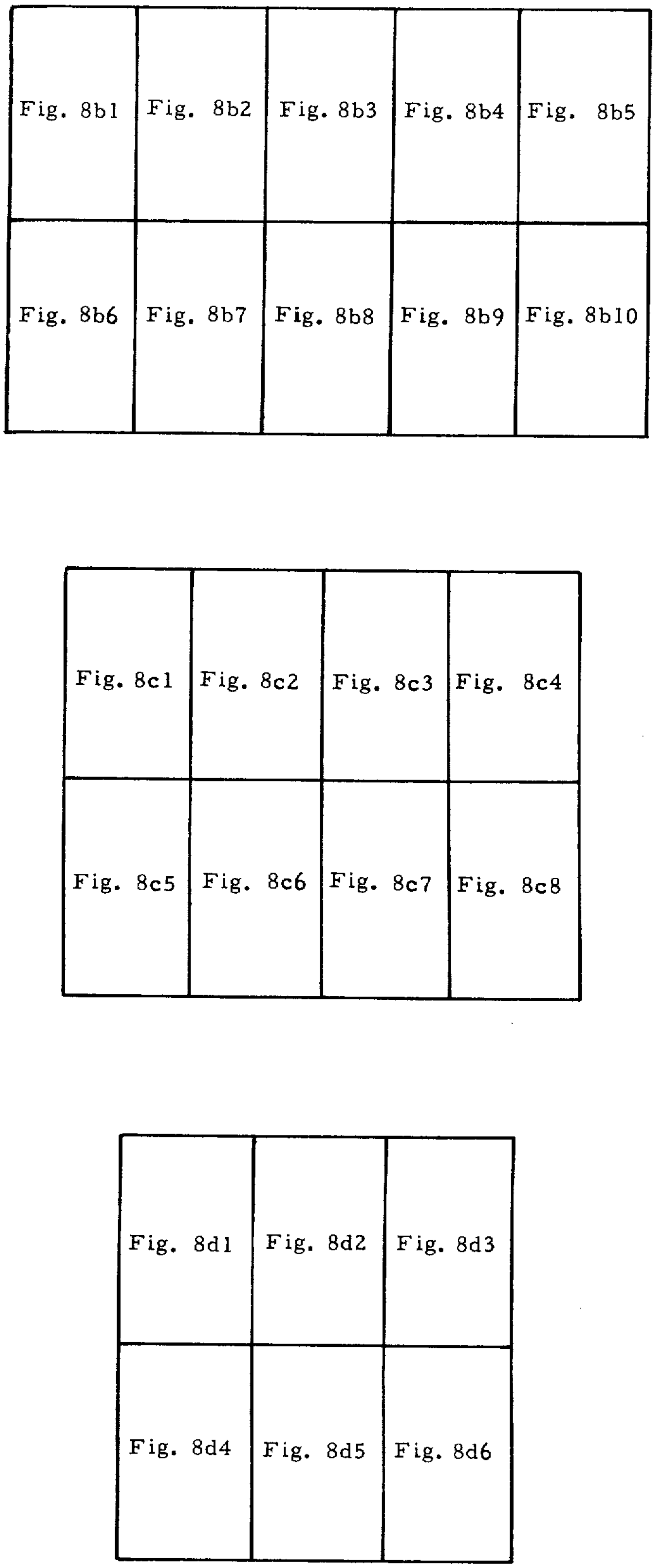

The serial encoder 129 is responsive to the encoded K line information, $\overline{K_A}$, $\overline{K_B}$, $\overline{K_C}$ from PLA 104 on lines 105, and is further responsive on line 130 to encoded digit times as generated by the D time generator 67. During times $S_2$–$S_5$, as generated from the push/pull matrix 52 and transmitted via line 131, the encoded D times are read into the encoder 129. These are serially transmitted via line 122 to the keyboard input/output control 79 during $S_2$–$S_5$. During times $S_6$–$S_8$, the encoded K line information is serially transmitted. In this manner, a 7-bit encoded word is entered into the keyboard register 54 representing a particular K line which was actuated at a particular D time for indicating which y was depressed on the keyboard.

ıE KEYBOARD REGISTER I/0 CONTROL (FIGS. 8b1, 8b6)

The keyboard register I/0 control 79 comprises a mplex set of logic gates for controlling whether data entered into the keyboard register 54 from the subutine register 55 via line 132 as controlled by an $\overline{EX}$ $\overline{KR \cdot SR}$ command from the flag decode PLA 72, or ıether the external data is entered via line 133 as conɔlled by the $\overline{EXT \rightarrow KR}$ command from the flag deɔde 79, or whether the contents of R5 is entered via ıe 134 as controlled by the $\overline{R5 \cdot KR}$ command, or hether the 7-bit encoded word from the keyboard ıtry as earlier discussed is entered via line 122 as conolled by the latch 121.

The complex logic gates in I/0 control 79 also conols whether or not data is communicated through the XT terminal through the tri-state output buffer 135. ri-state output buffers are now well known in the art, nd exhibit three output states, a logic 1 state, a logic ɜro state, and then a "floating" state wherein the outut exhibits an open circuit condition. The buffer ıereupon may be utilized to allow use of the EXT pad s an input terminal to the I/0 control 79. For example, pon an $\overline{EXT \rightarrow KR}$ command from the flag decode 'LA 79 on line 136, a logic zero is supplied to the ɪAND gate pair which feeds the tri-state buffer 135, enerating a pair of logic 1's to the input of the buffer. 'his generates the floating output state allowing the lata on the external line to be entered into the keyɔoard register.

To transmit data on the EXT line, such as during a P ₹eg command to cause an unconditional branching of he ROM on the SCOM chip, a 1 must be generated at ime $S_0$ on the EXT line. This is realized via line 138 'rom the push/pull matrix 52 which supplies a logic ɛero to the inverter 139 providing a logic 1 on line 140 o gate 141. Gate 141 generates a zero to the latch nput circuitry of the tristate buffer, which generates the desired 1 at time $S_0$.

Referring again to inverter 139, it is responsive to either line 138 as described or is responsive to the output of the complex logic gate 142 which controls inputs into the keyboard register as controlled by the flag PLA as earlier described. Transfer gates 143 and 144 respectively control actuation of inverter 139 upon actuation of a $\phi_1$ clock, which $\phi_1$ clock is supplied only to one of transfer gates 143 and 144 as determined by the output of logic circuit 110. That is, if a logic zero is generated upon the output of logic circuit 110 indicating a power up or hardware clear condition, then clock $\phi_1$ is supplied to transfer gate 143 as earlier described. If a zero is output from logic circuitry 110, then $\phi_1$ is supplied to the transfer gate 144 allowing input to the keyboard register as controlled by gate 142.

The $S_1$ or second bit on the EXT line is the condition bit, and OR gate 145 is responsive to $\overline{S_1}$ and the $\overline{COND}$ bit via line 146 for generating COND at time $S_1$ to the input latch circuitry to the tri-state buffer 135. $\overline{S_1}$ is also generated to gate 141 to enable the input latch at time $S_1$.

In a similar manner, at time $S_2$, the HOLD bit is supplied to OR gate 147 at time $\overline{S_2}$ which is supplied to the input latch circuit to buffer 135. $\overline{S_2}$ is also supplied to NAND gate 141 for enabling the latch at time $S_2$.

The output of the keyboard register 54 is transmitted on line 148 to complex logic gate 142, which is communicated to the inverter 139 and then to gate 141 via line 140 as earlier described in accordance with particular instruction words such as FMASK and set/zero KR. OR gates 145 and 147 supply 1's to the input latch circuitry allowing the contents of the keyboard register to be supplied through NAND gate 141 to the tri-state output buffer.

The output of the keyboard register on line 148 is also supplied to complex logic gate 149 which controls entry into the subroutine register 55. Appropriate commands from the flag decode PLA 72 control entry into the subroutine register 55 by controlling gate 149.

Other functions of the keyboard register 54 allow recirculation of the data therein, and an incrementing of 1 via a $\overline{KR + 1}$ command from the flag decode matrix 72. Upon such a $\overline{KR + 1}$ command, NOR gate 150 provides an incremented output on line 151 which is reentered into the keyboard register 54. Such a function allows the KR register to function as a counter for calling in sequence constant ROM locations when needed in an iteration loop of a subroutine.

Above-described is operation of the keyboard register as it periodically controls operation of the SCOM chip by communicating on the EXT line. Such a keyboard register implemented in a sequentially addressed memory (SAM) configuration and the other logic circuitry providing the appropriate control bits at times $S_0$–$S_2$ is an important feature of this invention allowing flexible communication with other chips in the calculator system with a minimum of pin requirements, thereby maximizing silicon area utilization.

NOR gate 150 is responsive to line 152 from the push/pull matrix which disenables the input to the keyboard register during times $S_0$–$S_2$. This disenabling prevents any of the command signals of times $S_0$–$S_2$ from entering the keyboard register 54, allowing these command signals only to affect the EXT word.

The flag input/output circuitry 73, comprises first and second complex logic gates 153 and 154, responsive to instruction words and data lines from other registers.

Gate 153 controls input to the Flag A register 53A while gate 154 controls entry into the Flag B register 53B. Outputs are respectively transmitted on lines 154*a* and 155*a* to the "FLGA and FLGB" lines and are further recommunicated to each gate 153 and 154 so that the Flag A and Flag B registers can be both recirculated and exchanged. Furthermore, the R5 register may be input to either Flag A or Flag B registers upon appropriate commands and each flag may be inverted.

Both flag registers, like the keyboard register, have separately addressable bits, each of which may be output to other chips. For example, the Flag A output line 154*a* is communicated to Flag A logic circuitry 155 (FIG. 8*d*2) which is also responsive to the idle latch 156 for generating an output at the FLA terminal, pin 15. The output of the idle latch 156 is either changing at an S time rate or at a D time rate, so that the output of logic 155 will be changing accordingly, so that the FLA information will either be communicated to other chips at an S time or a D time rate.

The Flag B information is transmitted to NAND gate 157 (FIG. 8*b*10) for controlling the Flag B output terminal at pin 30. NAND gate 157 is also responsive to the first bit of the B register 50*b* so that either Flag B or B1 of the B register may be outputed at pin 30.

The Flag B and busy terminals at pins 30 and 29 respectively are programmable in that, instead of inputting the busy and outputting Flag B or B1 information at pins 29 and 30 respectively, the information may be programmed via contacts 158 and 159 so that any unused K lines may be utilized as the outputs or the output. Thus, 2 pins may be deleted to achieve a 28 pin package instead of the 30 pin package shown. Contacts 158 and 159 are programmable and, although shown as one contact per each of the seven K lines, only one of the contacts on each line would be implemented if a 28 pin package were desired using busy and FLAG B.

REGISTERS A–E AS IMPLEMENTED IN A SAM (FIGS. 8c1–8c7)

The main registers of the calculator system, Registers A, B, C, D and E, are implemented with a random access memory arrangement which is operated in a manner similar to a set of shift registers, as set forth in copending patent application, Ser. No. 163,683. All registers in the SAM are comprised of four separate rows in BCD format. For example, the A register comprises rows A1, A2, A4 and A8 so as to provide a data word having four bits per digit. These bit rows are interleaved for saving space in interconnecting the registers and the ALU through the selector gates on the chip. Each row of the registers includes 16 cells, 157, or one cell for each bit, with each cell being a conventional three transistor MOS RAM memory cell. All the memory cells 157 in the SAM are the same, and there a total of 16 × 5 × 4 or 320 cells in the main A, B, C, D and E registers. The Flag A and B registers, and the subroutine and keyboard registers, earlier described, also are implemented in the SAM and comprise the same memory cell and function as will be described with respect to the main A-E registers.

Vertical lines in the SAM are address lines 158, of which there are 17, which are lines driven by a commutator 51 comprising a 17 stage ring counter which circulates a zero in synchronization with state times. There are 17 address lines and 17 cells in a register while only 16 S times so that the $S_{16}$ cell is also outputed at time $S_0$.

Only one of the address lines 158 is energized at any one time, and the energized line shifts from right to left in the order $S_0$, $S_1$, $S_2$. . . $S_{15}$, $S_0$, etc. These S times are used throughout the calculator system, and they are seen depicted in FIG. 6B. In FIGS. 8b2–8b3, a recirculate signal of logic zero is generated and coupled back to the beginning stage by line 159 when the output of the $S_0$–$S_{14}$ stages all are a logic 1. At time $P_1$, the logic zero is inverted to a logic 1 by inverter 160, and at time $P_2$, the logic 1 is reinverted to a logic zero by inverter 161 and impressed upon the $S_0$ address line until the next $P_2$. However, at the top of the SAM and at the other end of the line 158, it is seen that gate 162 is also responsive to the $P_2$ signal, so that the $S_0$ address line is discharged to a logic 1 during $P_2$. Therefore, the address line $S_0$ resides at a logic zero or $V_{DD}$ state during $\phi_1 P_1 \phi_2$ to generate the subsequent S time.

Looking now at the $S_0$ column and the B1 bit row in the B register, when the logic zero energizes or actuates the $S_0$ address line, the MOS transistor 163 becomes conductive allowing output of the stored data in the particular cell. That is, conduction of transistor 163 couples the data storage capacitor 164 to the output line 166. If previously a zero has been stored on the gate of storage transistor 164, then circuit ground would be coupled to output line 166. Similarly, if a logic 1 had been stored on the gate of storage transistor

164, then transistor 164 would be nonconducting, and line 166 would remain in its precharged condition, as precharged during the $P_2$ clock by transistor 168.

To input information into the $S_0$B1 bit, the $S_1$ address line is actuated to a logic zero causing transistor 165 to become conductive which allows entry onto the gate of storage capacitor 164 of whatever data is impressed on input line 167. It is thus seen that information read into the cell via line 167 is stored on the gate of storage capacitor 164 in true form, but that when the information is read out of the memory cell, it is inverted, or it is in false logic.

The inputs to the line 167 for storing specific data in the memory cells 157 are generated from the adder circuit 55 on lines 169 and 170. NOR gate 171 couples either the output of the adder back into the appropriate memory cell, or it couples the contents of the left adjacent memory cell into the right adjacent memory cell to accomplish a shift right function. That is, if it is desired that the data in bit $S_1$ in the B1 row of the B register be right shifted into the $S_0$ bit of the B1 row at time $S_1$, the contents of the $S_1$ cell is read onto line 166 in inverted form. A decoded instruction word actuates gate 172 via a B→Y command calling for the contents of the B register to be supplied to the Y input of the adder. Thereupon, the data is thrice inverted back to NOR gate 171 where it is impressed upon the input line of the B1 row during the same $S_1$ time during which it is read into the $S_0$ bit in its true form.

Line 169 supplied to NOR gate 171 also supplies data which is to be left shifted by one bit upon a shift left command. That is, when the output of the $S_0$ bit, for example, is supplied to the Y input of the adder as above described, and delayed two and one-half S times through transfer gates 173, 174 and 175 and is coupled through AND gate 176 via the shift left command, then the data is transmitted by line 169 through gate 171 back onto input line 167 for entry into the $S_2$ bit, thereby performing a left shift.

Upon other appropriate commands, the main registers may be recirculated and exchanged. For example, upon a recirculate B command, data from the B register on line 166 is gated through OR gate 168 into complex gate 179 after a one and one-half S time delay so that the data is read back into the same cell. To exchange data between registers an $\overline{\text{EXAB}}$ command to complex gates 179 and 180 causes the output of the A register to be communicated to gate 179 and the output of the B register to be communicated to the gate 180 so that one S time later each data bit is read back into the cell which the other bit came from.

An important feature of this invention is the inclusion of the fifth main register, Register E, in the SAM in combination with Registers A–D. Register E has no external port coupled directly to the adder 55, so that the only functions performable in Register E are recirculate and exchange with Register A. Such limited functions, however, are extremely useful in saving software instructions and hardware requirements in increasing access to the ALU of the calculator system. For example, by including a fifth register having the capacity to exchange its contents with one of four registers directly coupled to the ALU, then effectively the adder is responsive to an extra register without the hardware requirements of a direct connection to the ALU. That is, by storing a fifth data word in Register E, then the adder is responsive not only to Registers A, B, C and D, but upon completion of the operation of the data word in Register A, the contents of Register E may be exchanged therewith and operated on by the adder 55. In effect, then, the calculator system of this invention features an N input adder responsive to N + 1 registers.

THE PUSH/PULL MATRIX (FIGS. 8*b*1, 8*b*3)

Coupled to the bottom of the subroutine register 55 is a push/pull matrix 52 which functions to generate a number of timing signals. Push/pull matrices in combination with SAM registers are now well known and are explained in copending application, Ser. No. 255,856. Four lines 318 are outputs of the matrix 52 and provide an encoded indication of the 16 S times $S_0$–$S_{15}$ which are supplied to the digit mask PLA 83 and to the strobe generator and flag mask comparator 68. A HEX signal on line 319 is shown which may be programmed to allow the adder 55 to operate in hexadecimal rather than in binary. Having a gate, as represented by a zero, on every S line except $S_0$, it is seen that HEX is effectively inactivated for this embodiment for all S times except during $S_0$. During $S_0$, such information as decimal point location which requires use of a hexadecimal format is in the adder, so the adder is disabled at time $S_0$ by HEX. PLA 1-PLA 5 signals on lines 320 are communicated to the digit mask PLA 83 so as to control duration or timing of the respective mask signals. On lines 321 and 322 are shown generated end zero suppression and start zero suppression signals, respectively, which are supplied to the zero suppression circuit 64. A start zero suppression signal is shown to begin at time $S_{14}$ and last through time $S_2$. An end zero suppress signal is generated at time $S_3$, for causing display of the last significant zero during time D3 as will later be discussed. Coupled directly to the S lines from the commutator 51 are shown lines generating the $\overline{S}_{15}$, $\overline{S}_8$, $\overline{S}_7$, $\overline{S}_6$, $\overline{S}_2$ and $\overline{S}_1$ signals. These timing signals are utilized in various circuits on the chip requiring particular S time actuation.

THE ALU (FIGS. 8*c*3–4, 8*c*7–8)

Another feature of this calculator invention is the precharged carry propagate adder 55 which operates in parallel on the four bits comprising a digit which are serially communicated from the SAM. Carry propagate adders are generally well known in the art as taught in copending patent application, Ser. No. 176,667, "Precharge Arithmetic Logic Unit", now abandoned and replaced by Ser. No. 441,917, filed Feb. 12, 1974, which precharges only the carry/borrow circuit and the binary full adder circuit which is the subject matter of U.S. Pat. No. 3,602,705, which utilizes IGFET transfer gates generally. The adder of this invention, however, implements the sum function, $S = C\ (AB + \overline{A}\overline{B}) + \overline{C}\ (A\overline{B} + \overline{A}B)$ and the carry propagate function $K = AB + C\ (A\overline{B} + \overline{A}B)$ in a particular mode especially well suited for complex systems utilization requiring low power dissipation and a minimal silicon requirement. Adder 55 utilizes a precharge technique for conditioning the entire adder prior to each adding/subtracting step for minimizing power dissipation. Complete circuit operation follows.

The arithmetic logic unit consists basically of the bit parallel, serial digit binary adder 55 and the BCD corrector 61 including the carry/borrow logic. The adder performs subtractions by 2's complement addition.

The four parallel stages 217-220 are respectively responsive to the 1, 2, 4 and 8 outputs from two registers of the SAM. The adder unit responsive to the respective bit inputs generate outputs on lines 221–224 which are coupled into the BCD corrector 61 and into control logic for either a further coupling into R5 or back into a SAM register. Each adder stage 217–220 is responsive to a $\overline{SUB}$ and SUB instruction command, respectively, commanding the adder to provide the difference or sum of the inputed bits. $\overline{SUB}$ and SUB are generated by a decode of the $I_3$ instruction bit in the R decoder 73. If $\overline{SUB}$ is present, then the stages 217–220 perform 2's complement subtractions.

Considering now the $X_1$–$Y_1$ stage, 217, NOR gates 178 and 179 are respectively responsive to the first bit of the A and C registers and to the first bit of the B and D registers and to the sigma in line 225 from the digit mask PLA 83. The respective register lines convey the appropriate bit from the respective register, while the sigma in line 225 conveys the 1 bit of a constant as generated in the digit mask PLA 83. Sigma in lines 2–8 on lines 226–228 convey the 2, 4 and 8 bits of the constant to the adder from the digit mask PLA 83. This constant is generated in response to bits $I_8$–$I_{12}$ of the instruction word.

In effect, then, NOR gates 178 and 179 allow the adder 55 to be responsive to five sources in various combinations. Including the feature of having a fifth SAM register, or Register E, as earlier discussed, then the adder 55 is actually responsive to a sixth source. Looking then at the 1 bit of the adder, the adder has two inputs for adding a first number X and a second number Y wherein X may be selected from one of three sources and Y may be selected from one of three sources, allowing a two input adder to be responsive to six sources with a minimum of pin connections and logic controls.

The inputs to the 1 bit are respectively communicated to the carry propagate circuit or the summing circuit either in true or complement form, with the complements generated by inverters 182 and 183. $\overline{SUb}$ and SUb control whether or not the true or complement of the Y input is supplied to the carry propagate circuit and to the summing circuit.

The serially connected gates 184 and 185 in parallel with serially connected gates 186 and 187 provide an exclusive OR function of the inputs. These inputs during an add instruction (SUB) are as follows:

X to 184, $\overline{Y}$ to 185, $\overline{X}$ to 186 and Y to 187. The commonly connected sources of gates 185 and 187 provide an output for the carry propagate signal to the 2 bit. The common drains of gates 184 and 186 are coupled through precharge device 190 to line 196 which is selectively connected to $V_{DD}$ for precharging. That is, prior to the appropriate S time during which the calculation is to proceed, the lines are precharged to the common drains of gates 184 and 186. Gate 191 coupling the precharge device 190 to the commonly connected drains is actuated by line 201 which conveys the carry/borrow signal from the previous digit. If a carry for an add operation or a borrow for a subtract operation has been previously generated, gate 191 will be actuated via line 201. Gate 191 couples the precharge line 196 and the precharged load 190 to the common drain terminals of gates 184 and 186. In effect, then, the second term of the carry propagate function K has been implemented by logically ANDING the carry signal with gates 184–187 consisting of $C\ (A\overline{B} + \overline{A}B)$.

To implement the first term of the K function, gates 188 and 189 are serially connected having X and Y coupled thereto during addition. One terminal of the serial connection of gates 188 and 189 is connected to the output carry propagate line 205 for the 1 bit and the other terminal is coupled to the precharge line 196. It is seen that such operation is dynamic wherein the lines are first charged during the $P_1$ cycle of an S time, and then selectively discharged upon the proper input conditions. During an add cycle, a carry is desired if either the $X_1$ or $Y_1$ addends constitute a 1 and a carry from the previous digit has been generated. This carry is executed by providing a $P_1$ charge upon actuation of gate 191 representing the previous carry upon the serial connections of gates 184–185 and 186–187 representing $X\text{-}\overline{Y}$ and $\overline{X}\text{-}Y$ addends. Upon the condition that there is a previous carry in addition to one addend equal to a 1, then the precharge of $V_{DD}$ volts or a logic zero is communicated to the output line 205. Similarly, upon the condition that both the addends $X_1$ and $Y_1$ are 1, a carry must be generated, so that upon the conditions that $X_1$ and $Y_1 = 1$, then the precharge condition on the drain of gate 189 is communicated to the carry propagate output line 205.

To implement the sum equation, another set of serially connected gates 192–193 and 194–195 is utilized wherein each serial set is responsive to either the complement's or the true's form of the $X_1$ and $Y_1$ inputs. The drains of commonly connected gates 192 and 194 are connected to the $P_1$ precharge line 196 and the sources of gates 193 and 195 are commonly connected as an output to exclusive OR circuit comprising AND gate 197, NOR gate 198 and NOR gate 199. AND gate 197 is responsive to the output of the serially connected pair and is also responsive to the gate 191 conveying the carrying from the previous digit. NOR gate 198 is also responsive to the previous carry and is also responsive to the output of the serial pair. The output of the exclusive OR gate is gated at time $\phi_2$ of the S time of the add/subtract function through inverter 200 to provide the output according to the formula $S = C(AB + \overline{A}\,\overline{B}) + \overline{C}(A\overline{B} + \overline{A}B)$.

To perform a subtraction function, the adder utilizes a 2's complement addition whereby the subtrahend is inverted and the carryout of the fourth bit is added back into the first bit. The inversion required is implemented utilizing inverter 183 and the transfer gates on the $\overline{SUB}$ line 180 to supply the inverted $Y_1$ input to those gates previously responsive to $Y_1$.

By using such a precharge technique, in combination with IGFETS, the carry propagate adder of this invention is provided achieving minimum power dissipation and minimum silicon. Furthermore, since the precharge during $P_1$ is only one -fourth duty cycle of the S time, an adder is provided which operates with minimum time delays for high frequency operation. The 2, 4 and 8 bits 218–220 operate similarly as above discussed.

To provide the carry and borrow signals from the 8 bit as required in the above-described adder, the carry/borrow out of the 8 bit is inverted and communicated via line 204 to complex gate 208. Gate 208 is also responsive to a selected combination of the outputs of the adder 55 via line 229 so that any illegal codes which are generated will be detected. For example, because the adder 55 adds in binary and the X and Y inputs are in binary coded decimal, sometimes the output of the adder 55 on lines 221–224 constitute a number greater than 9 which is an illegal code. Accordingly, gate 211 which is responsive to the 4, 8 and 2 outputs provides a signal to gate 208 indicating that an illegal code has been received. If the output of the adder 55 generates a number greater than 9, i.e., the 8 bit is a 1 on line 230 and either the 4 or 2 bits on lines 231 and 232 respectively are 1's, then gate 211 provides a 0 to complex gate 208 indicating that a numerical correction in the form of a carry must be added.

Complex gate 202 generates the carry/borrow signal in response to the $C_8$ carry output on line 204, to the $\overline{SUB}$ input on line 180, and to the carry/borrow reset, CBRS input or by the $\overline{SUB}$ input in combination with an output from gate 208 indicating the absence of an illegal code, gate 202 provides a borrow signal to provide the required "add back bit" in 2's complement. It is seen that, if gate 208 provides an output indicating that an illegal BCD code has been generated by the adder, then no borrow signal is generated.

During the addition function, if a $C_8$ is generated out of the 8 bit, the 0 is inverted and supplied as a logic 1 on line 204 to gate 208. The input to the OR gate of gate 208 is a logic 0 from a SUB command on line 181, and the other input to the OR gate is a logic 0 indicating that an illegal BCD code has been generated on the output of the adder requiring a carry. Therefore, the output of gate 208 is a logic 1 which is communicated to gate 202 and since there is no carry/borrow reset input to gate 203, a 0 is generated at the output of gate 202 for actuating gate 191 in the adder.

The output of gate 208 indicating the presence of a carry/borrow signal is coupled to terminal 213 to indicate a carry during SUB instruction by actuating transfer gate 214, and a borrow signal is generated at terminal 213 in response to a $\overline{SUB}$ command actuating transfer gate 233 which causes the output of gate 208 to be inverted.

Shown connected to terminal 216 is a $\overline{HEX}$ input generated from the digit mask PLA 83 which is shown to effectively disable the BCD corrector during $S_0$, or any other S time desirously programmable. That is, looking at the push/pull matrix 52, line 216 will become a logic 0 only when the chosen S times $S_1$–$S_{15}$ are a logic 1. Such an input would be utilized during $S_0$ when the adder requires a hexadecimal format to accommodate data such as decimal point location.

The BCD corrector 61 adds either the numeral 6 or the numeral 10 to the output of the adder 55 whenever an illegal BCD code is recognized. If the function is an addition, the numeral 6 is added and if the function is subtraction, the numeral 10 is added. The addition of the 6 or 10 increment is provided by gates 209 and 210 for respectively providing 6 and 10. That is, during a $\overline{SUB}$ or subtract instruction, an illegal code recognized by gate 211 will cause a 1 to actuate gate 212 generating a 0 on line 233. Since $\overline{SUB}$ is a 0, then the output of gate 210 is a logical 1 which is communicated via line 231 to the adder circuit 234 which adds 1 to the 8 bit output. Line 233 also causes a 1 to be added to the 2 bit during either the subtract or add functions when an illegal BCD code is recognized because in binary a 6 or a 10 has a binary 1 in the 2's bit.

If an illegal BCD code is not generated during the subtract function, but there is a carry out of the 8 bit, then a logical 1 is generated on line 235 when gate 236 is actuated by the $\overline{SUB}$ control, so that gate 212 again is driven into the 0 state to activate gate 210.

During the add instruction, gate 209 is activated upon recognition of an illegal BCD code by gate 211 and 212 or by a carry on $C_8$. In the absence of an illegal BCD code, line 235 does not communicate a logical 1 arrangement 212 as the gated inverter arrangement 38 causes line 235 to return to a logic 0 state.

During the addition of a 6 or a 10 to convert the output of the adder 55 into binary coded decimal, a carry is sometimes generated out of the 2 bit into the 4 bit and from the 4 bit into the 8 bit. Looking at the 2 bit, a logic 1 at that output coupled with the illegal BCD code as indicated on line 233 causes actuation of transfer gates 239 and 240 allowing the precharge as supplied by line 246 and resistor 241 to propagate as a carry on line 242 into the 4 bit. This carry is added to the output of the 4 bit in arrangement 247 to generate the true adder output on line 249. If the 4 bit had been 1 prior to correction, and was corrected during an illegal BCD format during addition, then gate 243 is actuated and the carry propagates via line 245 to the 8 bit. The 8 bit output is added to the carry in logic arrangement 248 and the final output is communicated to gate 176. If there had been no carry out of the 2 bit, but there had previously been a 1 on the 4 bit prior to correction, and correction was required, then gate 244 would be actuated and again a carry would be provided via line 245 to logic arrangement 248 incrementing the 8 bit.

Thus, it is seen that the adder 55, the BCD corrector 61 and the BCD corrector control and carry/borrow generator 59 comprise in combination an arithmetic logic unit for operating in binary on BCD information. The carry propagate adder is especially well suited for high speed calculator operation as it employs a precharge technique and requires only a minimum of components to implement both add and subtract functions. Because the adder operates in binary while the inputs are in BCD, the BCD corrector in response to the binary adder outputs and to carry/borrow inputs generate the proper BCD adder output.

DECODING THE INSTRUCTION WORD

The instruction word from the SCOM chip is communicated to the data chip through the IRG terminal at pin 21 to the digit mask PLA 83 via line 249. The instruction word ripples through a 4-bit shift register 250 until at time $S_{15}$ the bits of the instruction word contained in the register 250 are gated into the PLA. That is, bits $I_0$–$I_7$ have rippled through register 250 and are communicated to other PLA's for further decoding.

PLA's are now well known in the art as set forth in copending application, Ser. No. 444,226, with vertical lines representing P diffusions and horizontal lines representing metal strips, and circles at the intersection of the horizontal and vertical lines representing a gate or thin oxide so that MOS transistors are formed. The other P diffusion lines are not shown for simplicity, but on the chip they are implemented and coupled to circuit ground. Logically, a given output line may be considered the NAND logic function of the input such that if a logic 1 is impressed everywhere that there is a circle, then a logic 0 is generated. Conversely, if a logic 0 is impressed at the terminal represented by a circle, then a logic 1 output is generated.

It is seen that the $I_{12}$ bit arriving at time $S_{15}$ is not entered into shift register 250 but is directly entered into the PLA. Therefore, at time $S_{15}$, instruction bits $I_8$–$I_{12}$ are decoded to generate the mask field M0-M15 shown in FIG. 5b. M0 is shown on line 252, $\overline{M8}$ is on line 253 and $\overline{M10}$ is on line 254. Referring to FIG. 5b, it is seen that these operations respectively call for flag, keyboard and wait operations. For example, whenever a flag operation is required, the $\overline{M0}$ instruction must be present, and likewise for the other operation fields.

The M fields M0-M15 are further decoded to generate a constant on lines 225–228 which may be jammed into the adder 55. DMSK representing a digit mask is generated on line 278 from line 256 which also is communicated to edge detector circuitry 255 for detecting the edge of any digit mask, utilized in the carry/borrow circuit and BCD corrector control 59. $\overline{\text{DMEDGD}}$ or digit mask edge delayed is communicated on line 274 to coupling circuitry between the adder 55 and register R5 for controlling entry into R5 as will subsequently be discussed. CBRS or carry/borrow reset is generated on line 273 to prevent a carry out of one digit field into the next digit field in the adder. ANYDMD or any digit mask delayed is generated on line 275 responsive to the $I_{12}$ bit in combination with a decode of the M fields and coupled to the R5 register so as to control and stop recirculation of the data in R5. The $I_{12}$ bit and the mask decode which generates ANYDMSK insures that only during an instruction in which a digit mask is generated will the contents of R5 not recirculate so as to be under control of the R5 control circuit 66.

The loads 256 of the digit mask PLA 83 is shown to be clocked by $P_2$ and $\phi_1$ respectively. This is an important feature of this invention as substantial power reduction is achieved by activating the loads and therefore drawing power only during that part of the cycle when an output is required. Loads 256 are conventional P-channel depletion load MOS devices, heretofore well known but not used in the calculator art. The depletion load devices 256 are implemented using state-of-the-art ion implant techniques. As will be seen with respect to the R decode matrix 73, the loads may also be clocked so as to be operable only during a specific S time, for providing an optimum power dissipation state. Earlier techniques have been utilized in reducing power dissipation in PLA's not having depletion load devices which gated the $V_{DD}$ power directly to the array, requiring additional components and a less desirable power dissipative condition.

The instruction word is communicated from the digit mask PLA on line 251 to the R decode matrix 73 where it is entered into a 5-bit shift register 257. Bits $I_0$–$I_2$ ripple out of register 257 leaving bits $I_4$–$I_7$ to be decoded. It is seen that loads 258 in the R decoder are clocked with the $\overline{S_0}$ signal so that the decoded outputs on lines 259 will be valid only during time $S_0$. Bits $I_4$–$I_7$ are communicated to the keyboard input circuit for use in the K comparator as earlier described. Other outputs from the R decoder 73 include shift right, shift left, SUB and $\overline{\text{SUB}}$, and R5 to adder control and the register operation commands of FIG. 5b, controlling the interconnection of Regs. A–D, the constant, R5 and the adder.

The $I_0$–$I_2$ bits ripple out of register 257 into the sigma decoder 74 on line 260. The 3-bit shift register 261 stores bits $I_0$–$I_2$ and the PLA provides the register selects exchange and recirculate controls to the main registers as shown in FIG. 5b. Also an I/O command on line 262 is generated for controlling input and output through I/O circuit 82.

The instruction word also is communicated to the D/S test and flag mask comparator 68 on line 251. A 4-bit shift register 263 stores bits $I_4$–$I_7$ while bits $I_0$–$I_3$ are propagated by line 264 to the flag decode PLA 76. Bits $I_4$–$I_7$ as the output of register 263 at time $S_{15}$ are compared by gate 279 with encoded state times on lines 318a from the push/pull matrix 51. Complex gate 265 provides an FMSK output signal indicating that a particular flag mask is to be generated at that S time during an M0 flag operation. For example, upon an M10 wait operation, then either a clear flag A command on line 266 or a clear flag B command on line 267 from the flag decode PLA 76 generates FMSK. Likewise, upon an M0 or flag operation command, then whenever the encoded state times, which are 2 state times in advance of the actual state times as generated by commutator 51, match the code of $I_4$–$I_7$ as indicated by gate 279, then FMSK is generated indicating which bit of the particular flag is to be acted on. This identification of the S time on line 280 and the FMSK signal via line 268 is communicated to the flag test and comparator circuit for enabling testing and comparing of the flags. The output of the flag test comparator at gate 270 is coupled via line 269 to the condition circuit 118 indicating the result of the test or the compare of the respective flag.

The instruction word rippling out of the flag mask comparator 68 on line 264 enters a 4-bit shift register 271 wherein bits $I_0$–$I_3$ are stored. At time $S_{15}P_1$, the $I_0$–$I_3$ bits are gated into the flag decode PLA 76 for generating various commands such as set idle latch, clear Flag A, clear Flag B, and the other F0-F15 commands as shown on FIG. 5*c*. As above noted, the flag test and compare circuit gate 270 providing an output on line 269 to the condition circuit is responsive to many of the decoded flag commands.

The flag, digit mask, sigma, and R field PLA's are all similar to the respective PLA's utilized in copending patent application, "Variable Function Program Calculator", Ser. No. 255,856, filed May 22, 1972. The PLA's in the referenced copending application, however, are not responsive to locally decoded instruction words, and do not have clocked depletion load devices on the PLA's, features found only in this invention.

Thus, the decoding of the instruction word in this register system is done locally, with various subsets of the instruction word decoded in a plurality of matrices. By utilizing localized decoding, timing of the calculator system is simplified and considerable savings of silicon space is achieved by reducing the length of lead wires from subsystem to subsystem. In earlier systems, a more centralized decoding required bussing the decoded command to over all parts of the chip.

Figure 9A:
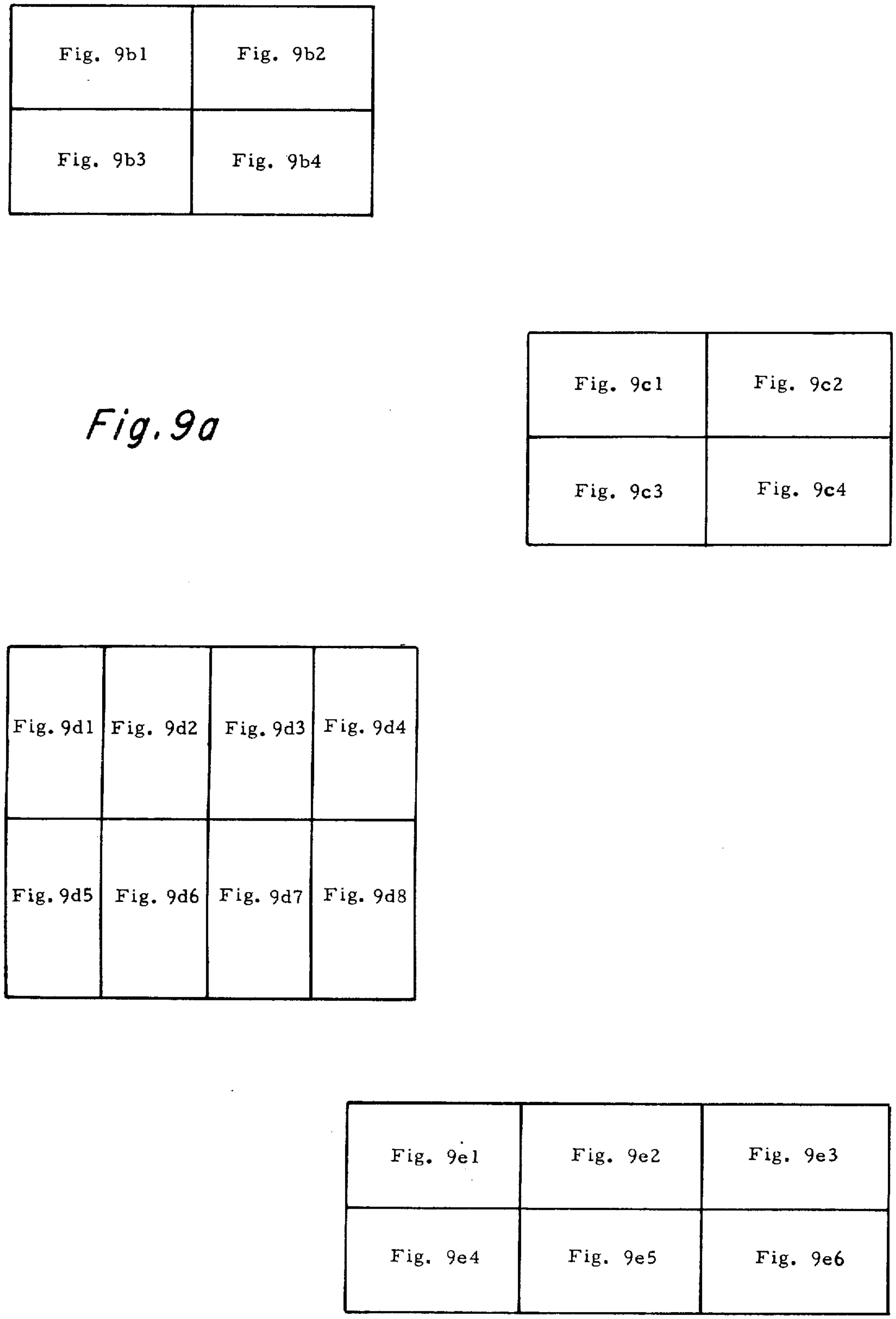

THE I/O CIRCUIT AND REGISTER 5 (FIG. 8b9)

On pins 22–25 are the Input/Output lines I/O 1 – I/O 8. Under control of the sigma decoder 74 via line 262 and of the digit mask PLA 83 via and ANYDMD control signal on line 272, data is either input or output at pins 22–25. Each respective output line is precharged to $V_{DD}$ via resistor 289 because absent a I/O input on line 262 from the sigma decoder, the input/output circuitry 82 acts as inputs. That is, lines 281 are precharged to a logic 0 and inverted so that absent an actuation signal, a 1 is supplied to gates 290 inactivating the sigma in lines 225–228. Line 287 responsive to the I/O control from the sigmal decoder 74 and to the ANYDMD signal from the M mask decoder 83, is normally 0 allowing input through the buffers to 290. However, during an I/O output from the sigma decoder and the occurrence of an edge of any digit mask, gate 283 is driven to a logic 0 causing them to be responsive to the sigma outlines 286 for outputting data thereon to other chips. During this output state, gate 287 causes buffers 290 to become non-responsive to output lines 282. The latch buffers 288 are tri-state buffers, wherein a pair of 1's supplied to the input of the latch causes the buffers to act as output buffers outputting the binary data on lines 282. The third logic state of the latch buffers is where the output a floats, or a pair of 0's on lines 284 and 285 as inputs effectively decouples the buffers from the I/O terminals.

Thus, data from other chips may be input through the buffers 82 on lines 225–228 which are coupled to the adder 55 and therefrom may be transmitted into the main SAM registers, into R5, or through R5 into the keyboard register 54, or may be outputed through the I/O pins once again.

Another important feature of this invention is utilization of a fifth 1-bit register, R5, of four digit length coupled to the adder 55 and to the I/O lines. R5 is loaded with the leading edge of any digit mask as under the control of ANYDMD as generated on line 275 from the digit mask PLA 83. Thus, during any digit mask the existing data in the four bits of R5 is prevented from recirculating as line 291 becomes a logic 0 which effectively decouples the recirculate input. Line 275 becomes a logic 1 allowing the existing data to recirculate upon itself. R5 is then under the control of R5 control circuit 66 which generates control signals on line 292 and data inputs on line 293. The R5 control circuit will be discussed hereafter.

Data is entered from the adder 55 into register 5, upon a $\overline{\text{DMEDGD}}$ signal. The digit mask edge delayed signal provides an output upon the leading edge of the digit mask, which occurs the S time next to the S time corresponding to the desired field such as decimal point location. Accordingly, the number in the adder 55 representing decimal point location is entered into Register 5 upon the $\overline{\text{DMEDGE}}$ command.

Output from Register 5 is effected on lines 294 and 134. $\overline{R5\ out_4}$ one line 294 is communicated to the decimal point/D comparator 71 where it is entered into a 4-bit register 295. This binary representation of the decimal point location is compared with the encoded D times as generated on lines 296 by the D time generator 67. Upon a match of the proper D time with the decimal point location representation, complex gate 297 actuates the zero suppress circuit 64 and the decimal point output circuit via line 298.

The $\overline{R_5out_8}$ output on line 134 is communicated to the keyboard register control circuit 79 where it may selectively be entered into the keyboard register upon a $\overline{\text{R5.KR}}$ command.

A more complete understanding of the versatility and utility of the Register 5 is realized upon description of the R5 control circuit 66. The R5 input control line 292 is seen responsive to a number of commands, among which are Flag A to R5, Flag B to R5, number to R5 and keyboard register to R5. That is, the keyboard and Flag A and Flag B registers may be dumped into R5 respectively on lines 299 to 301. The number input on line 302 is coupled to the 4-bit shift register 271 of the flag decode PLA 76 which allows utilization of a subset of digits of the instruction word as data. This is an extremely important feature of the invention as it allows otherwise unused instruction word digits to provide data constants which otherwise would have to be generated under software control. This feature is extensively used during the software programming of this invention.

Input $S_3$–$S_6$ on line 303 allows gate 304 to be responsive to the "$D0_3$"-$M_{10}$ and KR to R5 commands only during state times 3–6. The $\overline{D0}$ input from the flag mask comparator 68 does not refer to the D0 time, but to the 0 side of the PLA 305. Referring to FIG. 5*e*, it is seen that during a W1 as decoded from the $I_0$–$I_3$ bits in combination with a D0 generates a $\overline{KR}$ to $\overline{R5}$ operation. Before gate 304 is actuated, an M10 operation on line 254 is required, a decode at W1 is required, a $\overline{DO}$, is required, and the timing must be between $S_3$ and $S_6$.

THE D TIME GENERATOR

The D time generator 67 comprises a 4-bit shift register 306 connected as a ring counter and with circuitry responsive to S times. By connecting the output line 130 on the first bit of the shift register 306, then the output actually counts backwards in binary. This is desirable because the D times in fact count backwards so as to aid in zero suppression. The counter counts from 15 to 0 and then holds, four times per instruction cycle, as there are 16 S times or 16 $\phi_1$–$\phi_2$ combinations which shift data through the 4-bit register. The encoded state times are output serially on line 130 to gate 129 where the D times are serially combined with the appropriate K line encode which is communicated to the keyboard register. The encoded D times are output in parallel on lines 296 and coupled to the wait generator 69, decimal point/D comparator 71, and to the D/S and flag mask comparator 68.

THE DISPLAY OUTPUT CIRCUITRY

The zero suppress circuitry comprises latch gates 307 and 308 responsive to outputs from the B and/or A registers. In the embodiment shown, NAND gate 307 for ending zero suppress is coupled to the A1–A8 bits of the A register and is further responsive to the $B_8$ bit of the B register on line 311 and to the decimal point generator on line 312. Gates 307 and 308 are further responsive to timing signals generated by the push/pull matrix 52 for generating start and end zero suppress signals during selected D times. For example, because D times D14, D15 and D1 are not utilized on the display of this embodiment, and because zeros are desirously suppressed during the exponent digits in the $S_1$ and $S_2$ bits, then a start zero suppress signal causes zero suppression on line 322 during D times $D_{14}$, $D_{15}$, $D_0$, $D_1$ and $D_2$. Since the start zero suppress signal on line 322 is gated into the zero suppression circuitry according to the strobe generator, only when the S times align with the D times, then effectively the $S_{14}$–$S_2$ bits are suppressed as desired. An end zero suppress signal on line 321 at time $S_3$ is desirable because $S_3$ is the least significant digit in the data word, and a zero is there desired in the display rather than having a blank display. Accordingly, zero suppression is ended during $S_3$ which means during the D3 strobe of the display.

Line 311 is responsive to the $B_8$ bit of the B register which is selectively set so that zero suppression will be ended after depression of the EE or enter exponent key. For example, by placing 1's selectively in the $B_8$ register, then after an EE function is commanded by the calculator operator, a pair of zones will be seen on the display instead of a blank display.

The zero suppress circuit is also responsive on line 312 to the decimal point generator 71 such that after a decimal point has been indicated, zero suppression ends because zeros then become significant after the decimal point.

Operation of the zero suppress circuit in combination with the segment displays and idle latch 156 will now be explained. Absent any commands to the zero suppression circuit, zeros are normally suppressed with the output of gate 307 on line 315 residing at a logic zero causing gate 308 to latch at a logic 1 which is an input to gate 307. Not until a non-zero input is generated on the register outputs on lines 323 will zero suppress be ended. That is, upon a zero generated on line 323, gate 307 provides a 1 output causing gate 308 to provide a 0 output setting the latch for ending zero suppress. Line 315 provides a zero to gate 309 which causes a 1 output on line 316 to be supplied to gate 310. Previously gate 309 in response to a 1 on line 315 during zero suppress has supplied zeros as inputs to gates 310 blanking the display.

The idle latch 156 is coupled as an input to gate 309, which functions to blank the segment display outputs whenever idle latch is in the state indicating a calculating condition. That is, only during "idle" will the display outputs be enabled.

To provide sign indicators, the $S_2$ and $S_{13}$ bits in Flag A register are set such that when flag information on line 154a/314/313 is strobed into the complex gate 155 during D2 and D13, then the Flag A output on pin 15 is actuated to properly illuminate the sign digits. As earlier explained, idle latch 156 outputs Flag A information at S time rates during the calculating or non-idle state, but emits Flag A at D time rates during the idle state for displaying the sign digits.

The idle latch 156 is set and zeroed on lines 324 and 325 respectively in response to the flag decode PLA 76. The output of the idle latch 156 is then outputed on pin 20 at $\overline{IDLE}$. NAND gate 317 responsive to the idle latch 156 is also responsive to a level change at time $S_{15}\phi_2$–$S_0\phi_1$ so that other coupling chips may be synchronized to the S time. In this embodiment, idle latch 156 is also always set during D time D14 such that there is always a level change on $\overline{IDLE}$ at $D_{14}S_0$, so that the D times on other responsive chips also are synchronized. This is an important feature of this invention as utilizing such a signal both to convey status information of the arithmetic chip and to convey synchronizing information of both S and D times to other chips provides substantial savings in pin requirements and silicon area utilized.

The segment decode PLA 63 is responsive to the B and/or A register outputs on lines 326 and provides decoded segment outputs on lines 327 which are communicated under the control of the zero suppression circuit to the segment A-segment G output pins. These outputs then selectively actuate segment drivers supplied externally which actuate the appropriate segments of the digit on the display. It is again noted that load 328 of the segment decode PLA 63 is strobed by signal $S_{14}\phi_2$, as the PLA only needs actuation during time $S_{14}$. Load 328 is a depletion load MOS device and such a clocking feature provides substantial power savings.

THE COND CIRCUIT

The condition circuit 80 generates the COND signal for communicating to the SCOM chip that the arithmetic chip has a condition to which the SCOM chip should respond. That is, as earlier explained with respect to the keyboard, upon a keyboard entry and K comparator match, or upon an input on the busy terminal on pin 29, a $\overline{CONDA}$ signal on pin 329 is communicated to the condition circuit. COND enables communication of the 7-bit encoded K line/D time word from the keyboard circuitry to the keyboard register 54. Also, by setting the COND bit in the EXT signal, the SCOM chip knows that the arithmetic chip has a control command waiting.

The condition circuit is also responsive to the $\overline{I_{12}}$ bit of the instruction word where it looks for a zero to reset condition. The $\overline{I_{12}}$ bit on line 330 passes through an edge detector for resetting condition at the transition between a branch and an instruction. Another input to the condition circuit is the output of the flag test and compare generator 66 for indicating the result of certain flag test and compares as earlier explained.

The condition circuit is also responsive to the carry/-borrow signal on line 213 and to the carry/borrow strobe circuit on line 331. The C/B STB signal on line 331 enables carry/borrow only at the end of the particular mask the calculator is working on to see if there is a carry out of that digit, or to see if there is an overflow condition so as to indicate to the ROM that overflow condition meaning that the number is too large.

THE SCOM CHIP

On the SCOM chip, the EXT command word is communicated to the add-1 circuit 25 on line 400 and to the branch comparator 33 on line 401. The $S_0$ gate signal on line 412 allows only the $S_0$ bit of EXT to be communicated on line 411 and inverted by inverter 413. If the $S_0$ bit of EXT is a 1 indicating a jam-in or P-Reg function, then inverter 413 provides a 0 to gate 402 allowing the address encoded in the subsequent bits of EXT to pass through gate 402 to NAND gate 405 and into the address register. If, however, the $S_0$ bit of EXT is a logic 0 allowing a branch, normal increment, or constant ROM memory recall, then a logic 1 is supplied to gate 402 by inverter 413 which disenables the subsequent bits of EXT. The old address is communicated via line 410 to the add-1 circuit and there the address is incremented unless a hold signal appears on line 414. Upon a hold condition, the same address is re-entered into the holding register via line 415.

If the $S_0$ bit of EXT is a logic 0, then the branch comparator 33 is enabled, dependent then upon a branch instruction and a match of COND. It is disenabled if a logic 1 appears at time $S_0$ as inverter 413 then generates a logic 0 to gate 416 via line 406.

The previous instruction word read out of the ROM 20 and communicated through the buffer 27 is communicated via line 417 to the branch comparator. Three latches, 418–420, are responsive to the instruction word on line 417 so that the appropriate bit condition will be saved until the EXT command word is subsequently compared therewith. For example, latch 418 had previously been enabled at time $S_{14}$ via line 421A so that the COND bit of the instruction word would appropriately set latch 418. Then upon the subsequent $S_1$, the COND state of latch 418 is compared with the $S_1$ or COND bit of EXT via gate 416. If a match is generated, then gate 416 enables at time $S_1\phi_2$ shifting of the address in the holding register into the address register. The address in the holding register then is a branch address as will subsequently be explained.

Latch 419 is responsive to the $S_{15}$ bit of the previous instruction word which is the branch or instruction bit. Only upon a branch bit in the $S_{15}$ bit of the instruction word may a branch be executed, dependent on a COND match. Otherwise, a zero will be supplied via line 422 disenabling gate 416.

Latch 420 is responsive to the $S_3$ bit of the previous instruction word which is the add or subtract indicator denoting whether or not to positively or negatively increment the old ROM address by the relative amount entained in the latter bits of the EXT command upon a branch instruction. The output of the latch 420 is communicated to the adder 32 which controls whether the true or complement form of the previous instruction address is coupled into the adder.

A "hold" instruction at time $S_2$ is communicated through gated line 423 to the add-1 circuit on line 414 and in inverted form on line 424 to gate 416 for disenabling the branch.

THE HOLDING AND ADDRESS REGISTERS

The combination of utilizing a holding register 24 and an address register 23 and the concept of relative addressing is an important feature of this invention. The previous address in the address register which accessed the ROM on lines 425 to cause generation of the instruction word $I_0$–$I_{12}$ on lines 426 is read out of the address register on line 410 and communicated to the full adder 32. The current instruction word on lines 426 is read into the instruction register 26 in parallel, and then read out of the instruction register serially on line 427. The buffer 27 is responsive to the serialized instruction word on line 427 and is further responsive to line 428 to the chip select output of the ROM 20. Upon a proper chip select output on line 428, the buffer 27 is actuated allowing the current instruction word to be read out onto line 430 which is communicated via line 417 to the full serial adder 32 during S times $S_3$–$S_{13}$ as generated by the S counter 38 and communicated on line 431. The number contained in the $I_1$–$I_{10}$ bits, if the instruction is a branch and condition is met, is added to the old address with the sum outputed on line 432. Lines 433 and 434 from the latch 420 control addition or subtraction by appropriately inverting the new address. Line 435 provides the carry or borrow function.

The output of the adder comprising the new incremented address is entered into the holding register 24 via line 436. Only if a branch has been commanded will the new incremented address in the holding register be gated into the address register 23 on lines 437. If a branch has not been indicated, for example, the branch latch 422 has not been set, then the output of the branch comparator on line 421 will not gate the new address into the address register. Instead, the old address on line 410 will have 1 added to it in the add-1 circuit and the incremented by 1 address will be input into the address register directly on line 415.

The holding register feature of this invention provides a one instruction word savings over a similar system not featuring such a holding register. That is, it enables execution of relative addition or subtraction before actual knowledge of whether a branch is to be executed or not. Because the branch bit is $I_{12}$ and the branch address locations are stored in $I_1$–$I_{10}$, storage of these address bits is required before determination of a possible branch operation. Otherwise, a subsequent instruction word after the branch bit would be required.

The new instruction word is selectively transmitted through the output buffer 27 as above described. The C.S. signal or chip select signal on line 428 controls whether or not the addressed instruction word is transmitted. That is, if there are other instruction memories in the system, such as referring to FIG. 2, the ROM memory 12, then the chip select line 428 would enable ffer 27 only when the main ROM had been addessed. Conversely, when another instruction ROM d been addressed, then output buffer 27 would not ow the addressed instruction word from the main ЭM to be transmitted, but would allow entry of the oper instruction word to be executed.

Upon transmission of the instruction word from the ıffer 27, then the new instruction word is communiıted not only to the branch comparator and full adder ıd arithmetic chip as above described, but also it is ommunicated on line 438 back into the instruction gister 26 for decoding. Such a multiple use of the inruction register in combination with the output buffer a feature of this invention which saves the requireents of an additional register and allows several inruction memories to be connected in parallel with nly a selected one accessing the instruction register ır further decoding. After the instruction word from ıe selected instruction memory has been serially rentered into register 26, then it is communicated via nes 439 to decode PLA 28. PLA load 440 is gated by ıe $\phi_1$ clock signal ro reduce power dissipation.

The output of the decode PLA 28 on lines 441 genertes the store and recall functions on lines 442 for regsters F and G. Also generated is a recall constant comıand on line 443 utilized for enabling the address circuitry of the constant ROM 35.

The constant register address 34 comprises a 7-bit hift register 445 responsive to the EXT signal on line 144. During S times $S_3$–$S_5$ and $S_7$–$S_{10}$ as supplied on line 146, the 7-bit shift register is loaded up to generate true ınd complement chip select output signals on lines 447 ınd constant A-constant D signals on output lines 448. The six chip select output lines 447 in addition to the recall constant enable on line 443 actuates NAND gate 449 for generating a recall constant signal on line 450 which enables the constant ROM to be addressed by the constant A-constant D signals. The recall constant signal on line 450 is outputed at time $S_{15}\phi_1$, and the constant A-constant D signals on lines 448 are propagates at time $S_{14}\phi_1$.

The constant ROM 35 comprises 16 constant registers with each constant 16 digits, and each digit comprising four bits, so that the constant ROM comprises a 16 × 16 × 4 bit matrix.

The constant ROM is a feature of this invention providing up to 16 predesigned 4-bit by 16-bit digit constants, and the ROM is advantageously implemented featuring virtual grounding. Virtual ground ROM's have heretofore been known in the calculator art, and are advantageously implemented for substantially reducing the required size of the ROM by eliminating all but 1 $V_{SS}$ line per bit, or a total of 4 $V_{SS}$ lines for the 16-digit by 4-bit constants.

Referring to FIG. 9*c* Each row line 468 of the virtual ground ROM is responsive to a respective S time so that upon "recalling constant" all 16 bits are read out responsive to times $S_0$–$S_{15}$. That is, each cell 458 of the constant ROMs comprises a single transistor having its gate either coupled or decoupled from the respective row line. If a gate is connected, then a logic 1 is stored in the bit, and if the gate is not connected, then a logic 0 is stored therein. The source terminal of the transistor of each cell is either connected directly to $V_{SS}$ or circuit ground on line 460 or is coupled thereto by the virtual grounding arrangement. The drain terminal of the cell transistor is coupled by a column line 459 to the adjacent cell transistor which is coupled to the output line 462 via an appropriate actuation of address transistors 464–467. Each $V_{SS}$ line 460 is decoupled from circuit ground by gate 461 during of the column lines.

Operation of the constant ROM is as follows: $V_{SS}$ or circuit ground is coupled to lines 460 through gate 461 during every $\phi 1$ and $\phi 2$ time, as supplied by arrangement 472. During time P2, gates 461 decouple lines 460 from circuit ground, and the output lines 462 are precharged through gates 463. Upon a $\overline{\text{recall constant}}$ command on line 473, a coded address on lines 478 selectively actuate the address transistors 464–467 so as to select a particular column line which is precharged to $V_{DD}$, and a particular row line 468 is actuated through gate 471. By actuating a particular row line during an S time and by actuating a column line as determined by the particular constant A-constant D address on line 448, one particular cell per bit is addressed. Output line 462 responds accordingly as to whether or not the precharge is discharged through the selected cell transistor, which is determined by the presence or absence of connection to the particular row line 468.

The virtual ground ROM feature of this invention renders the source terminal of the selected bit transistor to be effectively grounded, as ground line 460 is selectively coupled to that source terminal through a particular combination of address transistors 464–467. As above mentioned, only one $V_{SS}$ line per bit is thus required maximizing packing density of the memory cells.

During time $\phi 2$ the bit of data on output line 462 is coupled through gate 470 when gate 469 is actuated by the $\overline{\text{recall constant}}$ command on line 442. By repeating this sequence for all 16 S times, a 16 digit 4-bit constant is recalled through the IO buffer 455 to the IO lines.

THE F AND G REGISTERS

The F and G registers are implemented in a sequentially addressed memory or SAM format similar to the A-D registers. S times $S_0$–$S_{15}$ on lines 451 drive the read address and write address row lines, while the columns 452 are input lines and the columns 453 are output lines. As with registers A-D the F and G registers are interleaved with the columns respectively comprising the F1–G1, F2–G2, F4–G4 and F8–G8 bits. $\overline{\text{Store F}}$ and $\overline{\text{store G}}$ signals on line 442 selectively address the complex gates 454 so as to enable the proper bit of the proper register to accept input data on lines 456.

Column lines 453 are selectively coupled to the output buffers 455 so as to communicate the contents of the respective F and G registers through the I/O pins 3–6 in response to the $\overline{\text{recall F}}$ and $\overline{\text{recall G}}$ commands on line 448. Only if a $\overline{\text{recall}}$ command is generated on line 450 will the contents of Registers F and G be allowed to exit through the buffers. Output buffers 455 are tri-state buffers providing logic 1's and logiz 0's in a conventional manner and providing a floating third logic state allowing use of the I/O pin as an input. Gate 457 responsive to the $\overline{\text{recall F}}$, $\overline{\text{recall G}}$ and $\overline{\text{recall constant}}$ command provides the proper input to the buffers 455 so as to drive it into the appropriate state for recalling data through the buffers as outputs.

THE MAIN ROM AND DECODE CIRCUITRY

The main ROM 20 is implemented in a virtual grounding configuration which advantageously requires only one $V_{SS}$ or ground line per pair of instruction bits. That is, output lines 473 couple the respective bits of the instruction word IO–I12 from the main ROM 20 into the instruction register 26. Each of the output lines 473 is responsive to 8 column lines 474 which are selectively coupled together via serially connected decode transistors 486–488 and further coupled to a shared $V_{SS}$ line 475 instead of conventionally providing one $V_{SS}$ line 475 per column grouping. This provides a considerable increase in packing density.

Each cell of the ROM 20 comprises a single transistor having its gate either coupled or decoupled from a row line. A logic 1 is generated if the gate is connected and a logic zero is generated if the gate is not connected. The horizonal row lines 489 are selectively actuated via decode circuitry 21 which is responsive to the A0–A6 digits of the address word on line 425. The decode arrangement 21 is tree-type wherein each input combination on lines 425 actuate a unique row line 489.

The column lines 475 are selectively chosen in response to the A7–A9 digits of the address word, and the selected columns are also coupled to the respective $V_{SS}$ line 475 to implement the virtual grounding technique.

The A10–A12 digit of the address word are coupled to timing circuitry for generating signals to the input gating circuitry 22 for allowing the address word to be entered into the ROM 20 and into the decoder 21. Bits A10–A12 also are logically coupled together to generate the chip select (CS) signal on line 483. As earlier stated, up to 8 SCOM and ROM chips may be coupled together in this system, and the CS signal on line 483 enable the respective output buffer 27 on each chip so that the word from only the selected ROM is entered into the instruction registers 26 of the system.

Operation of the main ROM 20 is as follows. The address word A0–A12 is impressed on line 425 and 428 as inputs to the input gating circuit 22. The S1-P1 timing signal on line 490 actuate timing circuitry to generate timing signals $\overline{S1\phi2}$ on 481, $\overline{S1P2}$ on line 480, and $\overline{S2\phi1}$ on lines 491 and 482. Also, at time S1–P1, all lines of the input gating circuit 22 is discharged to $V_{SS}$ via line 479. This supplies logic zeros on lines 492 for coupling all columns to the input lines 473 so that all column lines as well as the output lines are precharged at time S1φ1 through gate 477. $V_{SS}$ is decoupled from the $V_{SS}$ line 475 as a gating signal on line 482 is not generated until S1–φ1 which prevents short circuiting the precharge voltage.

After all columns have been precharged, then at time S1φ2, the addresses of A0–A9 are read into the gating circuitry and at time S1P2 digits are read into the respective decoding circuitry for selecting the desired column line 474 and coupling it to the output line 473 and to $V_{SS}$. A0–A6 bits then select the desired row line 489 so that only one cell of the main ROM per digit is read out onto the output line 473.

In this manner, a high-density, low-power consuming ROM is provided for storing up to 1,024 instruction words. Only one $V_{SS}$ line is required per pair of instruction word digits which minimizes the amount of silicon space required for ground lines and thereby maximizes packing density. Precharge techniques utilizing gated $V_{DD}$ and $V_{SS}$ signals allow high-speed ROM operation. The inclusion of bits of the instruction word so as to specify which ROM of the system has been addressed provides the ability of coupling a plurality of ROMs in parallel, and selecting only one instruction word from one of the plurality for execution by the calculator. Table II depicts a ROM code as stored in hexadecimal format in the main ROM 20.

THE S AND D GENERATORS

The S times on the SCOM chip are generated in the S counter 38 in response to synchronization signal $\overline{\text{idle}}$ communicated from the arithmetic chip. Every 16 S times $\overline{\text{idle}}$ is programmed so as to change logic state from a logic 1 to a logic zero at a predetermined S time for synchronizing counter 38 with the S times on arithmetic chip. In this embodiment the S time is chosen at SO and edge detector circuit 512 detects the level change and transmits a logic zero on line 494 into the counter. The counter has coupled to its output the decoder 495a for generating timing signals for a certain S time duration and also for generating on line 513 a logic zero for recyling the counter. That is the decoder 495a is a PLA wherein a gate is implemented on the S0P1 line to the S13P1 line and then on the S15P1 line. For every S time during which a logic 0 is impressed upon one of the gates of line 514, line 514 is a logic 1 and line 513 provides the logic 1 back into the counter. However, at time S14 line 514 becomes a logic 0 causing a logic zero to be fed back on line 513 into the counter generating the 0 at the S15P1 time and providing on line 493 a logic 0 to begin the new cycle of S times during the next D time.

Another embodiment of the S generator eliminates the logic zero feedback in the counter so that the S generator on the SCOM is entirely slaved to the S times on the data chip. That is, the $\overline{\text{idle}}$ condition occurring every instruction cycle or D time also initiates counting of the non-freerunning S generator.

On line 515 of the decoder are seen gates at times S3–S15B which is the period required to read the instruction word serially out of the instruction register. On line 516 is generated the S4–S13 state for enabling the adder 32, the branch comparer 33, and the add-1 circuit 25. Programmable contacts 498 are selectively implemented on line 495 during S times S3, S5, and S7-S10 for loading 7 bits of the EXT word into the constant register address 34 for generating the $\overline{\text{recall constant}}$ signal on line 450 and for generating the constant A-constant D signals addressing the constant ROM.

$\overline{\text{Idle}}$ on pin 7 is also communicated on line 499 to a second edge detector circuit utilized in synchronizing the D SCAN generator 39. Gate 517 selectively activates gate 503 providing a logic zero on line 504 which activates selected sets of transistors 505 and 506 respectively shown coupled to $V_{DD}$ and to circuit ground. For the embodiment chosen, all upper gates are connected and only one transistor 506 has its gate connected. These forces that particular D output to a logic 1 for synchronizing the counter.

$\overline{\text{Idle}}$ is programmed on the arithmetic chip to change logic states not only at a particular S time, but also at a particular D time, such as D14. Line 499 goes from a logic 1 to a logic 0 at S0D14 and line 502 is its complement. Line 501 provides the level change to a change to a logic 0 at time SOφ2 of the next D time, so that all lines 500, 501 and 502 are a logic 1 at time S14P1 of the D14 instruction cycle. This signal actuates line 504 at time S15φ1. Line 504 then drives the output connected to $V_{SS}$ of the selected stage of the counter 508 to a logic 1 which is coupled into logic NOR gate 509 at S15φ2. The counter 508 in the D generator is thus ready to provide an output on the D13 line at PIN 27 at S0D13 of every instruction set. Accordingly, the D-SCAN generator 39 is synchronized to the D times of the arithmetic chip in response to a level change on the dle line.

Counter 508 in the D-SCAN generator circulates ogic zeros with line 510 providing a logic 1 back to the D15 beginning state of the counter at all times except during times DO. The output of the DO stage of the counter 508 at line 510 has no gate so that a logic 0 is provided on line 518 back into the D15 stage to begin a new instruction set. The DO–D15 output on pins 1–14 are coupled to the display into the keyboard for respectively strobing each in a timed sequence.

THE GATE CIRCUITS

Figure 10A:
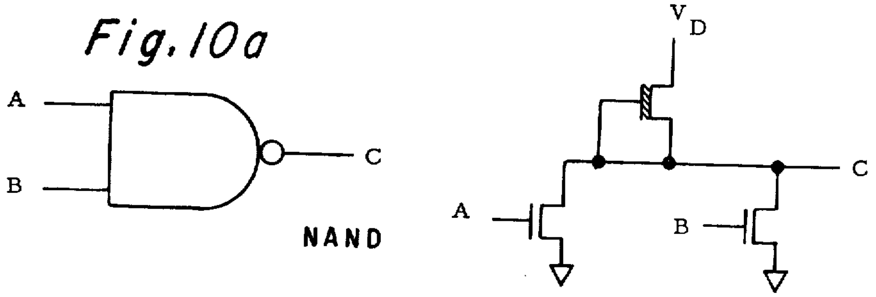
FIGS. 10a–10r are detail views of certain circuits used in the system of FIGS. 9 and 10.
Figure 10B:
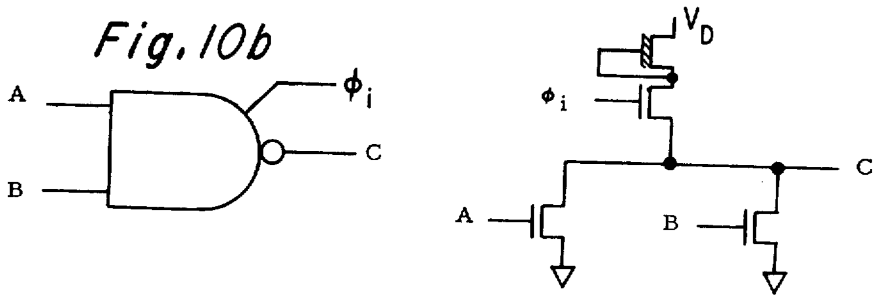
Figures 10C, 10D:
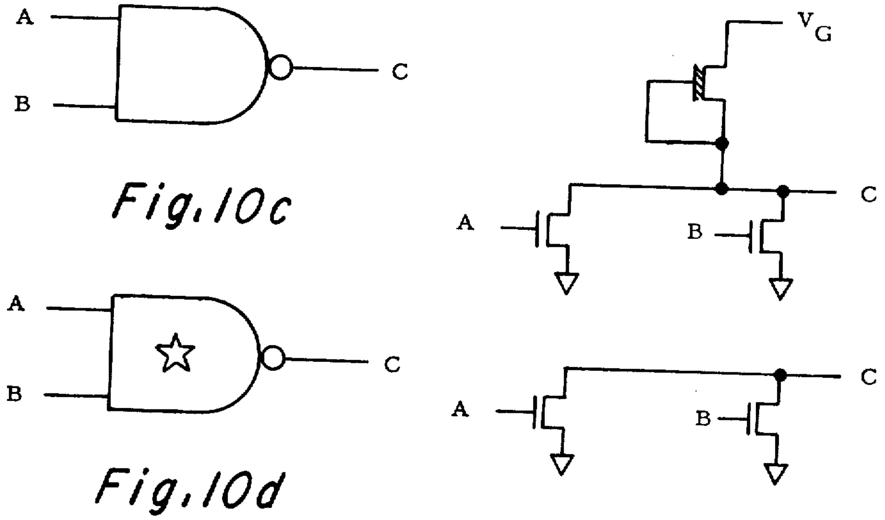
Figure 10E:
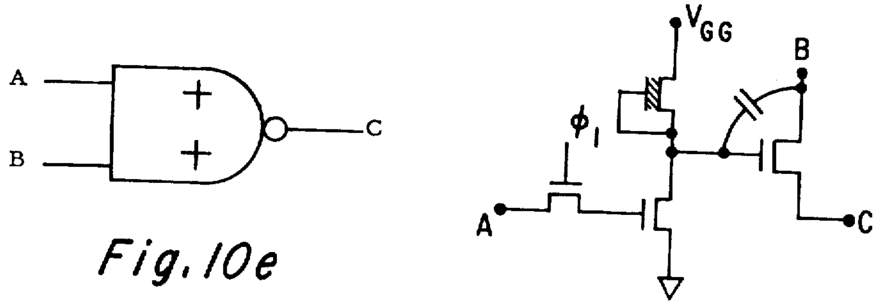
Figure 10F:
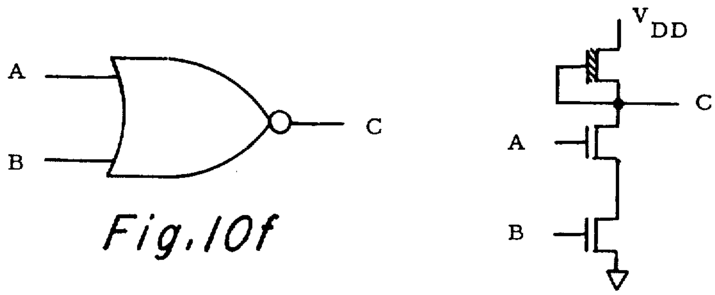
Figure 10G:
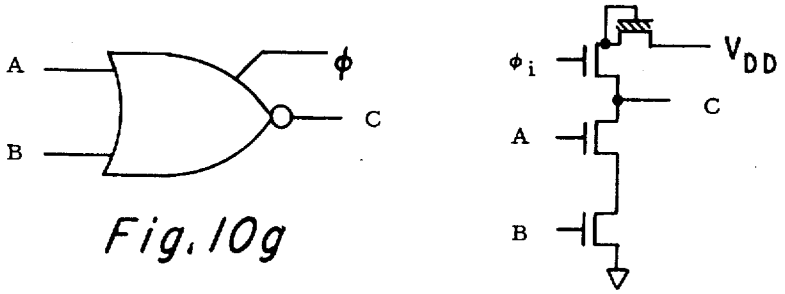
Figure 10H:
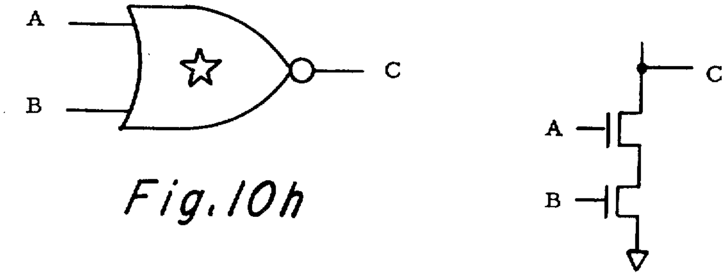
Figure 10I:
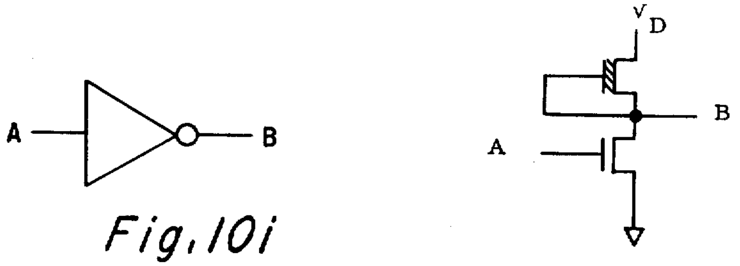
Figure 10J:
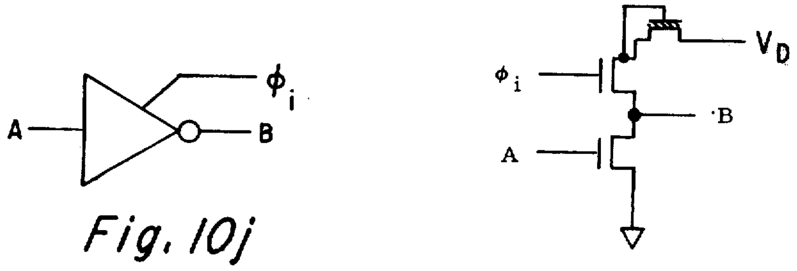
Figure 10K:
Figure 10L:
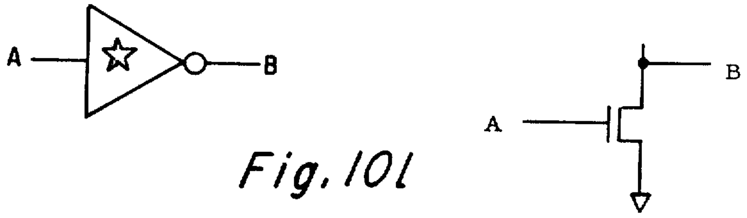
Figure 10M:
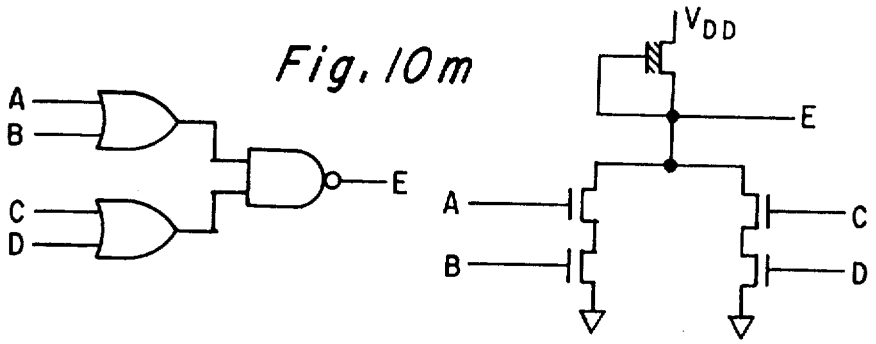
Figure 10N:
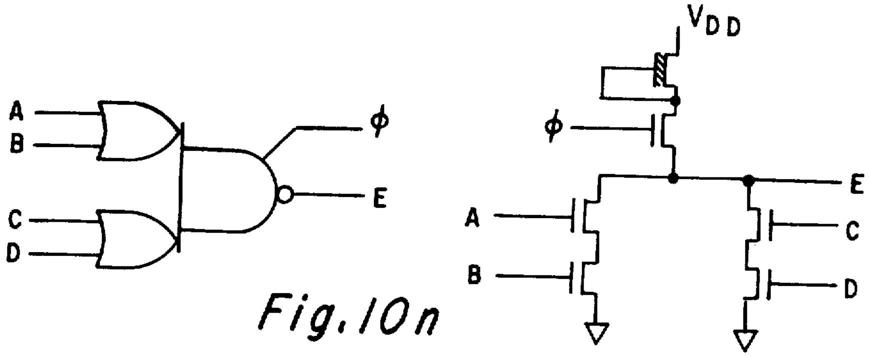
Figure 10O:
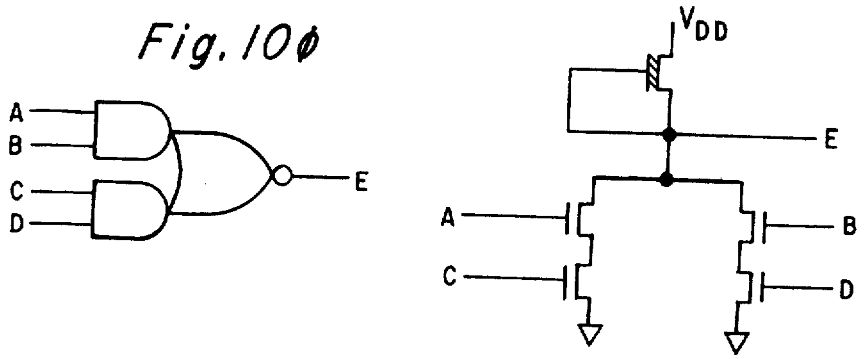
Figure 10P:
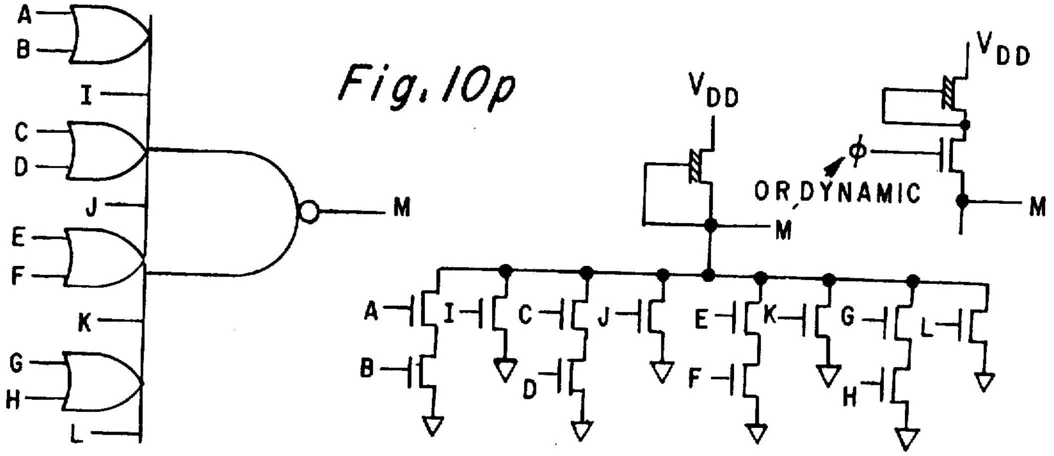
Figure 10Q:
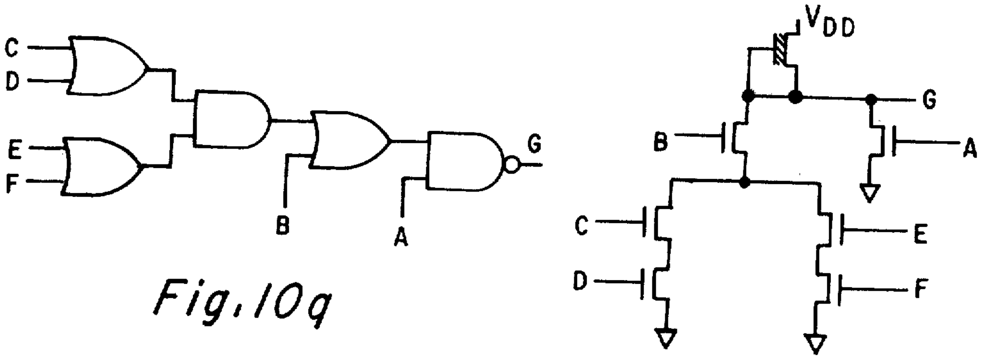
Figure 10R:
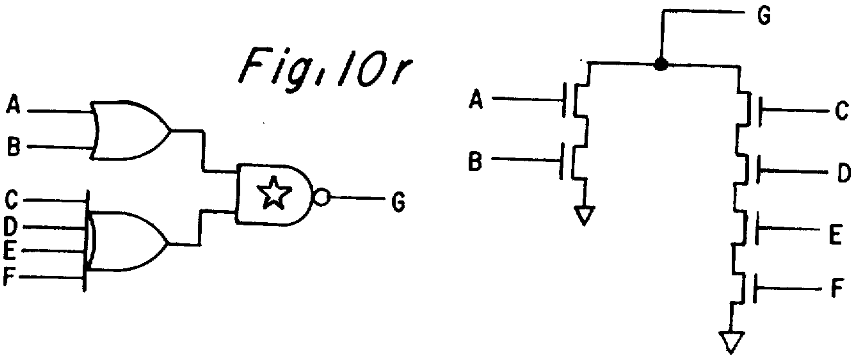

Referring now to FIGS. 10*a*–10*r* detailed view of the inverters, NANDS, NOR, and complex gates using depletion loads in FIGS. 8 and 9 are shown. FIGS. 10*a* and 10*b* are static and dynamic NAND gates, FIG. 10*c* is a boot-strap NAND gate, and FIG. 10*d* is an open drain-no load NAND gate. FIG. 10*e* is a boot-strap type NAND gate while FIGS. 10*f*, g and h are static dynamic and open drain NOR gates. FIGS. 10*a*, *j*, *k* and *l* are inverters of the static dynamic boot-strap and open drain types respectively. FIGS. 10*m*–10*r* are complex gates using only one load. Depletion load MOS devices are well-known in the art and have well-known IC.

A plurality of novel features have above been described in implementing a high-speed, low-power calculator capable of battery operation and also which provides increased instruction and data storage capacity for complex applications. Although the calculator system of the invention has been described with references to a specific embodiment, various modifications as well as other embodiments of the invention will become apparent to persons skilled in the art. It is therefore contemplated that the appended claims will not be construed in a limiting sense and will cover any such modifications or embodiments as fall within the true scope of the invention.

What is claimed is:

1. In an electronic calculator system implemented on at least one semiconductor chip, having a clock system for providing cycle and sub-cycle timing, instruction memory means for storing instructions, address register means for addressing the instruction memory means, and input means for receiving external commands, ultimately as addresses of the instruction memory means, the improvement comprising:

a. keyboard storage means, operatively connected to the input means for storing multi-bit instruction memory addresses and selectively connected to the address register means for transmitting the memory addresses;

b. sub-routine storage means, selectively connectable only to the keyboard storage means, for receiving and storing memory addresses, and for selectively transmitting memory addresses back to the keyboard storage means; and c. control means, operatively connected to the address register means, the keyboard storage means, the sub-routine storage means, and to the instruction memory means, responsive to a selected instruction word from the instruction memory means for causing the transfer of the contents of the keyboard storage means to the address register means and to the subroutine storage means and, under the control of a selected instruction word, from the sub-routine storage means to the keyboard storage means.

2. The calculator system of claim 1 further comprising strobing means, responsive to the clock system for providing a strobe pulse at each sub-cycle time.

3. The calculator system of claim 2 wherein the keyboard storage means and the sub-routine storage means each comprise a sequentially addressed memory having digit columns strobed sequentially by the strobe pulse.

4. The calculator system of claim 3 wherein the sequentially addressed memory has separate input and output lines and has common read/write address lines sequentially strobed by the strobe pulse.

5. In an electronic calculator system of the type implemented in LSI circuit technology and having an instruction read-only-memory for storing a relatively large number of instruction words and which is addressable through means responsive to programmable storage means, the programmable storage means comprising address register means for addressing the memory and first storage means for storing and communicating externally and internally a multi-bit word, and a sub-routine storage means under control of the instruction read-only-memory for selectively receiving only the word from the first storage means and for selectively re-transferring the word only to the first storage means, the method of addressing the instruction read-only-memory comprising the steps of:

a. entering a binary word in the first storage means representing a specific address of the instruction read-only-memory;

b. transmitting the representation to the address register means;

c. transferring the representation to the sub-routine storage means;

d. addressing the instruction read-only-memory with the representation; and e. re-transferring the representation in the sub-routine storage to the first storage means.

6. The method of addressing an instruction read-only-memory of claim 5, further including, subsequent to the step of re-transferring, the step of sending the representation to the instruction read-only-memory for relocating the operational sequence of the calculator back to the specific instruction read-only-memory location.

* * * * *